(12) United States Patent
Parr et al.

(10) Patent No.: US 7,907,774 B2
(45) Date of Patent: *Mar. 15, 2011

(54) SYSTEM, METHOD, AND APPARATUS FOR GENERATING A THREE-DIMENSIONAL REPRESENTATION FROM ONE OR MORE TWO-DIMENSIONAL IMAGES

(75) Inventors: Timothy C. Parr, York (GB); John D. Ives, Wayne, NJ (US)

(73) Assignee: Cyberextruder.com, Inc., Newark, NJ (US)

(*) Notice: Subject to any disclaimer, the term of this patent is extended or adjusted under 35 U.S.C. 154(b) by 0 days.

This patent is subject to a terminal disclaimer.

(21) Appl. No.: 12/696,748

(22) Filed: Jan. 29, 2010

(65) Prior Publication Data

US 2010/0189342 A1    Jul. 29, 2010

Related U.S. Application Data

(63) Continuation of application No. 11/230,779, filed on Sep. 19, 2005, now Pat. No. 7,657,083, which is a continuation-in-part of application No. 10/221,229, filed as application No. PCT/US01/07759 on Mar. 8, 2001, now Pat. No. 7,457,457, application No. 12/696,748, which is a continuation-in-part of application No. 12/234,461, filed on Sep. 19, 2008, now Pat. No. 7,657,084, which is a continuation of application No. 10/221,229, filed as application No. PCT/US01/07759.

(60) Provisional application No. 60/611,139, filed on Sep. 17, 2004, provisional application No. 60/187,742, filed on Mar. 8, 2000.

(51) Int. Cl.
*G06K 9/00* (2006.01)
*G06T 15/00* (2011.01)

(52) U.S. Cl. ........................................ 382/154; 345/419
(58) Field of Classification Search .................. 382/115, 382/116, 117, 118, 154, 155, 159, 285; 348/169–172, 267, 824; 345/6, 419, 652, 345/663, 664, 420, 427, 563, 665, 678; 700/118
See application file for complete search history.

(56) References Cited

U.S. PATENT DOCUMENTS 5,280,305 A    1/1994    Monroe et al.
(Continued)

FOREIGN PATENT DOCUMENTS

WO    02/095677    11/2002
(Continued)

OTHER PUBLICATIONS

Aizawa, Model-based image coding: advanced video coding techniques for very low bit-rate applications, Proceedings of the IEEE, 1995, vol. 83, p. 259-271.

(Continued)

*Primary Examiner* — Abolfazl Tabatabai
(74) *Attorney, Agent, or Firm* — SNR Denton US LLP

(57) ABSTRACT

In a system and method for generating a 3-dimensional representation of a portion of an organism, collecting training data, wherein the training data includes a first set of training data and a second set of training data. At least one statistical model having a set of parameters is built using the training data. The at least one statistical model is compared to a 2-dimensional image of the portion of the organism. At least one parameter of the set of parameters of the statistical model is modified based on the comparison of the at least one statistical model to the 2-dimensional image of the portion of the organism. The modified set of parameters representing the portion of the organism is passed through the statistical model.

20 Claims, 50 Drawing Sheets

U.S. PATENT DOCUMENTS

| | | | | |
|---|---|---|---|---|
| 6,042,235 | A * | 3/2000 | Machtig et al. | 353/28 |
| 6,044,168 | A * | 3/2000 | Tuceryan et al. | 382/118 |
| 6,047,078 | A | 4/2000 | Kang | |
| 6,072,894 | A * | 6/2000 | Payne | 382/118 |
| 6,775,397 | B1 | 8/2004 | Hamalainen | |
| 6,940,545 | B1 * | 9/2005 | Ray et al. | 348/222.1 |
| 6,975,750 | B2 * | 12/2005 | Yan et al. | 382/118 |
| 7,457,457 | B2 | 11/2008 | Ives et al. | |
| 7,657,083 | B2 | 2/2010 | Parr et al. | |
| 7,657,084 | B2 | 2/2010 | Ives et al. | |
| 2001/0020946 | A1 * | 9/2001 | Kawakami et al. | 345/582 |
| 2004/0041804 | A1 | 3/2004 | Ives et al. | |

FOREIGN PATENT DOCUMENTS

| | | |
|---|---|---|
| WO | 2006034256 | 3/2006 |

OTHER PUBLICATIONS

Anderson, An introduction to multivariate statistical analysis, 2nd Edition, John Wiley & Sons, 1984.

Cootes et al, Active shape models—Smart snakes, Proceedings of the British Machine Vision Conference, 1992, p. 266-275.

Cootes et al, Training models of shape from sets of examples, Proceedings of the British Machine Vision Conference, 1992, p. 9-18.

Edwards et al, Face recognition using statistical models, IEE Colloq Dig, 1997, vol. 74, p. 2/1-2/6.

Heap and Hogg, Improving Specificity in PDMs using a Hierarchical Approach, British Machine Vision Conference, 1997, p. 1-10.

Horn, Closed-form solution of absolute orientation using unit quaternions, Journal of Optical Society of America A, 1987, vol. 4, p. 629-642.

http://www.dupontauthentication.com/?cmd=portrait.

International Phonetic Association, http://www2.arts.gla.ac.uk/IPA/fullchart.html.

International Search Report and Written Opinion of Sep. 28, 2006 in application PCT/US05/33620.

International Search Report of Dec. 10, 2003 in the related application PCT/US01/07759.

Lanitis et al, A unified approach to coding and interpreting face images, Proceedings of the Fifth International Conference on Computer Vision, 1995, p. 368-373.

Lee and Schachter, Two algorithms for constructing the Delaunay trangulation, International Journal of Computer and Information Sciences, 1980, vol. 9, No. 3, p. 219-242.

Lee et al, Face detection and recognition using PCA, IEEE Tencon, 1999, p. 84-87.

Li-An et al, Automatic construction of 3D human face models based on 2D images, Proccedings of the International Conference on Image Processing (ICIP), Lausanne, Sep. 16-19, 1996, New York IEEE US vol. 1, Sep. 16, 1996, pp. 467-470.

Longuet-Higgins, A Computer Algorithm for Reconstructing a Scene from Two Projections, Nature, 1981, vol. 293, p. 133-135.

Luo and King, Automatic human face modeling in model-based facial image coding, Proceedings of the 1996 Australian New Zealand conference on Intelligent Information Systems, p. 174-177.

Luong and Faugeras, The Fundamental Matrix: Theory, algorithms, and stability analysis, IJCV, 1995, p. 1-46.

McClelland and Rumelhart, Explorations in Parallel Distributed Processing, a Handbook of Models, Programs and Exercises, MIT Press, Cambridge MA 1998.

Mirchandini and Cao, On hidden nodes for neutral sets, Transactions on Circuits and Systems, 1989, vol. 36, No. 5, p. 661-664.

Numerical Recipes in C: the Art of Scientific Computing, Cambridge University Press, 1992.

Park et al, Analysis and synthesis of 3D face image sequence based on model-based image coding scheme with an internet browser, Proceedings of the 1999 International Conference on Image Processing, 1999, vol. 4, p. 207-211.

Raiko, Hierarchical Nonlinear Factor Analysis, Thesis, Helsinki University of Technology, 2001.

Supplementary European Search Report issued on Mar. 10, 2005 in the related application EP 01 92 4139.

Tang and Huang, Automatic construction of 3D human face models based on 2D images, Proceedings of the International Conference on Image Processing, 1996, p. 467-470.

Thurstone, Multiple Factor Analysis: A Development and expansion of the mind, University of Chicago Press, 1947.

Wolfson Image Analysis Unit webpage: www.wiau.man.ac.uk (Link No Longer Valid, Replaced by: www.medicine.manchester.ac.uk/imaging/).

www.kinegram.com.

* cited by examiner a  b  c a  b  c a  b  c a b c a  b  c a　　　　　　b　　　　　　c　　　　　　d　　　　　　e a  b  c  d  e a  b  c  d a          b                    c a b c

SYSTEM, METHOD, AND APPARATUS FOR GENERATING A THREE-DIMENSIONAL REPRESENTATION FROM ONE OR MORE TWO-DIMENSIONAL IMAGES

CROSS REFERENCE TO RELATED APPLICATIONS

The present application is a Continuation of U.S. application Ser. No. 11/230,779, filed 19 Sep. 2005 now U.S. Pat. No. 7,657,083, which claims the benefit of U.S. Provisional Application Ser. No. 60/611,139, filed on 17 Sep. 2004, and which is a Continuation-In-Part of U.S. application Ser. No. 10/221,229, filed on 16 Jun. 2003 now U.S. Pat. No. 7,457,457, issued 25 Nov. 2008, which is a U.S. Section 371 National Stage Application from International Application No. PCT/US01/07759, filed 8 Mar. 2001 now abandoned, which claims priority to U.S. Provisional Application Ser. No. 60/187,742, filed on 8 Mar. 2000; the present application is also a Continuation-in-Part of U.S. application Ser. No. 12/234,461, filed 19 Sep. 2008 now U.S. Pat. No. 7,657,084, which is a Continuation of U.S. application Ser. No. 10/221,229, filed 16 Jun. 2003 now U.S. Pat. No. 7,457,457, issued 25 Nov. 2008, which is a U.S. Section 371 National Stage Application from International Application No. PCT/US01/07759, filed 8 Mar. 2001, which claims priority to U.S. Provisional Application Ser. No. 60/187,742, filed on 8 Mar. 2000; all of which are incorporated herein by reference in their entireties.

BACKGROUND OF THE INVENTION

The rapid growth of the Internet has stimulated the development of personalization technologies. The global personalization market was worth $524 million in 2001 and will grow to over $2.1 billion by 2006. The Internet has increased competition between businesses which now need to distinguish themselves by providing a better service to their higher-value customers. Personalization is certainly a powerful tool in the battle for customer acquisition and retention.

The Facial Recognition/Biometric Market is a growing market. In 2001, $7.6 billion was spent on security technology in the U.S. Biometrics represents the fastest growing segment of the security industry and facial recognition is the fastest growing discipline because it is the only biometric that, can be utilized without requiring the subject to cooperate. It is the only biometric that can be used as a surveillance tool as well as an authentication tool because facial recognition is suitable for a one-to-many matching.

Facial Recognition Business Drivers include:
Securing an Individual's Identity 'You are You'
NIST recommendation to use FR and Fingerprint
Save Time and Money
State & local Police Departments (Line-ups/Suspect bookings)
Various state DMV (New Driver's License programs)
Legislative Direction
Department of Homeland Security
Border Crossings and Ports of Entry
Transportation Security Administration
Airports
Passports or National Identification
Transportation Worker's ID Card (TWIC)
Department of Defense
Common Access Cards (CAC)

SUMMARY OF THE INVENTION

The present invention(s) include, systems, methods, and apparatuses for, or for use in, generating a three-dimensional (3D) representation or representation data from a two-dimensional (2D) image or two-dimensional image data.

In some embodiments, the present invention(s) provides, or includes providing, improved or improvements on techniques described in pending U.S. patent application Ser. No. 10/221,229, filed on Jun. 16, 2003, and published on Mar. 3, 2004 as Publication No. 2004/0041804, which claims priority to U.S. Provisional Patent Application No. 60/187,742, filed on Mar. 8, 2000 (together referred to hereinafter as the "Incorporated U.S. Applications"), both of which applications are hereby incorporated herein by reference in their entirety.

It is noted that the description, figures, images, and screen shots included herein are not intended to be limiting of the scope of the invention.

In some embodiments, the present invention(s) provides techniques, improved techniques, and computer algorithms for quickly generating a highly accurate 3D representation of an object or thing (or data describing such a representation), such as, for example, a human face or head from one or more 2D images (or from data describing such images), which can be called "2D-3D conversion". In some embodiments, a single 2D image can be converted to a 3D representation. In other embodiments, multiple 2D images can be utilized. In some embodiments, a front-facing image of a face and a profile image of the face can be used. In other embodiments, multiple images of the face may be used, the images being from different angles, showing different poses or expressions, having different lighting, resolution, or other photographic qualities, etc. In some embodiments, the techniques or applications are automatic and performed by a computer or computerized system.

In some embodiments, training sets, as described herein, or a database containing training sets, is used in producing statistical models, which models are then used in performing 2D-3D conversion according to techniques described herein. Training sets can be used to provide an accurate cross-section of 2D images of faces across a population of people, for instance. For example, in some embodiments, 3D representations of real faces are used to produce multiple 2D images of such faces (potentially many per 3D representation), which 2D images are used in the training set or sets. As such, generally, the larger the training set (in terms of both number of faces included, and number of images per face, for example), the better represented the cross-section, and the more accurate the resultant model. In some embodiments, laser-scanning or other 3D data acquisition techniques can be used to provide 3D representations of faces which can then be used to produce 2D images for training sets.

Once an accurate 3D representation (or representation data) is generated of a person or object, for example, from one or more 2D images of the person or object, it has many varied uses and applications. For example, in some embodiments, the 3D representation itself can be used for animation, video gaming, or entertainment industry where the accurate 3D representation can be used to produce accurate animated displays on a computer or television screen or other 2D display device, for example. The 3D representation can also be used, for example, to produce an accurate physical model of an object, or doll of a head (or entire body, potentially) of a person, for example. A multitude of applications can be easily envisioned. For example, many medical applications are possible. For instance, for a person who has been disfigured, a prosthetic or other 3D cosmetic or medical device, such as a face burn mask, may be produced using a 3D representation of the relevant body part or surface, which 3D representation can be produced using one or more 2D images of the body part or surface which were obtained prior to the disfigurement Not only can techniques described herein be used to generate accurate 3D representations, but they can also be used to generate one or more accurate 2D representations or images, or data describing such representations or images, which images, for example, can be accurate but different than the one or more 2D images used in generating the 3D representation (which can be called "2D-3D-2D conversion"). For example, such generated 2D images can be normalized or adjusted with respect to different conditions or factors, including for example, pose, angle, lighting or other photographic conditions, to add or remove facial hair, to add, remove, or change facial expression, to simulate a greater or lesser age, etc.

Fast or near real-time generation of accurate 3D representations of faces or heads or subjects, and generation of accurate 2D images or faces or heads of subjects adjusted as described above, for example, have many uses including use in or with facial recognition systems and security systems which employ facial recognition systems.

For instance, some facial recognition systems function by comparing one or more 2D images of a subject to a database of images of many known people (one or more images per person) to attempt to find a match with some specified degree of certainty or confidence, and thereby identify the subject with some specified degree of certainty or confidence. According to techniques described herein, 3D representations of a subject can be generated and then used to generate one or more 2D images of the subject, which 2D images of the subject can then be used for attempted matching in 2D facial recognition (FR) systems. By adjusting or normalizing such 2D images to suit the needs of the security system, for example, by generating different angles, expressions, poses, multiple poses, lighting conditions, etc., the accuracy of the FR system in identifying a subject can be dramatically increased. For example, a driver's license, passport photograph, video tape, or other image of a subject can be used to generate an accurate 3D representation, and then one or more different, accurate 2D images of the subject which can then be used in the FR system. The speed of techniques described herein, which, in some embodiments, is near real-time, further enhances use in security applications using facial recognition systems, for instance, in allowing fast, accurate identification of an individual that may appear on a wanted or terrorist watch list, and thereby potentially to facilitate apprehension thereof.

Furthermore, techniques according to the invention can be used in, with or to enhance 3D facial recognition systems, some of which, for example, use 3D data acquired from a subject to compare against 3D data of many individuals contained in a database. If only one or more 2D images or representations of a subject are available, and not 3D representations, then conversion to 3D must be relied upon before the 3D FR system can be used. Since techniques described herein produce highly accurate 3D representations from one or more 2D images, the accuracy and confidence of recognition of such 3D FR systems, in instances where only one or more 2D images of a subject are initially available, can be greatly increased.

As mentioned above, techniques are provided that allow normalization of 2D images of human faces, which can be used with or to provide improved 2D facial FR systems. For existing 2D facial recognition (FR) systems, an off-pose image can severely reduce the accuracy of the systems. Application of techniques as described herein to such images will enable causing or forcing each image (whether live or in a database) to have constant lighting and camera parameters and zero pose (front facing), thereby enabling providing a much more accurate 2D FR system. 2D FR systems can also benefit by the production of multiple viewpoints. For example, the 3D head created by techniques described herein can easily be rendered accurately with different viewpoints, expressions, and lighting, thus providing a 2D FR system with more, and more accurate, images per person than would otherwise be available, thereby further enabling improved recognition accuracy. The resulting 3D heads or faces themselves can be used for a 3D FR system as well; in fact, the STEP model parameters described herein actually contain identity and expression values.

In some embodiments, improvements and techniques according to embodiments of the invention lend themselves to or relate to three main aspects of a 2D-3D conversion process: algorithm speed, 3D mesh coverage and 3D mesh accuracy. In some embodiments, improvements in such areas are obtained at least in part by using an improved statistical technique, a new modeling technique and/or a new model-fitting algorithm, each of which are described herein. Additional, more detailed, and mathematical description can be found, among other places in this application, in the Section 3.

A method for generating a 3-dimensional representation of a portion of an organism, comprising: collecting training data, wherein the training data includes a first set of training data and a second set of training data; building at least one statistical model having a set of parameters using the training data; comparing the at least one statistical model to a 2-dimensional image of the portion of the organism; modifying at least one parameter of the set of parameters of the statistical model based on the comparison of the at least one statistical model to the 2-dimensional image of the portion of the organism; passing the modified set of parameters representing the portion of the organism through the statistical model.

The method for generating a 3-dimensional representation of a portion of an organism, wherein the training data includes data relating to portions of organisms of the same type as the portion of the organism.

The method for generating a 3-dimensional representation of a portion of an organism, wherein each of the first set of training data and the second set of training data comprises a plurality of points representing the organism.

The method for generating a 3-dimensional representation of a portion of an organism, wherein the statistical model is based on at least one of 2-dimensional shape, 2-dimensional texture, 3-dimensional shape and 3-dimensional texture.

The method for generating a 3-dimensional representation of a portion of an organism, wherein the 2-dimensional shape is based on a first plurality of points representing the first set of training data and a second plurality of points representing the second set of training data.

The method for generating a 3-dimensional representation of a portion of an organism, wherein the 2-dimensional texture is based on pixel values inside the 2-dimensional shape.

The method for generating a 3-dimensional representation of a portion of an organism, wherein the pixel values represent the colors red, green and blue.

The method for generating a 3-dimensional representation of a portion of an organism, wherein the 3-dimensional shape is based on a first plurality of points, a second plurality of points, a third plurality of points and a fourth plurality of points obtained from at least one of a 3-dimensional acquisition system and 2-dimensional images.

The method for generating a 3-dimensional representation of a portion of an organism, wherein the 3-dimensional texture is based on pixel values located between 3-dimensional points.

A method for generating a 3-dimensional representation of a portion of an object that is capable of being represented by a statistical model, comprising: collecting training data, wherein the training data includes a first set of training data and a second set of training data; building at least one statistical model having a set of parameters using the training data; comparing the at least one statistical model to a 2-dimensional image of the portion of the object; modify at least one parameter of the set of parameters of the statistical model based on the comparison of the at least one statistical model to the 2-dimensional image of the portion of the object; passing the modified set of parameters representing the portion of the object through the statistical model.

The method for generating a 3-dimensional representation of a portion of an object that is capable of being represented by a statistical model, wherein the training data includes data relating to portions of objects of the same type as the portion of the object that is capable of being represented by a statistical model.

The method for generating a 3-dimensional representation of a portion of an object that is capable of being represented by a statistical model, wherein each of the first set of training data and the second set of training data comprises a plurality of points representing the organism.

The method for generating a 3-dimensional representation of a portion of an object that is capable of being represented by a statistical model, wherein the statistical model is based on at least one of 2-dimensional shape, 2-dimensional texture, 3-dimensional shape and 3-dimensional texture.

The method for generating a 3-dimensional representation of a portion of an object that is capable of being represented by a statistical model, wherein the 2-dimensional shape is based on a first plurality of points representing the first set of training data and a second plurality of points representing the second set of training data.

The method for generating a 3-dimensional representation of a portion of an object that is capable of being represented by a statistical model, wherein the 2-dimensional texture is based on pixel values inside the 2-dimensional shape.

The method for generating a 3-dimensional representation of a portion of an object that is capable of being represented by a statistical model, wherein the pixel values represent the colors red, green and blue.

The method for generating a 3-dimensional representation of a portion of an object that is capable of being represented by a statistical model, wherein the 3-dimensional shape is based on a first plurality of points, a second plurality of points, a third plurality of points and a fourth plurality of points obtained from at least one of a 3-dimensional acquisition system and 2-dimensional images.

The method for generating a 3-dimensional representation of a portion of an object that is capable of being represented by a statistical model, wherein the 3-dimensional texture is based on pixel values located between 3-dimensional points.

Using Factor Analysis

While techniques described in some embodiments of the Incorporated U.S. Applications, and techniques described in some embodiments herein, utilize multivariate statistical modeling, techniques described herein use maximum likelihood factor analysis in preference to principal components analysis (PCA). Factor analysis provides a similar dimensionality reduction to PCA. It also includes, however, two important benefits when modeling data: (1) maximum likelihood factor analysis provides a direct method of testing the hypothesis that enough factors are being used to correctly describe the variability in a training set and (2) factor analysis models the inter-relation between the variables (the covariance) rather than just the multi-dimensional variance. In relatively general terms, described with reference to the example of modeling human heads, this results in a set of variables (the factors) that describe how each part of the human face relates to each other part over the population of people.

Using the 2D3D Indexed Annotations and the Shape Projection (SP) Model

In some embodiments, techniques described herein utilize a new modeling technique called the 2D3D indexed annotation that provides a link between 2D and 3D via the perspective projection algorithm. This serves at least two goals: (1) the 3D training data can be used to enhance the 2D training data by rendering the 3D heads from various camera viewpoints whilst at the same time providing 2D annotations automatically and with precise accuracy, with the resulting 2D models being more robust to pose and lighting change; (2) a novel statistical model can be built that models the relationship between 3D shape and projected 2D shape, thus 3D shape AND camera parameters can be obtained from 2D shape. Such an algorithm has the advantage of being extremely fast, and allowing, for example, extremely fast, such as real time or near-real time, 2D-3D or 2D-3D-2D conversion.

Developing and Applying GOOD Descent

In some embodiments, development and usage of the Generalized Once-Only Derivative (GOOD) descent provides a fast mechanism for fitting all the statistical models to observed data in an iterative way. Some techniques described in the Incorporated U.S. Applications for converting 2D to 3D relied on a weighted estimation of the third dimension based on training data. Some embodiments of techniques and algorithms described herein iteratively fit to the observed data, and a fit error measure is generated at each stage, thereby providing a useful method of evaluating the accuracy and proceeding with the fit. As such, the current method can encompasses the availability of a direct comparison of the modeled data with the observed data. Usage of the iterative fit allows the ability to accurately determine the camera and lighting parameters that are present in the environment in which the observed image is taken. Thus, an accurate textured 3D mesh can be obtained, parameters of the camera that was used to take the 2D image can be determined, and the lighting that was present at the time the image was taken can be determined.

In some embodiments, techniques described herein utilize fitting models to the observed data rather than estimating the missing data, boot-strapping the process to obtain algorithm speed while improving the accuracy of the output, and the use of a neural network to initialize the process. In some embodiments, boot-strapping the various models together provides a coarse to fine approach that significantly improves speed robustness and facilitates the link between 2D and 3D at the correct or ideal stage in the process (i.e. the SP model).

The present invention provides for the automatic conversion of a single, 2D image (like a passport photo) into a fully developed 3D model of the subject's head in just a few seconds. This can be used for fields, such as, for example, entertainment, advertising, and security, and multi-modal applications, such as, for example, Internet, PC, and Mobile Phones The problems solved by the present invention in the field of personalization/entertainment/advertising include reduced cost of production, improved quality of end product and reduced production time, and in the field of security include improved accuracy of facial recognition, simplified enrollment for facial recognition, and capability of watch list creation. The present invention also provides for personalization of product and can help drive business.

An embodiment of the present invention operates using a process that sends an image, implements a software program that finds a face, implements a software program the creates 3D, and implements a software program that renders file(s) in a variety of formats, including formats, such as, for example, (.3ds) 3D StudioMax, (.obj) Maya, (.swf) Shockwave/Flash, (.gif) Animated GIF, (.jpg) JPEG Format, (.wrl) VRML Format, (.stl) Stereo Lithography, to name a few.

The present invention provides the capability of personalizing video games. The present invention also provides the capability to customize Instant Messaging.

| | |
|---|---|
| MSN/AOL/Yahoo! Messengers | Fully-animated faces of users are married to Messenger windows to "read" the messages. |
| Wireless (SMS, EMS, MMS) | User created images are managed from the web and used by companies as advertising/branding vehicles. |
| E-mail | Fully-animated faces of users are married to e-mail client to "read" the mail. |
| Chat | Fully-animated faces (avatars) of members "speaking" in chat rooms. |

The present invention provides the capability of generating multi-media messaging with individualized avatars.

User created images may be managed from the web and used by companies as advertising/branding vehicles.

The present invention makes mass personalization of many advertising, entertainment and security applications possible. It resolves costly bottlenecks, it is simple for all users/operators, it is fast as files are automatically created, it is cost effective, the servers do all the work and it is fully scalable as additional servers can be added as demand increases.

DETAILED DESCRIPTION

First Embodiment

The process according to a first embodiment of the present invention for the conversion of one or more 2D images of a 3D object, into a representative 3D mesh, known as the CyberExtruder-CyberExtruder 2D to 3D technique, is described below. A technique is described that can be applied for the generation of an accurate 3D mesh representing a human head that is obtained automatically from a 2D image of a person's head. The technique is not limited to a human head since it is general enough to be applied to many other 3D structures and objects as long as enough training data can be acquired or adequately simulated.

The process can be broken down into three main areas: (1) building training sets, (2) building a statistical models and (3) applying the statistical models.

The description of the process will be set forth below according to the following outline:
1. Construction of training data
   a. Construction of a representative 3D head mesh: called the base-head
   b. Construction of front and profile 2D annotations from the base-head
   c. Construction of a 3D head mesh from annotated front and profile images
   d. Automatic construction of a large-pose 2D training set.
2. Building statistical models
   a. Useful multivariate statistics methods
      i. PCA
      ii. Factor analysis
   b. Shape models
   c. Texture models
      i. Local texture (LT) models
      ii. Global texture (GT) models
   d. Combined shape and texture model
      i. Shape and local texture (SLT) model
      ii. Shape and global texture (SGT) model
3. Applying the statistical models
   a. Initialization
      i. Neural networks
      ii. Global initialization
   b. Applying SLT models
   c. Applying SGT models
      i. The Generalised Once Only Derivative (GOOD) descent method
      ii. 2D SGT using GOOD descent
   d. 3D Shape Projection (SP) model
   e. 3D Shape, Texture and Environment Projection (STEP) model
   f. Multi-resolution
      i. Multi-resolution SLT
      ii. Multi-resolution SGT
      iii. Multi-resolution STEP 1. Construction of Training Data Most of the algorithms developed and used in the CyberExtruder 2D to 3D technique require training data to build and apply statistical models. This section describes the techniques used to produce both the 2D and the 3D training data sets.

For purposes of the description of this embodiment of the present invention an example of the conversion of 2D facial images to 3D textured head meshes is used. Hence this section relates to the construction of the sets required for that example.

Figure 1:
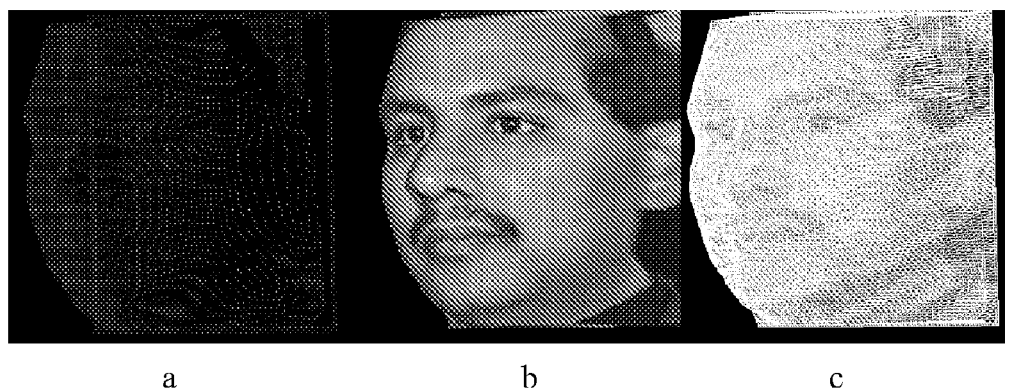
FIG. 1 shows an example of an output from a flat laser scanner according to an embodiment of the present invention.
Figure 2:
FIG. 2 shows an example of an output from a structured light system according to an embodiment of the present invention.
Figure 3:
FIG. 3 shows an example of the output from a stereo system according to an embodiment of the present invention.
Figure 4:
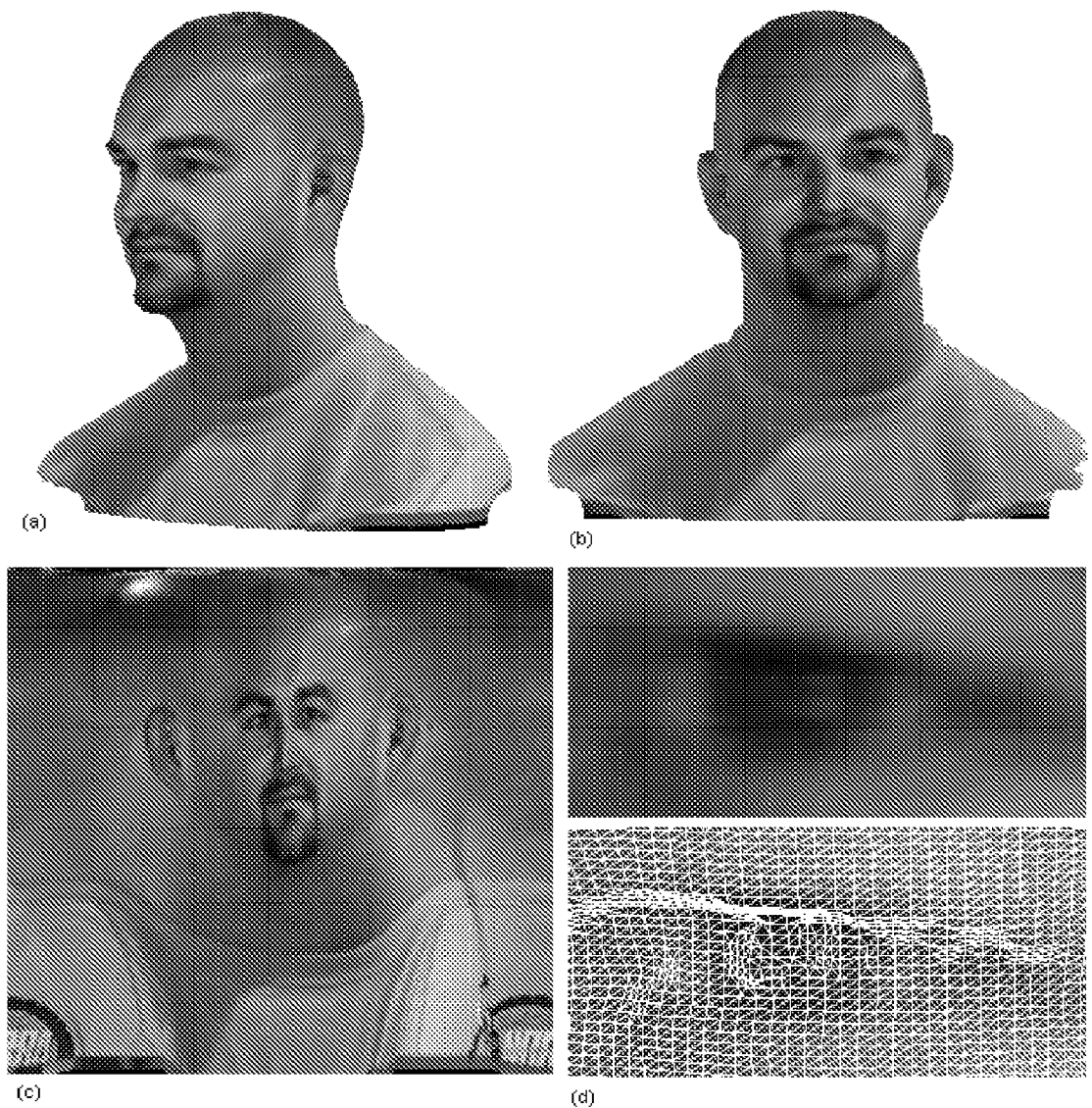
FIG. 4 shows an example of the output from a cylindrical laser scanner according to an embodiment of the present invention.

The 3D training data comprises a set of 3D textured meshes, each one representing a human head. This data can be obtained in more than one way. A 3D acquisition system can be employed to produce such data directly. Examples of such systems are cylindrical and flat laser scanners, structured light systems, and stereo systems. In FIGS. 1-4 there are shown examples of the output of such systems. In reality most of these example of outputs of such systems actually produce 2.5D data. 2.5D data can be visualised as the production of (x, y, z) points from a single viewpoint. Obviously a cylindrical laser scanner produces 3D data since it scans around the object. Additionally one can obtain 3D from multiple 2.5D acquisition systems positioned at different viewpoints. FIG. 1 shows an example of flat laser output showing the 3D vertices in FIG. 1A, the textured 3D mesh in FIG. 1B and the 3D mesh with the polygons displayed as an overlaid wire-frame in FIG. 1C. FIGS. 2A-2C show an example of the output from a structured light system. FIGS. 3A-3C show an example of the output from a stereo system. FIG. 4 shows an example of the output from a cylindrical laser scanner. FIGS. 4A and 4B provide two views of the data. FIG. 4C displays the corresponding texture map and FIG. 4D demonstrates the very high resolution data acquisition by displaying a close up of the left eye with the wire frame overlaid. This example was obtained from the Cyberware™ web-site: (http://www.cyberware.com/samples/index.html#m15)

Figure 5:
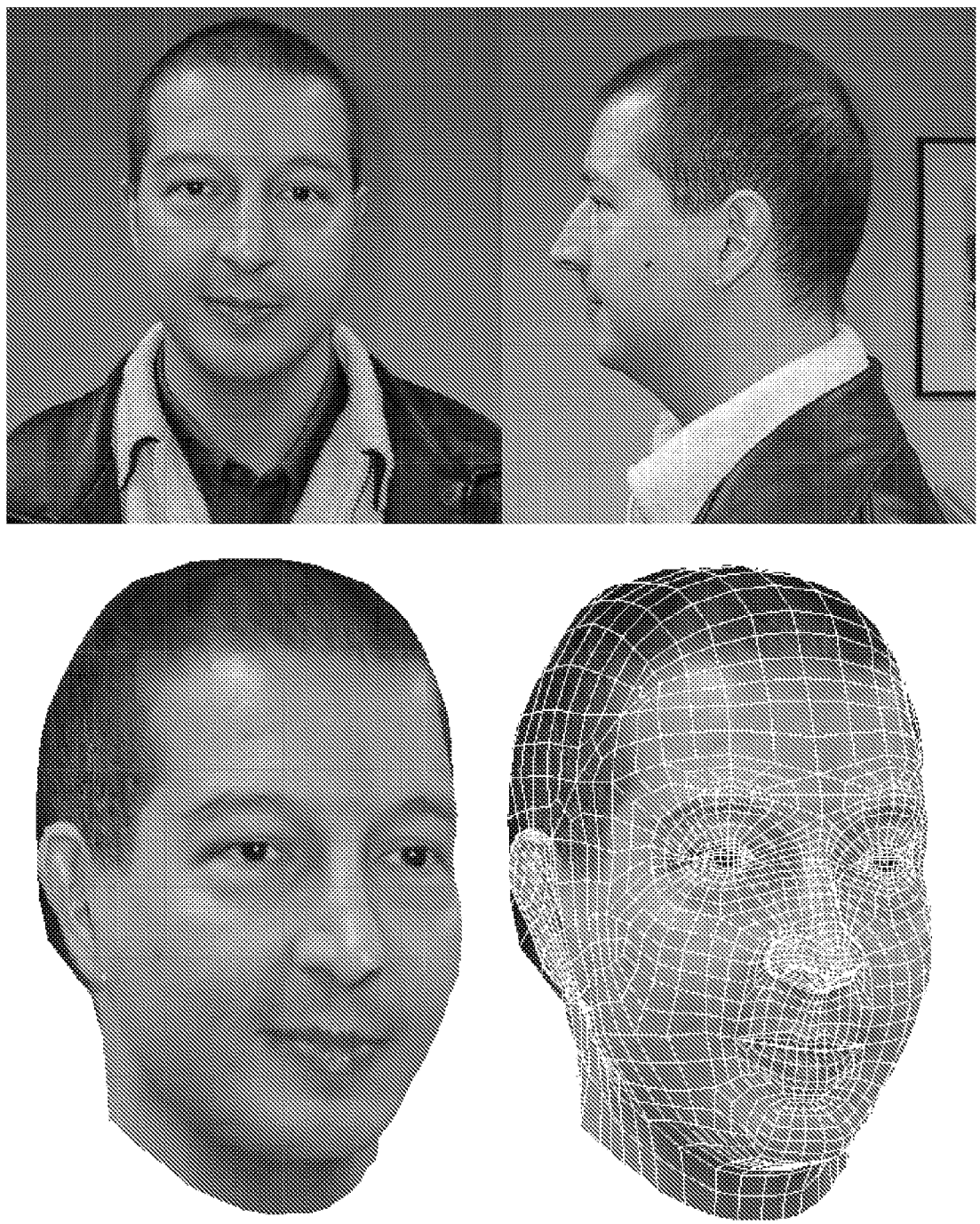
FIG. 5 shows examples of the data obtained using the MugShot algorithm and construction of a 3D head from front and profile images using the CyberExtruder MugShot Pro software according to an embodiment of the present invention.

Alternatively textured 3D head meshes can be obtained by applying the CyberExtruder Mug-Shot algorithm from 2 or 3 images: one front and one or two profiles of the head. Since this technique involves measurements along all three dimensions and provides texture information around the totality of the head it can be considered equivalent to the cylindrical laser scan data. However, the accuracy of this technique is heavily dependent the ability of the operator of the 3D creation software and the quality of the front and profile images. Having said this, the error variance can be minimised by the use of factor analysis (infra Section 2.a.ii). FIG. 5 shows examples of the data obtained using this technique and construction of a 3D head from front and profile images using the CyberExtruder MugShot Pro software. Section 1.c describes the generation of a 3D head from this type of data.

Since all the above types of data can be used in the technique described herein, we shall proceed in the assumption that the Mug-Shot algorithm has been used to construct the 3D training data set, though one should keep in mind that any of the acquisition systems could be used as an alternative.

Figure 6:
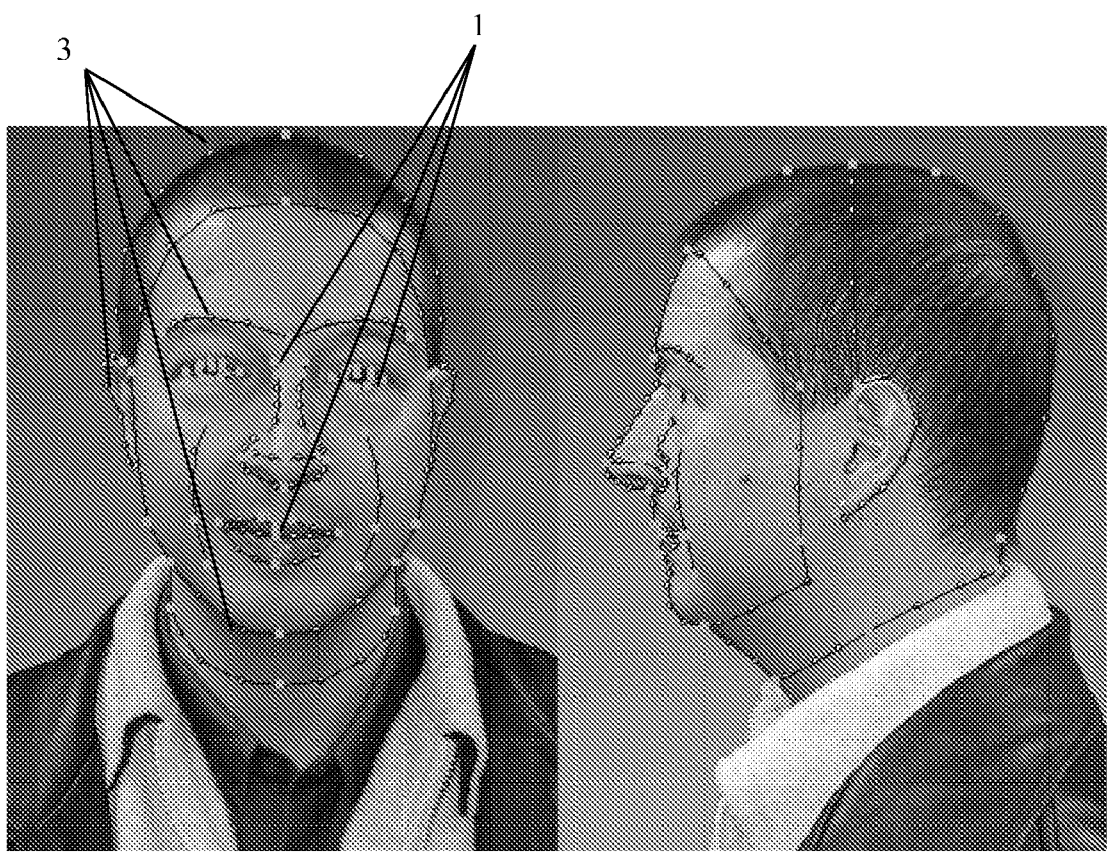
FIG. 6 shows examples of 2D annotations overlaid on facial images according to an embodiment of the present invention.

The CyberExtruder 2D to 3D technique also requires 2D training data. The training data comprises annotated 2D images of people's faces. A 2D annotation is a set of points positioned at anatomically important facial features such as the eyes, nose, mouth, etc. FIG. 6 shows examples of 2D annotations overlaid on facial images. In these examples of a pair of front and profile annotations, the larger square points (or green points) 1 denote positions of important saliency such as the nose tip or an eye corner, the smaller round points (or white points) 3 are used to define lines of saliency such as the cheek outline, or the eye brow ridge outline.

1.a Construction of a Representative 3D Head Mesh

Figure 7:
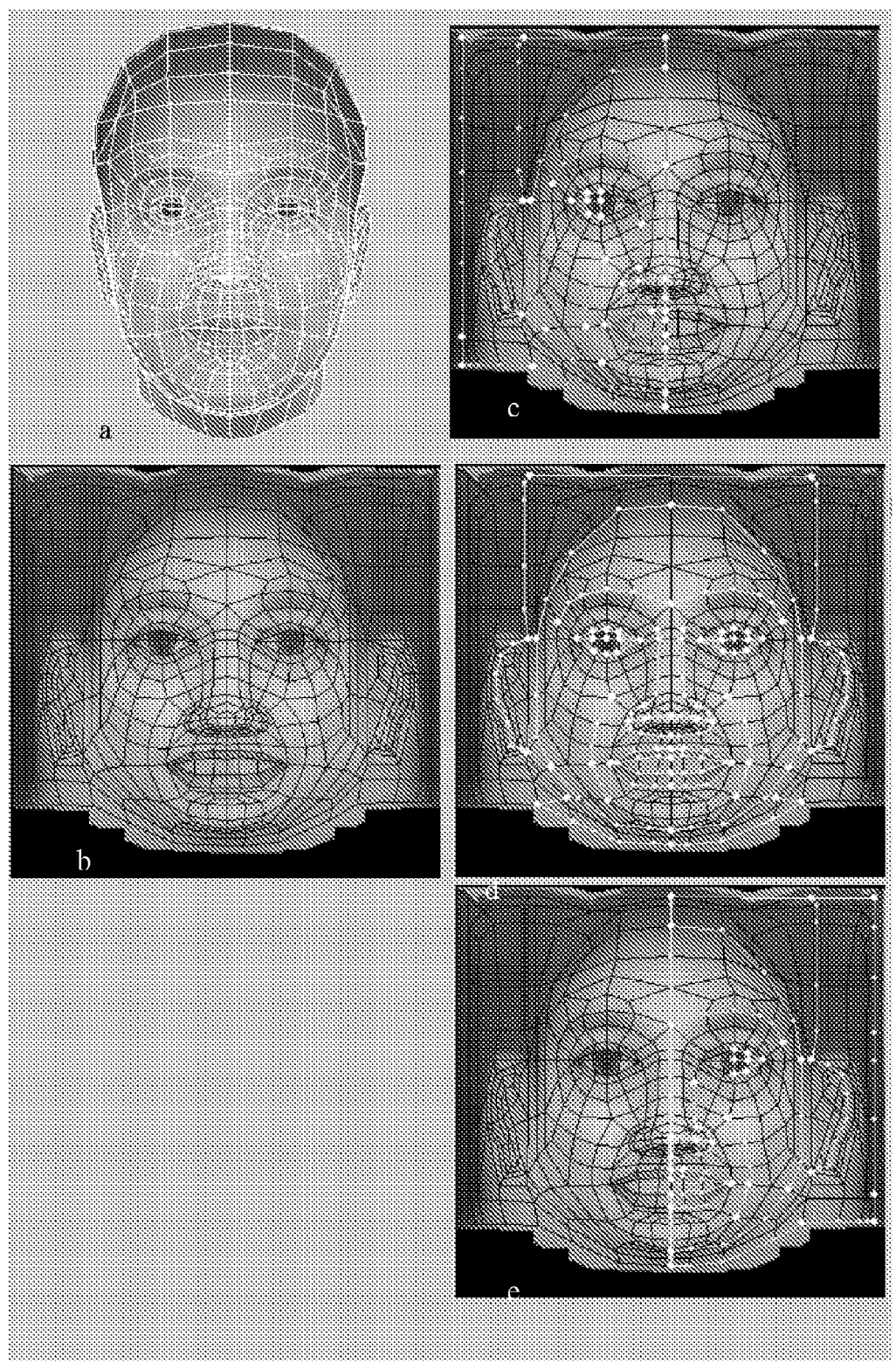
FIG. 7 shows a generic head mesh and the indexed 2D3D annotations according to an embodiment of the present invention.

To construct the algorithms that convert from 2D to 3D an anatomically meaning full 3D mesh and a logical link between the 2D and 3D training data is required. This is facilitated by the construction of a generic 3D mesh containing 2D3D indexed-annotations. This is called the base-head. A 2D3D indexed-annotation has the same anatomical meaning as the 2D annotation; however, the points contained therein are indices to the vertices within the 3D mesh. FIG. 7 demonstrates the generic head mesh and the indexed 2D3D annotations. FIG. 7A (top left) shows a generic base-head 3D mesh. FIG. 7B (middle left) shows a texture map with overlaid texture coordinates and connecting polygons, where each texture coordinate corresponds to a single 3D vertex. FIG. 7C (top right column) shows a right profile indexed annotation. FIG. 7D (middle right) shows a front indexed annotation. FIG. 7E (bottom right) shows a left profile indexed annotation.

1.b Construction of Front and Profile 2D Annotations from the Base Head

Figure 8:
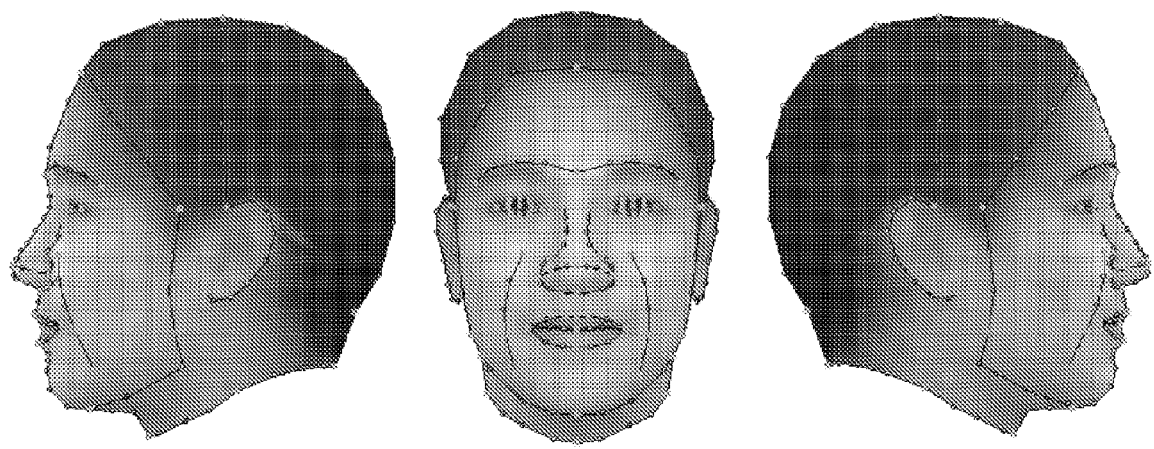
FIG. 8 shows the result of producing a pair of front and profile annotated images from the base head according to an embodiment of the present invention.

Given the generic base-head mesh, and indexed 2D3D annotations, 2D images containing a rendering of the 3D head and the corresponding 2D annotations can be constructed. Rendering from the front and profile viewpoints produces front and profile images. The indexed annotations can then be projected to their corresponding positions on each of the image planes. FIG. 8 shows the result of producing a pair of front and profile annotated images from the base head. This shows a projection of left, front and right indexed annotations to left, front and right rendered viewpoints.

1.c Construction of a 3d Head Mesh from Annotated Front and Profile Images

Producing a 3D head from two images requires knowledge of camera parameters and point correspondence between the two annotated images. The generic 3D base-head provides the point correspondence and the fundamental matrix provides the relative camera position. The fundamental matrix describes the transformation between two cameras and can be calculated from a set of corresponding image points. The fundamental matrix can then be used to triangulate the set of points where the triangulation results in a corresponding set of 3D points. The construction and use of the fundamental matrix is a well-researched topic as described in further detail in Luong & Faugeras: "The Fundamental matrix: theory, algorithms, and stability analysis", IJCV, 1995, and Longuet-Higgins: "A Computer Algorithm for Reconstructing a Scene from Two Projections", Nature 293, 1981, each of which is incorporated herein by reference.

The first step in constructing a 3D head from front and profile images is to annotate each image. The annotations must correspond to the indexed 2D3D annotation. This annotation task is performed manually. FIG. 6 shows an example of such annotations.

Figure 9:
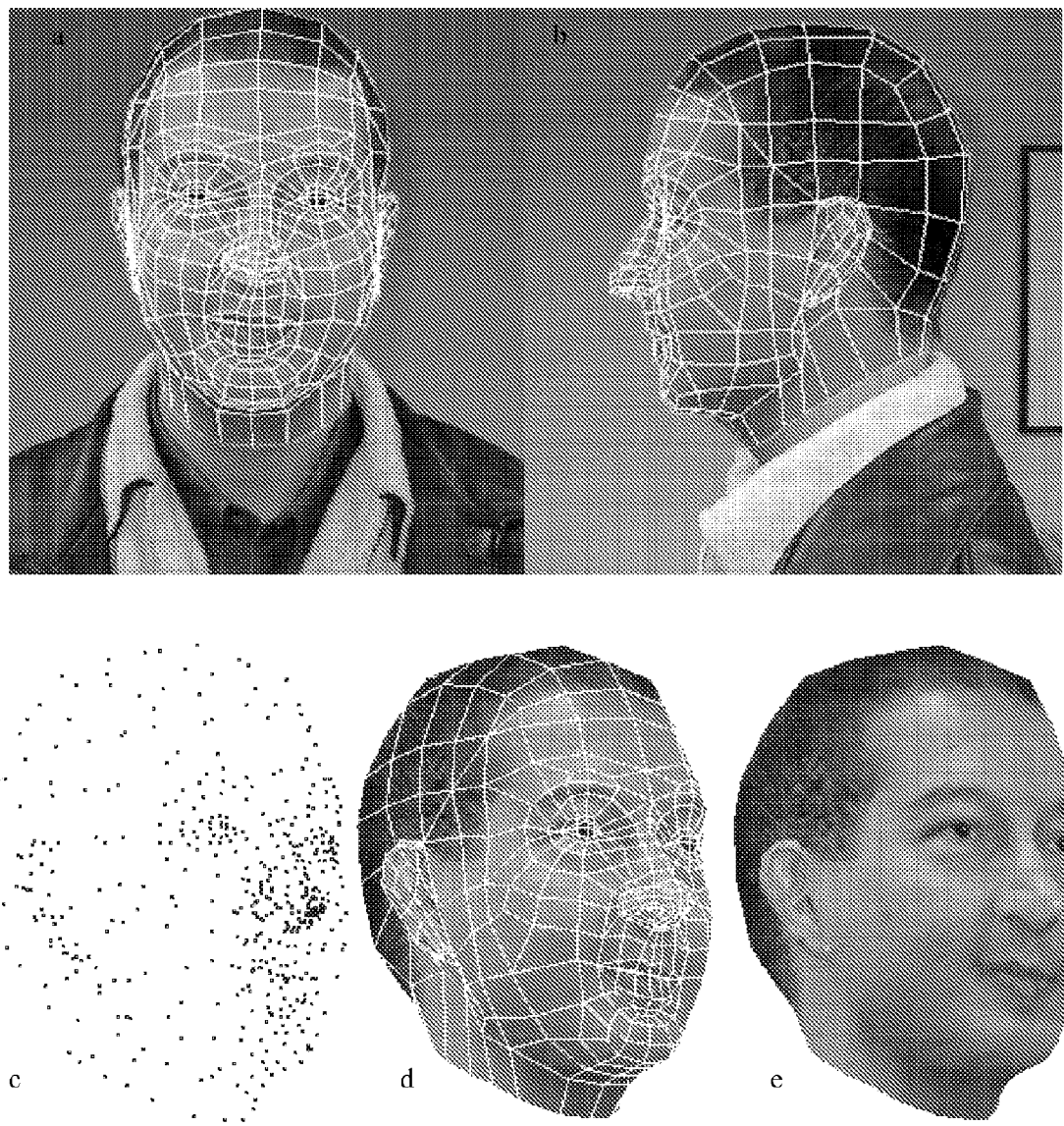
FIGS. 9A and 9B show the solution for the front and profile image set given in FIG. 6 according to an embodiment of the present invention.
FIG. 9C shows the reconstructed 3D points for the front and profile image set given in FIG. 6 according to an embodiment of the present invention.
FIG. 9D shows the reconstructed 3D mesh for the front and profile image set given in FIG. 6 according to an embodiment of the present invention.
FIG. 9E shows a reconstructed head, with texture, for the front and profile image set given in FIG. 6 according to an embodiment of the present invention.

Since each of the 3D vertices in the base-head can be projected onto each viewpoint along with the corresponding 2D annotation (from the indexed annotation, see FIGS. 7 and 8) this provides a first order approximation of the relationship between the 2D annotations and the projected 3D vertices. Thus, the 2D position of each projected 3D vertex on each image via barycentric coordinates with respect to the corresponding triangulation can be estimated. FIGS. 9A and 9B demonstrate the solution for the front and profile image set given in FIG. 6. This results in a dense set of corresponding 2D points that can be used to calculate the fundamental matrix. In effect, the positions of the 2D annotations control the positions of the projected 3D vertices. At this stage the two sets of projected points and the fundamental matrix can be used via triangulation to reconstruct 3D points that correspond to the 2D annotations. The resulting 3D points combined with the polygonal structure of the base-head produces a unique 3D mesh that accurately represents the geometry of the person depicted in the two images. Additionally, it has the same structure (vertex and polygon order) as the base head. FIG. 9C depicts the reconstructed 3D points. FIG. 9D shows the reconstructed 3D mesh, while FIG. 9E shows a reconstructed head (with texture).

Having reconstructed the 3D mesh from the front and profile images (see FIG. 9D) the next stage is the reconstruction of the texture map. At this stage the projected 2D positions of each of the reconstructed 3D vertices are known for each of the images. A texture map is constructed by combining the front and profile images into a single image via the base-head.

The base-head has a texture map that contains a one-to-one correspondence between 3D vertices and 2D texture coordinates. Thus, for each pixel in the base-head texture map a corresponding 3D vertex can be constructed and projected onto both front and profile images. This results in a RGB (color) sample value from each image for every pixel in the base-head texture map. In this way two texture maps are obtained: one from the front facing image, as shown in FIG.

Figure 10:
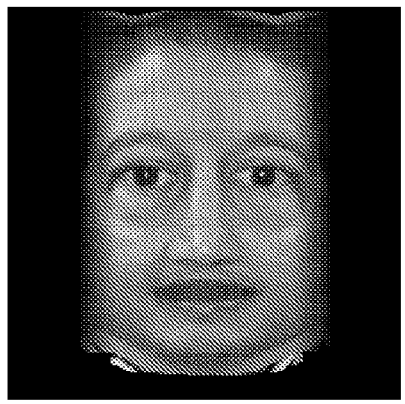
FIG. 10 shows a base-head texture map according to an embodiment of the present invention.
Figure 10:
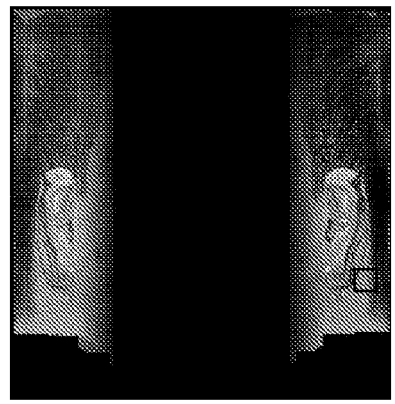
Figure 10:

10A, and one from the side image as shown in FIG. 10B. As shown in FIG. 10C, the final reconstructed texture map is produced by combining these two texture maps with a horizontal blending function at two vertical strips on either side of the face. The blending functions simply to provide a linear combination of the front and profile generated texture maps.

The relative lighting conditions between the front and profile images affect the resulting blended texture map. If the images are taken with uneven ambient light then the resulting texture map will not be even. Sampling a common area, with respect to the human head being reconstructed, is used to compensate for any uneven ambient light. The optimum common area lies on the cheek since this area has an approximately equal reflectance angle (with respect to camera viewpoint) for both front and profile images. To compensate the texture map obtained from the profile image each sampled pixel is altered by equation 1, where p refers to the red, green or blue component of a single pixel.

$$p\text{profile}=(p\text{front sample}-p\text{profile sample})+p\text{profile} \quad \text{Equation 1}$$

This section describes the construction of a 3D head with a unique geometry and texture map and a consistent polygonal structure from annotated front and profile images. Although this example describes one method of obtaining the required training set of 3D meshes, there are many other ways of obtaining this data. If the data is obtained via a 3D acquisition system, then the 3D base-head must be applied to each acquisition to ensure that all the 3D heads have corresponding vertices, texture coordinates and polygons. This is a relatively simple, yet tedious, matter since each 3D head can be annotated in 3D.

1.d Automatic Construction of a Large-Pose Annotated 2D Training Set

Section 1.c, discusses a method of constructing a set of corresponding 3D head meshes using either front and profile images, or a 3D acquisition system with manual 3D annotation. Once such a set has been constructed, it can have more than one use in the CyberExtruder 2D to 3D technique.

Figure 11:
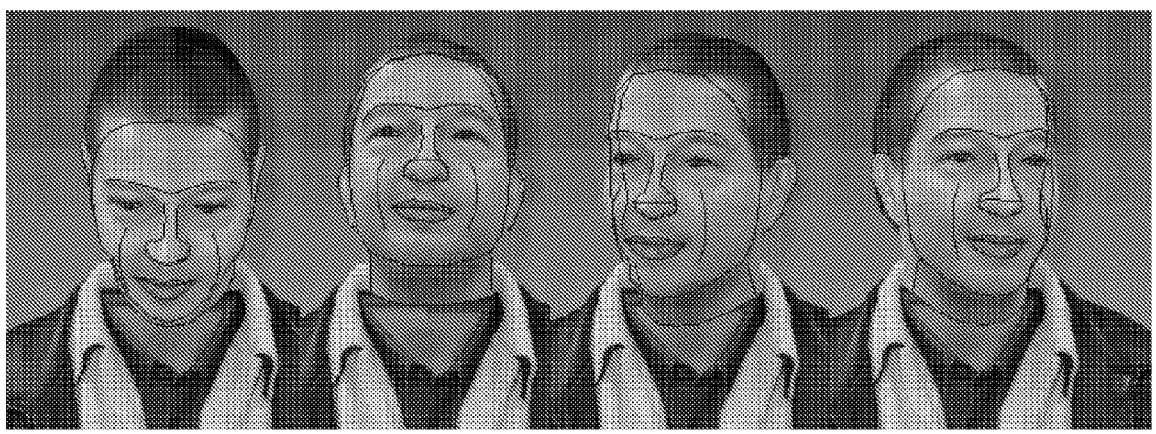
FIG. 11 shows examples of automatically generated annotated 2D images with pose variations from an automatically generated data set according to an embodiment of the present invention.

Since each mesh in the training set of 3D heads has the same structure (same number and order of vertices and polygons with a one-to-one correspondence between vertices and texture coordinates) as the generic mesh they can be used to convert the indexed 2D3D annotation to an exact 2D annotation by simply projecting each of the indexed points onto the image plane. FIG. 7 shows an example of the generic mesh and an indexed annotation and FIG. 8 shows the result of projecting that annotation onto the image plane from two camera viewpoints. In this way the 3D training set can be used to produce a set of annotated 2D images automatically from an infinite set of possible camera viewpoints. Any viewpoint can be produced, at any camera focal length, with exact 2D annotations. Additionally, since the images are rendered the lighting can be manipulated. This flexibility is used to produce an annotated 2D training set containing large pose and lighting variation. The extent and size of this variation is completely controllable. Producing an annotated 2D training set with large pose and lighting variation facilitates the 2D face-finding part of the CyberExtruder technique to generalise to significant off-pose images with large lighting variations. Additionally, this data set facilitates the fitting of the shape projection model described in section 3.d. FIG. 11 demonstrates examples of automatically generated annotated 2D images with pose variations from this automatically generated data set.

2. Building Statistical Models

Before providing a description of the statistical nature of the CyberExtruder 2D to 3D technique it is beneficial to outline the multivariate analysis methods that are useful. Generally, each method produces a parametric description of set of variables. In keeping with the example of conversion of a 2D image of a person's face to a 3D mesh, the multivariate methods would describe the positions of the 2D points (in the annotations), the 3D vertices or the texture pixel values with a reduced set of parametric variables. So, for example, a set of 10,000 3D vertices can be described by a set of 100 parameters. In this way the multivariate methods usually perform two useful processes: (1) a compact representation of the data and (2) a more meaningful representation via a basis change to orthogonal axes. This section describes two methods very briefly since they are described in great detail in the literature in addition to non-linear multivariate techniques, including as described in Heap & Hogg: "Improving Specificity in PDMs using a Hierarchical Approach", British Machine Vision Conference, 1997 and Raiko: "Hierarchical Nonlinear Factor Analysis", Thesis, Helsinki University of Technology, 2001, each incorporated herein by reference. These references may be utilised to provide more specific statistical representations in areas of high non-linearity.

2.a.i Useful Multivariate Methods: PCA

Principal components analysis ("PCA") is a generalised method used for dimensionality reduction. PCA attempts to describe, in an orthogonal way, all of the variance present in a data set. Applying PCA results in a set of vectors and variances. Each variance is ordered in terms of the amount of variance its corresponding vector describes in the original data set. Thus, variances below a certain value (say, less than 0.1% of the total variance) can be discarded resulting in reduced dimensionality. PCA is performed by applying eigen analysis to the matrix of variance and co-variances (C).

Consider a sample population of n observation vectors $X_i$ (where i=1 . . . n). The construction of a covariance matrix (C) from the sample is performed as follows:

$$C=(1/n)\Sigma[(X_i-\mu)(X_i-\mu)'] \quad \text{Equation 2}$$

where, $\mu$=sample mean observation vector (average over n)
$X_i$=current (i'th) observation vector
$\Sigma$=sum over i=1 . . . n
$(X_i-\mu)(X_i-\mu)'$=the tensor product of $(X_i-\mu)$ and its transpose PCA is performed by applying eigen analysis on C resulting in an ordered matrix (E) of orthogonal eigen vectors $e_k$ (k=1 . . . n) and a corresponding ordered set of n eigen values $\lambda_k$ (k=1 . . . n). The eigen values $\lambda_k$ represent the variance in the orthogonal direction depicted by the corresponding eigen vector $e_k$. The sum $\Sigma\lambda_4$, over n provides the total variance present in the sample population. PCA proceeds by selecting only the most important $e_k$. The eigen vectors selected depend on their corresponding variances $\lambda_k$ and their proportion of the total variance $\Sigma\lambda_k$. The selected vectors and variances are termed the principal components. The criterion used to select how many components remain varies depending on the data being described and the use to which the PCA model is to be applied. If only the main variances are required then one might choose the first two components. Often, a screen-test is performed in which the $\lambda_k$ is plotted and the number of components is selected where the graph levels off. Alternatively one might just seek to retain a fixed percentage of the variance, say 98%. Since C is a real symmetric matrix and the application of eigen analysis to real symmetric matrices has been documented many times and is core to many mathematics and statistics coursework the text "Numerical Recipes in C: The Art of Scientific Computing" Cambridge University Press, 1992, incorporated herein by reference, can provide a further description of the technique.

Assuming that m components have been selected the ordered matrix of eigen vectors is reduced to an orthogonal n×m matrix Q which describes the multivariate direction of the m main variances in the sample population. Given an observation vector $X_i$ the parametric representation $p_i$ can be obtained via Equation 4, since Q is orthogonal. Given a parametric representation $p_i$ the corresponding observation vector $X_i$ can be obtained via Eqn 3.

$$X_i = Qp_i + \mu \qquad \text{Equation 3}$$

$$p_i = Q'(X_i - \mu) \qquad \text{Equation 4}$$

2.a.ii Factor Analysis

Factor analysis is analogous to PCA in that it provides a reduced dimensional orthogonal description of a set of observation vectors. However, factor analysis provides two major benefits over PCA. First, it provides an orthogonal description of systematic variance without specific or error variance and, second, it provides a construction method that provides a statistical hypothesis test that the number of parameters selected correctly describe the systematic variation.

$$X = \Lambda p + U + \mu \qquad \text{Equation 5}$$

$$\Sigma = \Lambda\Lambda' + \Psi \qquad \text{Equation 6}$$

Factor analysis assumes a model that pre-supposes that the data can be separated into some common underlying parametric factors (p) that describe how the variables interact with each other (i.e., they describe the co-variance), and specific factors (U). Factor analysis is well suited to pattern recognition since the reality of data always contains some measurement (or specific) error and it is often sought to describe the remaining systematic variability by a set of orthogonal common factors. If the specific error in the data represents only noise and it can be confirmed that there is no noise in the data (U=0) then the model provides the same information and useful structure as PCA. However, if the noise presence is large, then PCA incorporates it into the principal components whereas factor analysis makes provision to model such noise specifically.

Factor analysis results in a matrix of factor loadings ($\Lambda$ in Equation 5) and a diagonal covariance matrix of specific factors ($\Psi$ in Equation 6). The relationship between $\Lambda$ and $\Psi$ is given in Equation 6 where $\Sigma$ represents the sample population covariance matrix with the assumption that the population is multivariate normal. There are two major methods for the computation of factor analysis: (1) principal factor analysis and (2) maximum likelihood factor analysis. Principal factor analysis is applied iteratively via PCA by substitution of the 1's in the correlation matrix with values dependant on the communalities. This is described in Thurstone: "Multiple factor analysis: A development and expansion of the mind" University of Chicago Press, 1947, incorporated herein by reference. This method has the advantage of efficient computation. Maximum likelihood factor analysis has the advantage of producing a solution that includes a significance test of the hypothesis of assuming k common factors. Since knowledge of how many common factors are required to describe the systematic variation in a data set, maximum likelihood estimation is often the best recourse.

Using the factor model (Equation 5) an observation $X_i$ can be approximated by ignoring the specific error ($U_i$) since it is useful to assume that it contains only measurement error, Equation 7 gives the approximation. The factor model can be used to obtain the parametric set of factor scores ($p_i$) via the solution to the system on linear equations given in Equation 8.

$$X_i = \Lambda p_i + \mu \qquad \text{Equation 7}$$

$$\Lambda'\Psi^{-1}(X_i - \mu) = [\Lambda'\Psi^{-1}\Lambda]p_i \qquad \text{Equation 8}$$

Consequently factor analysis can be used to produce a reduced dimensional parametric representation of each observation via Equation 8 and this representation is constructed to describe the fundamental systematic variability with the specific (or error) variability removed. This makes factor analysis a powerful tool when building statistical models that depend on manually annotated data, i.e., it has the ability to remove human error. Methods of maximum likelihood factor analysis are described in Anderson: "An introduction to multivariate statistical analysis" $2^{nd}$ edition, published by John Wiley & sons, 1984, which is incorporated herein by reference.

2.b Shape Models

The CyberExtruder 2D to 3D technique utilises the statistical methods outlined above to build various statistical 2D and 3D shape and texture models. Two basic types of shape model are built: a 2D model and a 3D model. The 2D model is constructed from the set of 2D annotations that were automatically generated via the method described in Section 1.d.

Since a statistical description of fundamental shape variation is sought and each annotation also contains a rigid transformation (scale, rotation and translation) with respect to the average annotation, the rigid transformation is first removed. Given a 2D point x the rigid transformation of this point to a new point x' is given by Equation 9.

$$x' = sRx + t \qquad \text{Equation 9}$$

where, s is a scale factor

R is a rotation matrix t is a translation vector

The rigid transformation from one set of n points (X) to another set (X') can be obtained by minimising the distance between each corresponding point (call this error distance). The solution to the set of linear equations given in Equation 10 minimises the error distance.

$$1. \begin{pmatrix} \Sigma x' & \Sigma y' & n & 0 \\ \Sigma y' & \Sigma x' & 0 & n \\ Q & 0 & \Sigma x' & \Sigma y' \\ 0 & Q & -\Sigma y' & \Sigma x' \end{pmatrix} \begin{pmatrix} s\cos(\theta) \\ s\sin(\theta) \\ tx \\ ty \end{pmatrix} = \begin{pmatrix} \Sigma x \\ \Sigma y \\ A \\ B \end{pmatrix} \qquad \text{Equation 10}$$

where, n is the number of points in each set (must correspond)

s is the optimum scale factor $\theta$ is the optimum rotation angle tx is the optimum translation in the x-dimension ty is the optimum translation in the y-dimension $\Sigma x'$ is the sum of the x-coordinates of all target points x'

$\Sigma y'$ is the sum of the y-coordinates of all target points y'

$\Sigma x$ is the sum of the x-coordinates of all source points x $\Sigma y$ is the sum of the y-coordinates of all source points y Q is the sum of ((x' x')+(y' y')) over all the n points A is the sum of ((x x')+(y y')) over all the n points B is the sum of ((y x')−(x y')) over all the n points Hence, the optimum transformation between two sets of 2D points is obtained by solving Equation 10 for s, t and $\theta$.

A 2D shape model is constructed by first calculating the mean (sometimes vaguely called the average) 2D annotation, Equation 10 is then applied to each annotation in the training set. Each annotation is then converted to an observation vector: as a 2D annotation contains a set of n points, each of which have x and y coordinates. For each annotation an observation vector is constructed by concatenating the (x, y) coordinates of all the points. Thus, the observation has 2n elements.

The statistical 2D shape model is built by first constructing the covariance matrix using Equation 2 and then applying factor analysis via maximum likelihood estimation to the covariance matrix (see Section 2.a.ii). The factor analysis method is used in preference to PCA since the goal is to provide a parametric description of the systematic co-variance. Additionally, since the data ultimately contains some manual (measurement) error the use of factor analysis makes provision for this.

A 3D shape model is constructed in the same way as the 2D shape model. The rigid transformation from one set of corresponding 3D points to another set uses Horn's method of unit quaternions as described in Horn: "Closed-form solution of absolute orientation using unit quaternions" Journal of Optical Society of America A, Vol. 4, p. 629, 1987, incorporated herein by reference, and results in the set of 3D transformation variables (s, R, t) given in Equation 10. The construction of the observation vector proceeds via the concatenation of the (x, y, z) values of each 3D vertex in the mesh into a single vector. Thus, for n vertices the observation vector has length 3n. Again, factor analysis is used for construction of the statistical model to avoid the potential of bias due to measurement error.

2.c Texture Models

The statistical texture models used in the CyberExtruder 2D to 3D technique have two main purposes. First, to improve the specificity of the shape models, and second, to provide a mechanism of incorporating the information between salient points in the 2D and 3D models.

Since 3D texture information is actually stored as a 2D texture map and the texture information in a 2D image is 2 dimensional then only the construction of 2D texture models are described here. There are two types of texture model: (1) local texture and (2) global texture.

2.c.i Local Texture Models

The construction of local texture (LT) models can be considered as statistical representations of local salient 2D features. For example, considering the local area in a 2D image around the outer left eye corner one can see that there is a generic systematic pattern for all eyes. However, one intuitively knows that most eyes are different to some resolution. Thus, this local area is a prime candidate for statistical modelling.

Figure 12:
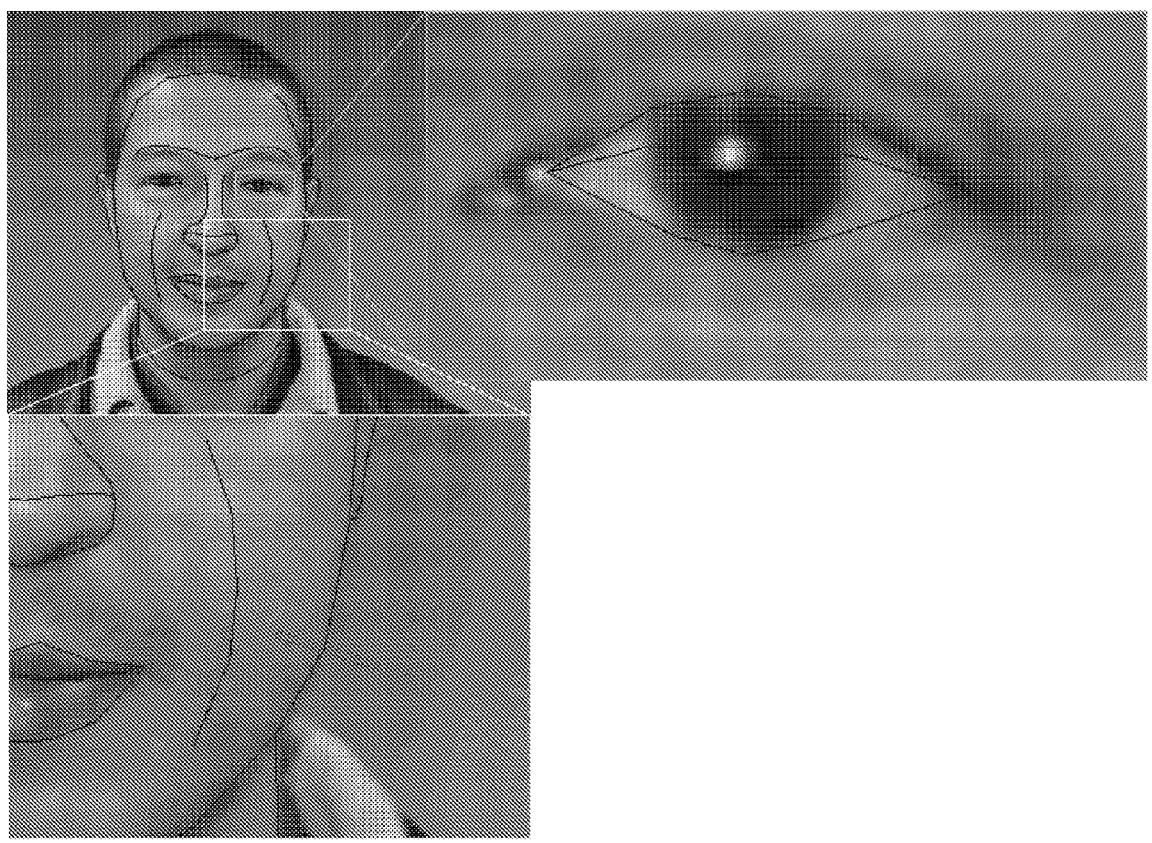
FIG. 12 shows an example of oriented local image patches according to an embodiment of the present invention.

Local texture models are built to enhance the applicability of 2D shape models. They are built from image patches that are extracted at each salient point in the 2D annotations. Continuing with the example of the human eye corner, a rectangular patch is extracted from each image in the training set. Each patch is positioned such that it is centred at the outer left eye corner and oriented with the tangent of the corresponding point on the 2D annotation. FIG. 12 provides an example of oriented local image patches. In the top left of the image there is shown an annotated image showing on the top right an area of close up of the left eye showing oriented image patch extraction of left eye corner and showing on the bottom left an area of close up of the lower left of the face showing an oriented image strip.

For an image patch of size h×w pixels, with each pixel containing an RGB triplet, an observation vector is constructed containing each sampled pixel's RGB triplet; hence the size of the observation vector is 3 hw. Observation vectors are extracted from each image in the 2D training set and used to build a statistical model. Constructing local texture models at each point on the 2D annotation enhances the applicability of the 2D shape model; thus, for n points in the shape model n local texture models are constructed.

The local texture model described above is constructed by sampling RGB triplets in the image patch. This is one type of texture model. Depending on the nature of the salient point that is being modelled improvements in specificity and/or speed can be obtained by utilising a different image patch shape and by transforming the RGB values. For example, a square patch of RGB values provides a useful representation of the eye and lip corners, whereas the points outlining the cheek are better modelled as line of single pixels containing the 1D derivative of the RGB samples, i.e., a color edge. Models resulting from greyscale values tend to be less specific than those containing color information, however, they are more compact and produce algorithms that are faster.

2.c.ii Global Texture Models

The conversion of 2D information to 3D models can be achieved using shape models only. However, if the example of converting a 2D image of a human head to a 3D mesh is considered, it can be seen that much of the information that describes the individual is lost if only shape is considered. The 3D shape of the human head can be constructed, however, because information such as eye color and skin albedo and markings are not represented by shape alone. To provide a mechanism of modelling this information the color information in the 2D image and the 3D texture map is modelled. This is called a global texture (GT) model.

As with the shape models all observations in the data set must correspond. Since human heads have different shapes and sizes texture correspondence must be obtained by first normalizing for shape. The shape of the 2D head is different in each image; hence the 2D GT model requires shape normalisation. The texture information in each 3D textured mesh is stored as a 2D image and already corresponds, hence no shape normalisation is required to build a 3D GT model.

Normalizing for Shape in 2D

Figure 13:
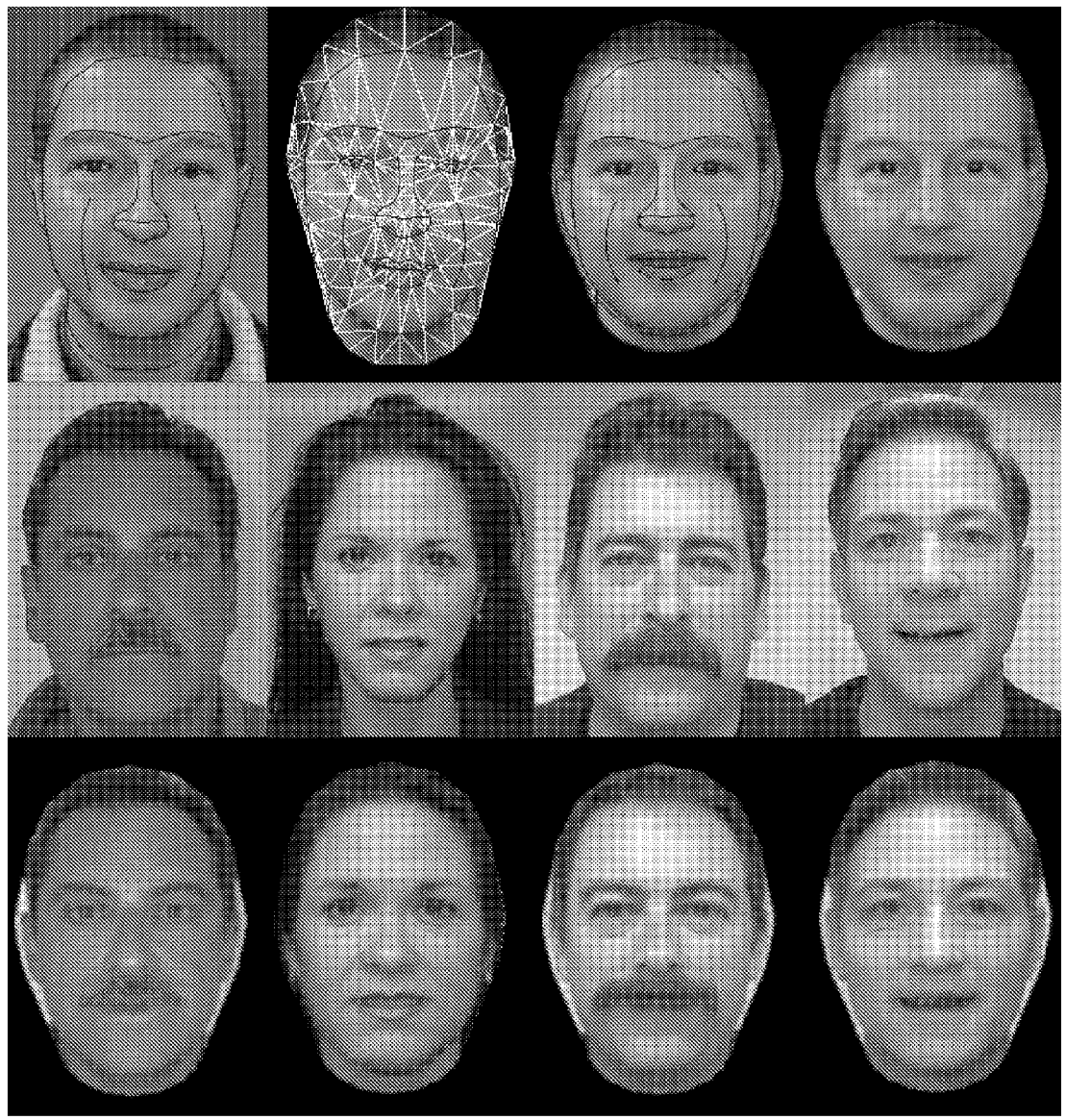
FIG. 13 shows an example of a technique for sampling an image with a 2D annotation according to an embodiment of the present invention.

To provide texture correspondence in a 2D GT model, first normalise for shape. Normalisation is obtained by triangulating the mean 2D annotation using Delauney triangulation as described in Lee & Schachter: "Two Algorithms for Constructing the Delaunay Triangulation", International Journal of Computer and Information Sciences, vol. 9, no. 3; pp. 219, 1980, incorporated herein by reference. The position of each pixel within the mean annotation can therefore be represented as a set of barycentric coordinates from a single triangle. Since the set of triangles can be used to index any set of 2D annotation points the pixels within the mean annotation can be filled by sampling any image with a 2D annotation. Each image is therefore sampled in this way to produce a new set of images with exactly the same shape as the mean annotation. Texture models are then constructed from these new images, which ensure that each pixel corresponds across the training set. FIG. 13 demonstrates this sampling technique. As shown in the top row, from left to right, an original annotated 2D image is converted to a triangulated annotation and then a texture is projected to the mean annotation with the annotation overlaid and a texture is projected to the mean annotation. In the middle row, examples of human front facing images are shown. In the bottom row corresponding textures are projected to the mean annotation for the corresponding images in the middle row.

Constructing a Texture Observation

A GT model observation is constructed by sampling the pixels inside each of the triangles. For speed, this is simply a look-up-table with 2D pixel coordinates as elements. Each sample (or element of the look up table) corresponds to an RGB triplet and, thus, provides three elements to add to the observation vector. The resolution of the GT observation can be reduced or increased simply by scaling the mean annotation.

Normalisation of Pixel Values

Each global texture observation contains RGB triplets with values ranging from 0 to 255. Depending on the data acquisition method used the observations may, or may not, require a light intensity normalisation. For 2D images obtained with a digital camera the likelihood that they were all obtained under the exact same lighting conditions and the likelihood that the model will be applied under those same conditions is extremely low. To provide a compensatory method each global texture observation is normalized to lie in the range 0 to 255.

The 2D shape normalized texture observations and the 3D texture map observations are used to build two statistical GT models representing 2D texture and 3D texture respectively. Maximum likelihood factor analysis is used to construct the models.

2.d Combined Shape and Texture Models 2.d.i Shape and Local Texture Models

The specificity of a 2D statistical shape model can be increased by combining the shape with a local texture model constructed at each point on the 2D annotation. Section 2.c.i describes the construction of an SLT model.

2.d.ii Shape and Global Texture Models

Shape and global texture (SGT) models can be combined to produce a coherent model based description of the data in a training set. As a basic combination one can simply use the models simultaneously. However, since there can be redundant correlation between the two models a statistic combination is used in order to further reduce the dimensionality and provide a more compact representation.

A SGT observation is a weighted concatenation of the shape parameters and the texture parameters. A weighted concatenation is used as the observations have different units (and completely different meanings). There is a single weight for the whole of the SGT model. The weight (w) is the square root of the ratio of the total texture variance to the total shape variance. Thus an SGT observation is constructed by concatenating the weighted shape parameters with the texture parameters.

A statistical SGT model is then constructed using maximum likelihood factor analysis. An example of a weighted SGT model using PCA can be found in Cootes, Edwards & Taylor: "Active appearance models" Proceedings of European Conference on Computer Vision, 1998, which is incorporated herein by reference.

3. Applying the Statistical Models

The application of the shape and local and global texture models is described in this section. The conversion of a 2D image to a 3D object utilises a 2D SLT model, a 2D SGT model, a 3D shape model and a 3D SGT model. In addition to these models there are several algorithms developed to make the process more robust, to increase speed and to facilitate the link between 2D and 3D. The 2D to 3D conversion process follows the flow chart depicted in FIG. 14. Each stage of the process is described in this section along with the explanations of multi-resolution and the acronyms given in the flow chart.

3.a Initialization

The first step, step 100, in the process is the initialization of the multi-resolution 2D shape and local texture model (SLT). Essentially this includes obtaining the first estimate of a 2D annotation given a previously unseen image. In the present example it is approximately locating the face within the image.

Face detection is a large on-going research topic; hence, there are many ways to obtain this approximate location. The method used in the CyberExtruder process, as described herein, requires the training of a neural network to detect faces within images. Since trained neural networks may ultimately fail depending on the conditions under which the image was taken and the variability demonstrated in the training set an additional method incorporates a global face localisation as a fallback position in the case of neural network failure. The neural network is first applied and the suggested face location is investigated using the statistical models. If the network has failed to locate a face then the global face localisation routine is invoked.

3.a.i Neural Networks

Three networks are constructed for face localisation using a standard 3-layer, fully connected, architecture. Back propagation is used to train the each network. Additional details on neural network architecture and back propagation are provided in McClelland & Rumelhart: "Explorations in Parallel Distributed Processing. A handbook of models, programs and exercises", MIT Press, Cambridge Mass., 1998, incorporated herein by reference.

Input

The input to each neural network is a single resized image. One network has an input image of size 32×32 pixels, another network has an input image of size 64×64 pixels and the final network has an input of 128×128 pixels. These networks will be called net32, net64 and net128 respectively.

Output

The output of each neural network provides face position and size. Position is encoded in a set of output units equal to half the size of one side of the input image. So, net32 has 16 units representing the x coordinate and 16 units representing the y coordinate. Size is encoded in an equal set of output units such that each unit represents 2 input pixels. So, net32 has 16 units representing the face size from 2 to 32 pixels in steps of 2 pixels. The total number of output units is: 48 for net32, 96 for net64 and 192 for net128.

Hidden Units

Mirchandini & Cao, "On hidden nodes in neural nets", IEEE Trans, circuits & systems, Vol 36, No 5, p 661, 1989, incorporated herein by reference, showed that the number of hidden units required by a network is set by the number of separable decision regions (M) required by the network output. For J hidden units (less than the number of input dimensions) it can be shown that:

$$J = \log_2 M \qquad \text{Equation 11}$$

Hence, the numbers of separable decision regions are: 4096 ($=16^3$) for net32, 32768 for net64 and 262144 for net128. The numbers of hidden units are: 12 for net32, 15 for net64, and 18 for net128.

Training

The set of annotated 2D images (see section 1.d) is used to create the training patterns for each network. Each image is resized (using bilinear interpolation) to the appropriate network input size and the position and size of the face is calculated from the 2D annotation. Each annotated image therefore represents one training pattern for the back propagation algorithm (see FIG. 15).

Application

Figure 15:
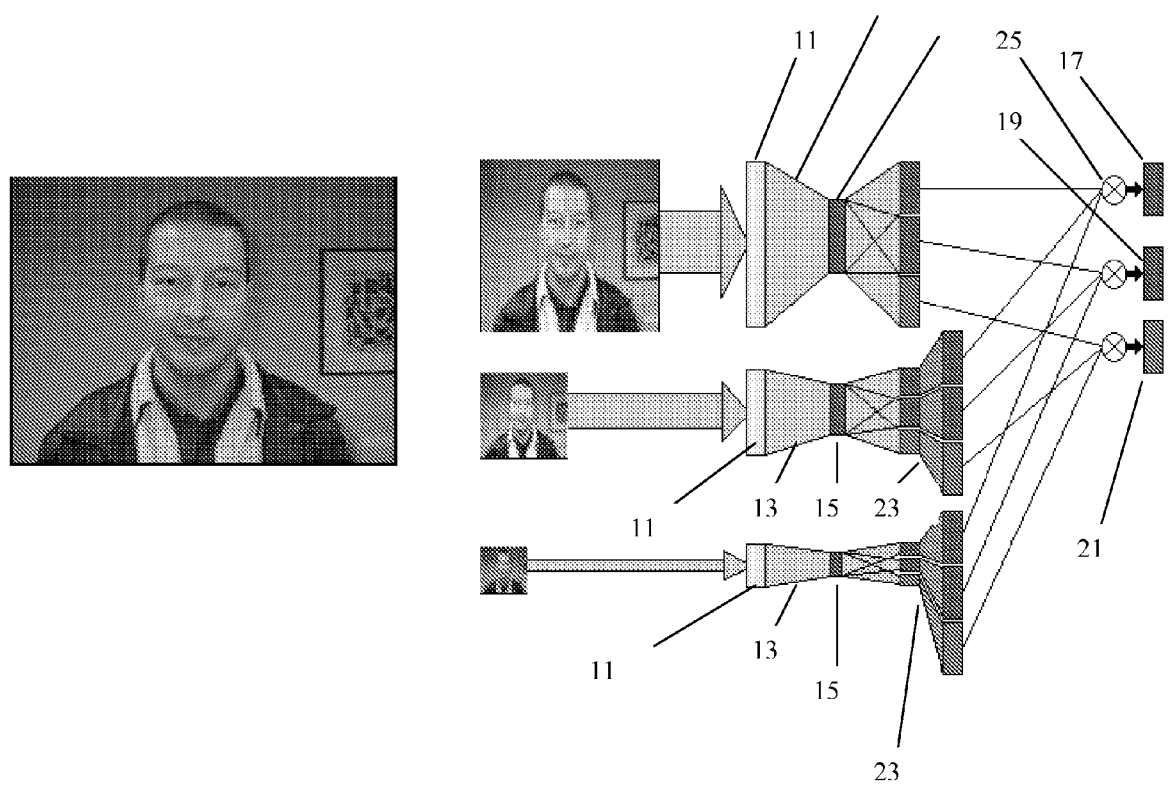
FIG. 15 shows a diagram of a network architecture for face localization according to an embodiment of the present invention.

A new image is resized three times to provide input to each network. Each network is then activated with their respective resized image. The output of each network is rescaled via interpolation to provide 128 units of information for the (x, y) position and size of the face within the image. Each corresponding set of output units are then multiplied together, thus resulting in three sets of 128 units in total. The unit with the maximum value in each set is taken as the value for that variable. FIG. 15 shows the network architecture and the combination of each network's output. The face location neural network architecture shows the original image rescaled (in both x and y) and fed into net32, net64 and net128. The yellow blocks 11 represent the input units for each network. The trapezoids 13 represent a full connection between two groups of units. The brown blocks 15 represent hidden units. The red blocks 17 represent the size, the green blocks 19 represent the x-position and the blue blocks 21 represent the y-position outputs. The dark grey trapezoids 23 represent simple output scaling via linear interpolation. The circles containing crosses 25 represent the multiplication of the three inputs they receive.

3.a.ii Global Initialization

Should the trained neural network described in section 3.a.i fail to produce a successful face detection the global initialization algorithm is invoked. While the global search is significantly slower than the neural network, it is more robust. The global search strategy proceeds by arranging a set of grid points on the input image. A limited number of iterations of the 2D statistical shape model search algorithm (see section 3.b) are applied at each point on the grid at various initial sizes. The grid point and initial size that results in the best fit is taken as the initial face location since it provides position and size.

3.b Applying SLT Models

Figure 14:
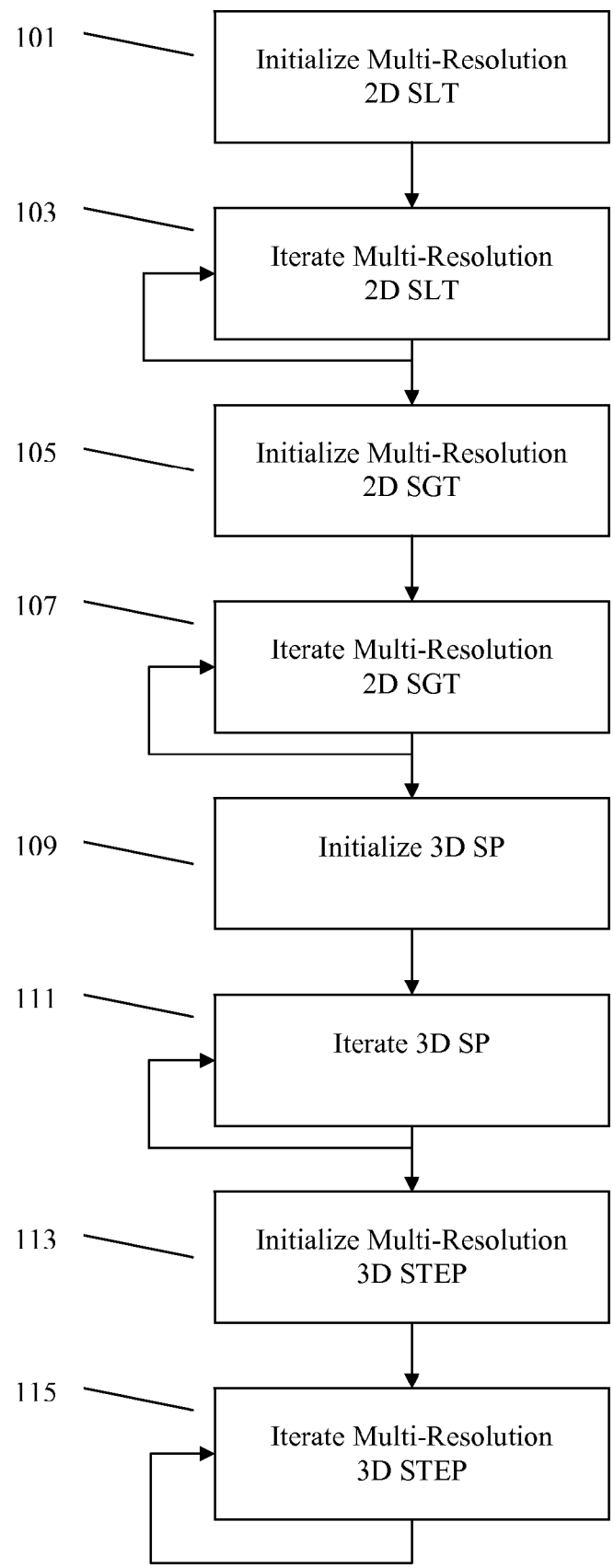
FIG. 14 shows a flow diagram of a 2D to 3D conversion process according to an embodiment of the present invention
Figure 16:
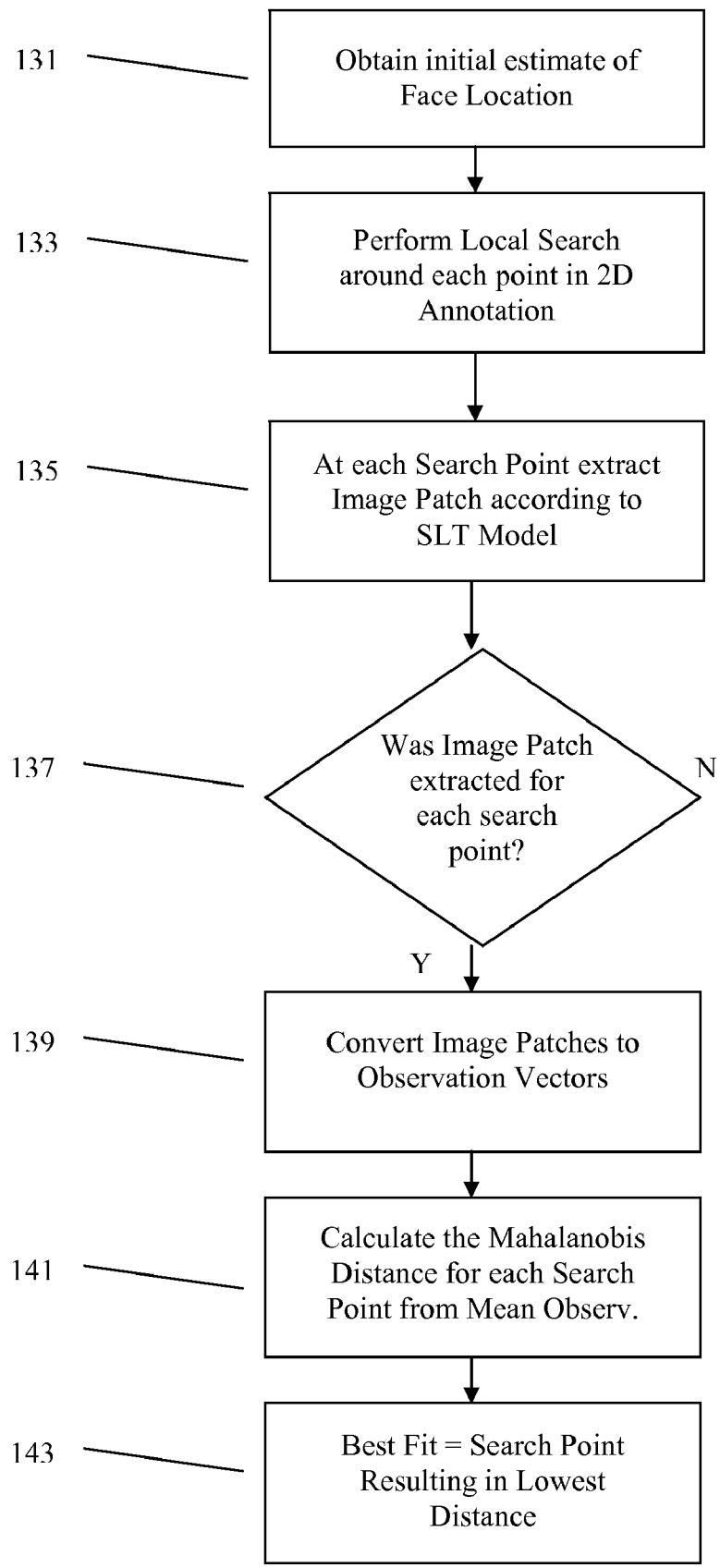
FIG. 16 shows an application of a 2D shape and local texture (SLT) model to the location of a face in an image according to an embodiment of the present invention.

Looking again at FIG. 14, in step 103, the application of a 2D shape and local texture (SLT) model to the location of a face in an image proceeds by undertaking a number of iteration as further shown in FIG. 16.

First, in step 131, an initial estimate of the face location is obtained whether by neural networks (section 3.a.i) or global initialization (section 3.a.ii) or manually, or by simply starting with the mean annotation.

Given the initial estimate, in step 133, a local search is performed around each point in the 2D annotation. In step 135, at each search point an image patch is extracted that satisfies the criteria laid down by the SLT model (i.e., whether searching for edges, square RGB patches or image gradient strips, see section 2.c.i). In step 137, a check is made whether an image patch was extracted for each search point. In step 139, the image patches are converted to observation vectors and their corresponding parametric representation is obtained (using either Equation 4 or Equation 8 depending on whether PCA or factor analysis is used). In step 141, the parametric representation is used to calculate the mahalanobis distance for each search point from the mean observation (the mahalanobis distance is a variance weighted distance that is further described, defined and calculated in the general statistics reference, Anderson: "An introduction to multivariate statistical analysis" $2^{nd}$ edition, published by John Wiley & sons, 1984, that is incorporated herein by reference. Thus, in step 143, a mahalanobis distance is obtained at each local search point; the position resulting in the lowest distance is deemed the best fit of the model.

The best-fit positions of each point in the shape model are used to construct a new 2D annotation. An observation vector is then constructed from the new annotation and passed through the statistical shape model. Equations 3 and 4 are used to pass through a PCA model and equations 7 and 8 are used to pass through the factor analysis model. During the parametric phase of the pass through the parameters are constrained to lie within the variation shown in the training set. In this way a new 2D annotation is constructed from the passed through observation. The new 2D annotation is therefore constrained by the model to represent only shapes that are statistically viable with respect to the training set.

Figure 17:
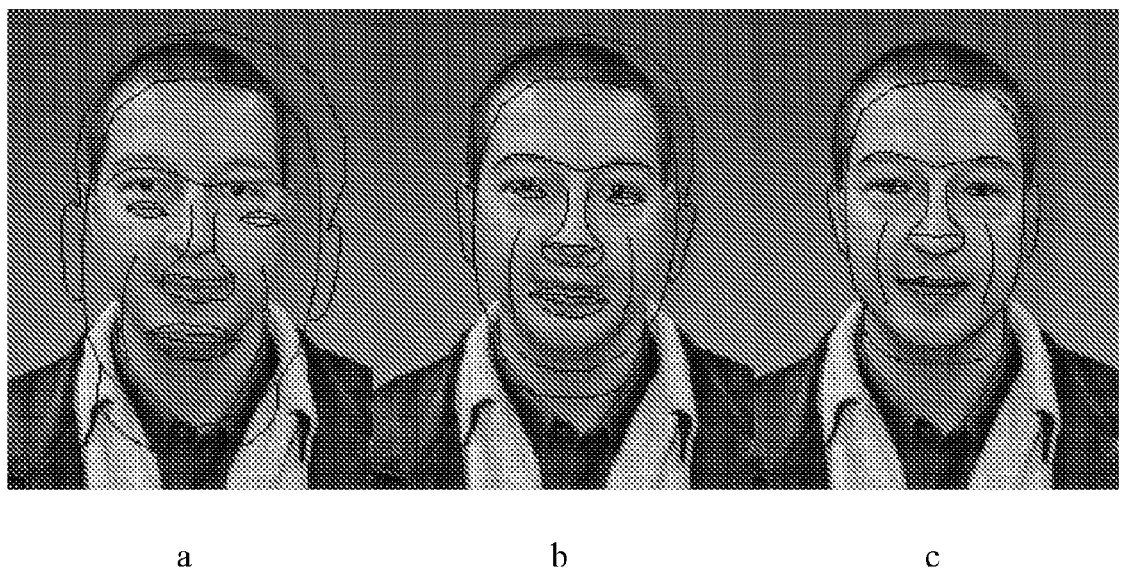
FIG. 17 shows an application of an SLT algorithm for finding faces in 2D images according to an embodiment of the present invention.

The procedure is then iterated until the positions of the 2D annotation points remain unchanged (to some threshold). At this point the algorithm has converged and the shape is declared found. FIG. 17 demonstrates the algorithm for finding faces in 2D images and shows in FIG. 17A an example of the application of a front facing 2D SLT upon initialization, in FIG. 17B after three iterations, and in FIG. 17C upon convergence.

3.c Applying SGT Models

The application of a SGT model requires a method to find the shape and texture parameters that accurately describe the object present in the input image. Looking again at FIG. 14, in step 105, is the initialization of the multi-resolution 2D shape and global texture (SGT) model. Continuing with the example of conversion of a 2D image containing a human head into a textured 3D mesh: the object is to find an accurate parametric shape and texture description of both the 2D face and the 3D head. This is achieved by application of the Generalised Once Only Derivative descent method described in the following section.

3.c.i The Generalised Once Only Derivative Descent Method

The Generalised Once Only Derivative (GOOD) descent method is a locally linear method of fitting a set of parameters to a given data example by the construction of an error derivative matrix that pre-maps the local terrain of the error gradient. In this way, it is similar to gradient descent methods in that it follows the incline of the error terrain to a minimum value. GOOD descent is considered locally linear since the global error surface may be non-linear as a whole but is considered linear locally. Providing a localised linear method of error minimisation is a standard technique used in many areas of engineering and science, such as, for example, control engineering locally linear error minimisation. Gradient descent methods of error minimisation usually require the calculation of an error derivative at each iteration. GOOD descent differs from this method by calculating the error derivatives off-line, and hence, once only.

Assuming that a sample set of n observations $X_i$ (i=1..n) exist, and a function f (X) exists to convert an observation vector X to a parametric vector P and, a function f'(P) also exists to convert P to X, the GOOD descent method begins by pre-calculating the error derivative matrix D by perturbations of the parameters $p_j$ in vector P (j=1 . . . m parameters). The derivative matrix D is calculated using a three-level nested loop as shown in FIG. 18.

Calculation of Derivative Matrix D

Figure 18:
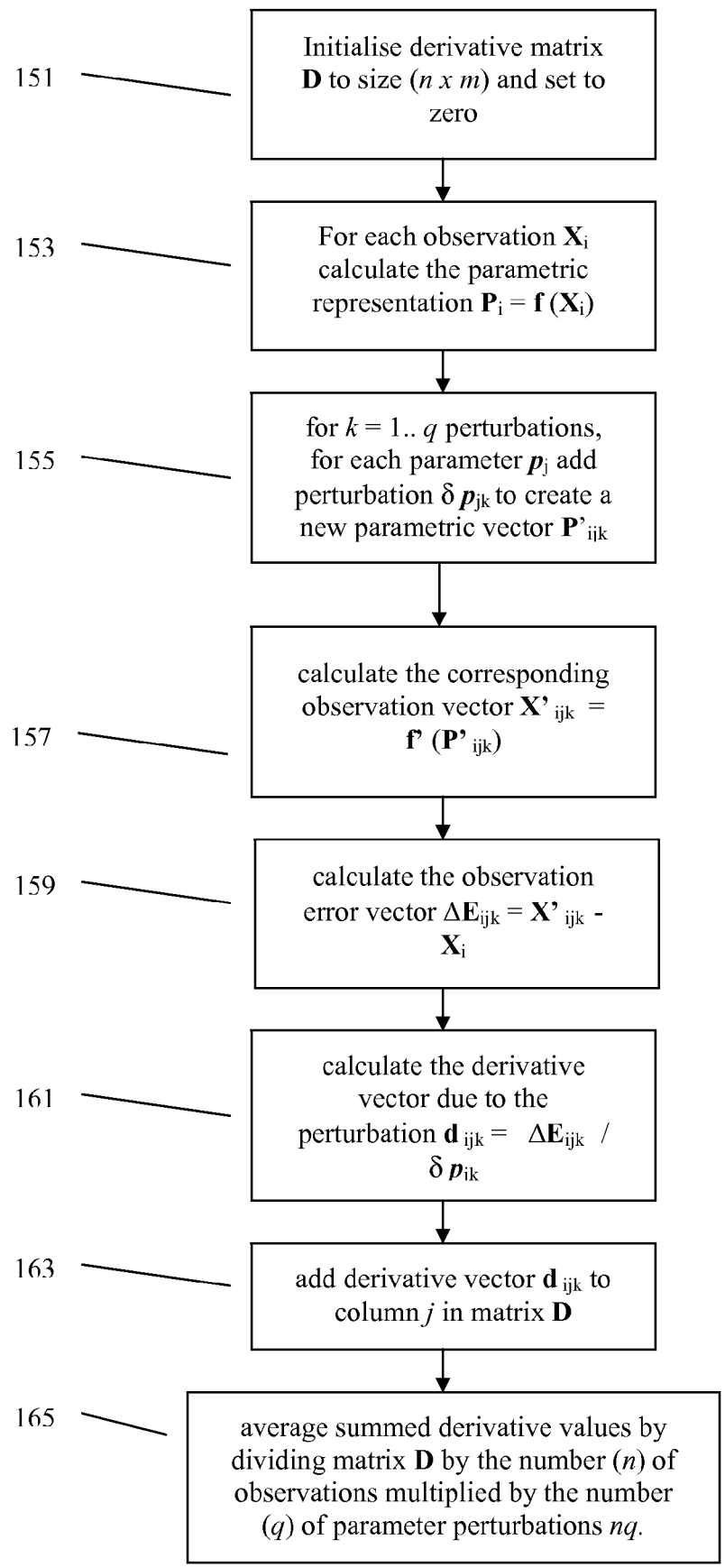
FIG. 18 shows a calculation of a derivative matrix using a three-level nested loop according to an embodiment of the present invention.

Looking now at FIG. 18, in step 151, initialize derivative matrix D to size (n×m) and set to zero. In step 153, for each observation $X_i$ calculate the parametric representation $P_i$=f ($X_i$). In step 155, for k=1 . . . q perturbations, for each parameter $p_j$ add perturbation $\delta p_{jk}$ to create a new parametric vector $P'_{ijk}$. In step 157, calculate the corresponding observation vector $X'_{ijk}$=f' ($P'_{ijk}$). In step 159, calculate the observation error vector $\Delta E_{ijk}$=$X'_{ijk}$−$X_i$. In step 161, calculate the derivative vector due to the perturbation $d_{ijk}$=$\Delta E_{ijk}$/$\delta p_{jk}$. In step 163, add derivative vector $d_{ijk}$ to column j in matrix D. Finally, in step 165, average the summed derivative values by dividing matrix D by the number (n) of observations multiplied by the number (q) of parameter perturbations nq.

The assumption of an existing set of observations is valid if the parametric descriptions are generated by a technique requiring a training set. However, GOOD descent is a generalised method that does not require their existence. The only requirement for the construction of the derivative matrix and its application is the existence of the functions to convert from an observation to parameter space and vice-versa. If the set of observations does not exist it can be generated by conversion from a randomly generated set of parametric vectors. In this case there exists the requirement that the generated observations are in some sense legal, i.e., that a particular combination of $p_j$ does not result in an unobservable X.

Iterative Application

Figure 19:
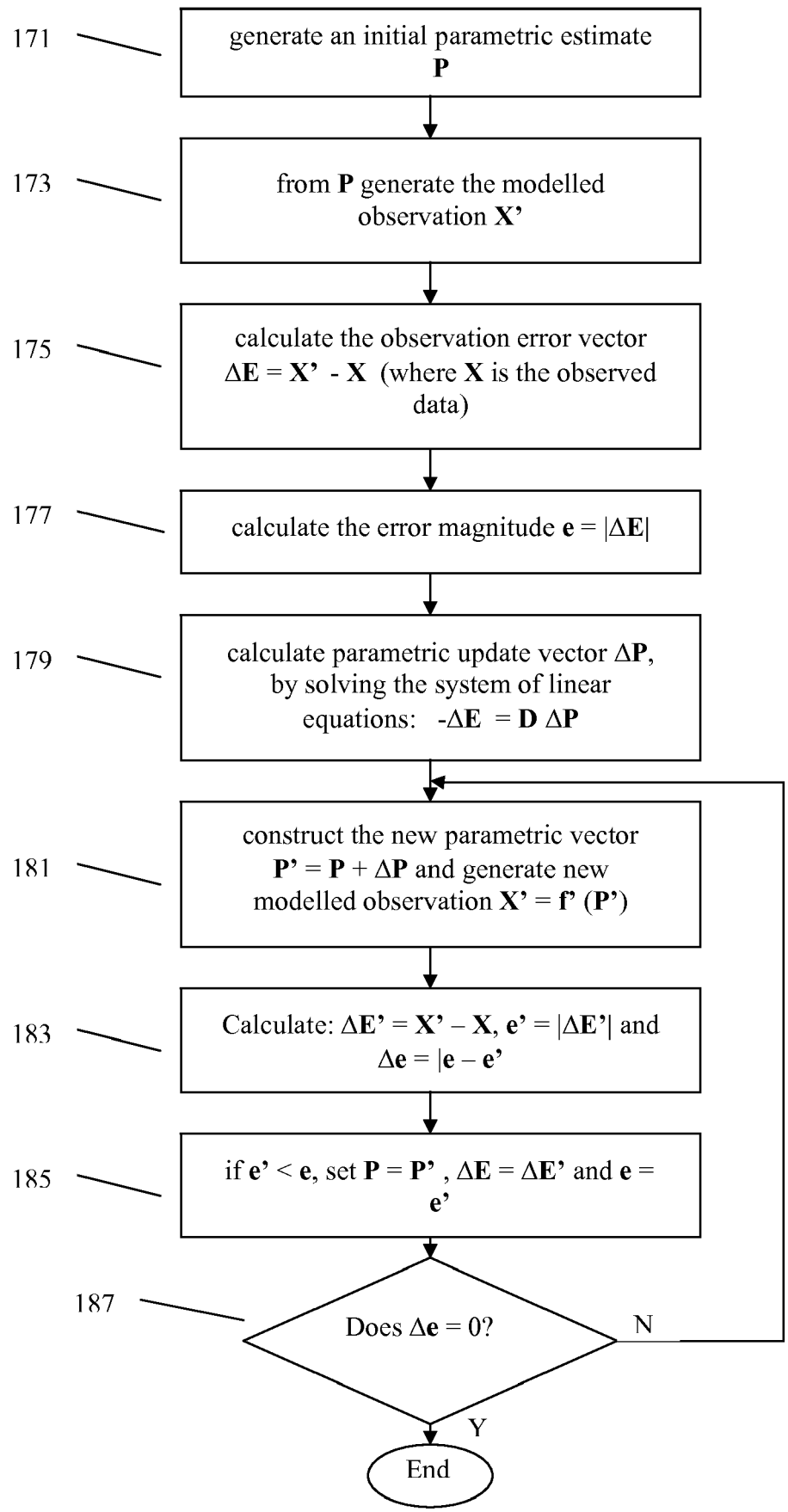
FIG. 19 shows a flow diagram of an iterative method according to an embodiment of the present invention.

The next stage of GOOD descent is the iterative application of the derivative matrix D to a parametric vector P until the model generated observation (X'=f' (P)) fits the observed data, as shown in FIG. 14, step 107. This occurs when Equation 12 equals zero. The method iteratively minimises Equation 12. The flow chart of the iterative method, as shown in FIG. 19 is described below.

$$\min\{\Delta E + D\Delta P\} \qquad \text{Equation 12}$$

where, $\Delta E$ is the difference between the model generated observation and the observed data $\Delta P$ is the incremental parametric update In step 171, generate an initial parametric estimate P (often P is set to the mean parametric vector). In step 173, from P generate the modelled observation X'. In step 175, calculate the observation error vector $\Delta E = X' - X$ (where X is the observed data). In step 177, calculate the error magnitude $e = |\Delta E|$. In step 179, calculate the parametric update vector $\Delta P$, by solving the system of linear equations: $-\Delta E = D \Delta P$. In step 181, construct the new parametric vector $P' = P + \Delta P$ and generate new modelled observation X'=f' (P'). In step 183, calculate new error vector $\Delta E' = X' - X$, and calculate the error magnitude $e' = |\Delta E'|$ and the error change $\Delta e = |e - e'|$. In step 185, if e'<e, set P=P', $\Delta E = \Delta E'$ and e=e'. In step 187, determine whether $\Delta e = 0$. If yes, end the process, and if no, return to step 181.

After convergence ($\Delta e = 0$) the parameter vector P represents the observed data X via the modelled observation X'.

The above description of the GOOD descent method uses the difference between the model generated observation X' and the observed data X as a measure of fit error ($\Delta E$). Clearly the error value can be substituted by a function of X' and X. This is the main reason for the application of GOOD descent in generating 3D from 2D. For example, a modelled observation X' may represent the shape and texture of a 3D mesh and a set of camera parameters. An error function can be constructed that is the difference between the 2D rendering of X' and a 2D image. Thus, GOOD descent facilitates the minimisation of the difference between a 2D image and the parameters describing the 3D object within the image and the camera used to render that object. The resulting convergence provides the 3D mesh and the camera parameters from the 2D image.

The GOOD descent method is dependent on the correct pre-calculation of D, which is, in turn, dependent on the correct setting of the parameter perturbations $\delta p_{jk}$. If a set of training of observations exist the perturbation range can be calculated from the variance represented by each $p_j$. Alternatively one can perform simple experiments using the functions f(X) and f'(P) to obtain suitable perturbation ranges.

The method of obtaining D described above is linear and the iterative application is also linear. Hence, the method may be unsuitable if the error space is highly non-linear. However, in the non-linear case one can either assume a locally linear error space and compute D for each locally linear area or adapt a heuristic for the conversion functions (f and f') to ensure that the method behaves linearly over the required part of the error space, as further described in Heap & Hogg: "Improving Specificity in PDMs using a Hierarchical Approach", British Machine Vision Conference, 1997, and Raiko: "Hierarchical Nonlinear Factor Analysis", Thesis, Helsinki University of Technology, 2001, each is incorporated herein by reference.

GOOD descent is preferred to a standard linear or non-linear minimisation strategy requiring derivatives since the derivative matrix (and its decomposition) is calculated only once rather than at each iteration. The resulting computational speed advantage is significant.

3.c.ii 2D SGT Using GOOD Descent

Figure 20:
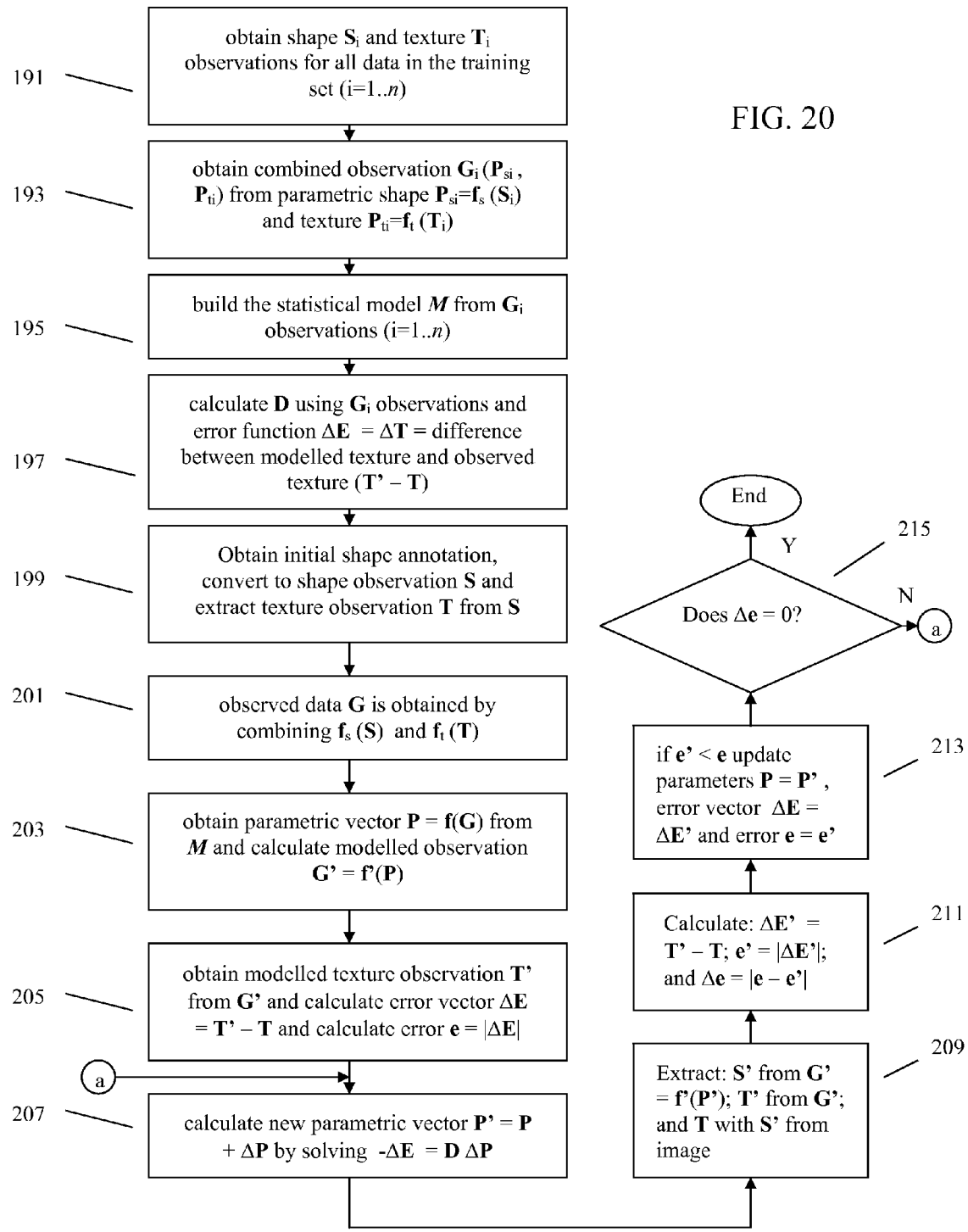
FIG. 20 shows a flow diagram of the application of 2D SGT according to an embodiment of the present invention.

The shape and global texture model can be applied successfully using the GOOD descent method. Continuing with the description of converting 2D images of faces into textured 3D meshes: the parametric conversion functions f and f' are given by equations 4 and 3 for PCA and equations 8 and 7 for factor analysis, respectively. A descriptive flow chart of the application of 2D SGT is shown in FIG. 20 and described as follows:

Once Only Derivative Matrix Calculation

In Step 191, first obtain shape Si and texture Ti observations for all data in the training set (i=1 . . . n). In step 193, obtain combined observation Gi (Psi, Pti) from parametric shape Psi=fs (Si) and texture Pti=ft (Ti), see Section 2.d. In step 195, build the statistical model M from Gi observations (i=1 . . . n). In step 197, calculate D using Gi observations and the error function $\Delta E = \Delta T$=difference between the modelled texture and the observed texture (T'−T).

Iterative Descent

In step 199, an initial shape annotation is obtained using the methods described in Section 3.a. and converted to a shape observation S and a texture observation T is extracted as described in Section 2.c.ii from S. In step 201, observed data G is obtained by combining $f_s$ (S) and $f_t$ (T) as described in Section 2.d.ii. In step 203, obtain parametric vector P=f(G) from M and calculate modelled observation G'=f'(P). In step 205, obtain modelled texture observation T' from G' and calculate error vector $\Delta E = T' - T$ and calculate error $e = |\Delta E|$. In step 207, calculate new parametric vector $P' = P + \Delta P$ by solving $-\Delta E = D \Delta P$. In step 209, extract new modelled shape observation S' from G'=f'(P'), extract new modelled texture observation T' from G' and extract new image texture observation T with S' from image (see Section 2.c.ii). In step 211, calculate new error vector $\Delta E' = T' - T$, and calculate new error $e' = |\Delta E'|$ and $\Delta e = |e - e'|$. In step 213, if e'<e update parameters P=P', error vector $\Delta E = \Delta E'$ and error e=e'. In step 215, determine whether $\Delta e = 0$. If yes, end the process, and if no, return to step 207.

Figure 21:
FIG. 21 shows an example of the application of GOOD descent to a 2D SGT statistical model according to an embodiment of the present invention.

FIG. 21 shows an example of the application of GOOD descent to a 2D SGT statistical model. There is shown in FIG. 21A an original image, in FIG. 21B an initialization from the mean showing the modelled texture t' projected back onto the original image, in FIG. 21C the image after 10 iterations, in FIG. 21D the image after 20 iterations, and in FIG. 21E image convergence after 31 iterations.

3.d 3D Shape Projection Model

A 3D shape projection (SP) model is a statistical model that provides a trainable link between the image of a 3D object and the 3D object itself. The 3D SP model is constructed from 3D shape observations and is applied using the GOOD descent method with 2D shape observations and camera parameters used to calculate the error measure ΔE. The SP model facilitates the automatic estimation of 3D shape and camera parameters from a 2D annotation. Continuing with the example of converting of 2D human heads to 3D head meshes: this section describes the application of 3D SP via GOOD descent to the extraction of 3D head shape from 2D head annotations. Referring again to FIG. 14, in step 109, the 3D SP model is initialized.

As shown in FIG. 14, in step 111, the 3D SP model is iterated. Given the training set of 3D head meshes a statistical factor model of 3D shape is constructed as described in Section 2.a.ii where each shape observation S is the concatenation of the (x, y, z) values of each 3D vertex. For each 3D mesh an infinite number of corresponding 2D annotations can be obtained by projection with camera parameters C, since the camera can have any orientation, position and focal length. C is limited to extrinsic parameters rotation and translation; and one intrinsic parameter: focal length. The camera image height in pixels is arbitrarily fixed at 256 and it is assumed that each pixel is square. A 2D annotation is constructed with camera parameters C and a corresponding 2D3D indexed annotation (see Section 1.d). The resulting 2D annotation is converted to a 2D shape observation vector H via concatenation of the (x, y) annotation points.

GOOD descent is applied to the SP model utilising a parametric vector P constructed from the concatenation of $f_s(S)$ and C. The error measure ΔE is obtained from the difference between an observed 2D annotation observation H and a modelled 2D observation H'. The flow chart for the GOOD descent SP method is shown in FIG. 22 and described below.

Once Only Derivative Matrix Calculation

Figure 22:
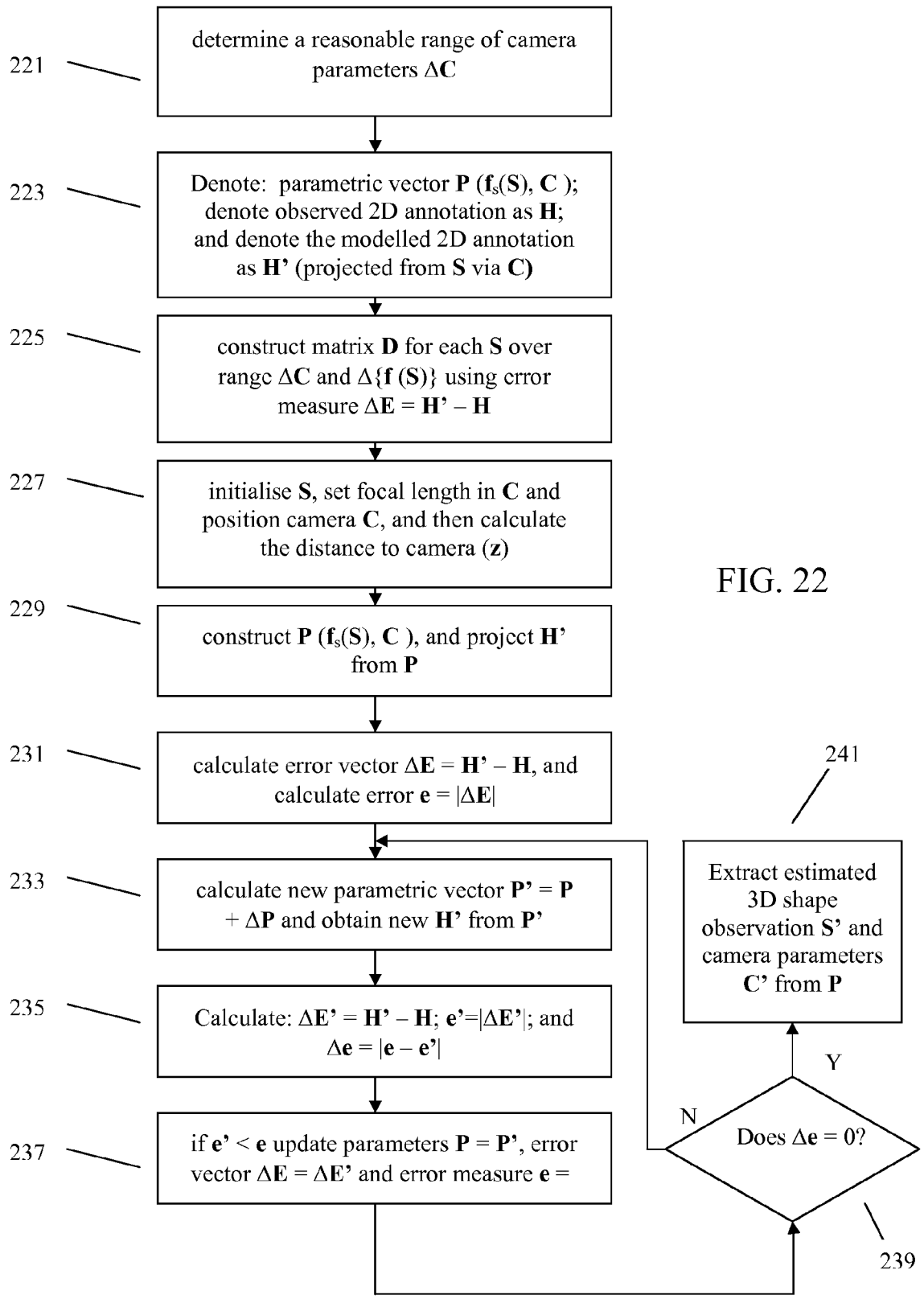
FIG. 22 shows a flow diagram of the GOOD descent SP method according to an embodiment of the present invention.

Looking now at FIG. 22, in step 221, first determine a reasonable range of camera parameters ΔC such that the resulting projected 2D annotation is contained within the image (limits translation) and of a minimum size (limits focal length). In step 223, denote parametric vector P ($f_s(S)$, C), denote observed 2D annotation as H and denote the modelled 2D annotation as H' (projected from S via C). In step 225, construct matrix D for each S over range ΔC and Δ{f (S)} using error measure ΔE=H'−H (difference between the annotation projected from S using C and the observed 2D annotation).

Iterative Descent

In step 227, initialize S to mean 3D shape observation, set focal length in C to mean value in ΔC and position camera C such that it views the centre of H and then calculate the distance to camera (z) such that the height of H' is similar to the height of H (H' is obtained from S via C). In step 229, construct P ($f_s(S)$, C), and project H' from P. In step 231, calculate error vector ΔE=H'−H, and calculate error e=|ΔE|. In step 233, calculate new parametric vector P'=P+ΔP by solving −ΔE=D ΔP and obtain new H' from P'. In step 235, calculate new error vector ΔE'=H'−H, error e'|ΔE'| and error change Δe=|e−e'|. In step 237, if e'<e update parameters P=P', error vector ΔE=ΔE' and error measure e=e'. In step 239, determine whether Δe=0. If no, return to step 233. If yes, in step 241, after convergence (Δe=0) the estimated 3D shape observation S' and camera parameters C' are extracted from P.

Figure 23:
FIG. 23 shows the application of the SP model via GOOD descent to an image containing a 2D annotation according to an embodiment of the present invention.

The GOOD descent SP method is extremely fast since it relies on a small 2D error calculation (ΔE) whilst fitting 3D shape (f(S)) and camera parameters (C). The fact that the observed data H remains constant throughout the iterative process without the need for re-calculation or re-sampling also has a beneficial impact of the speed of the method. Using a standard personal computer (running at 700 MHz) the algorithm converges in less than 5 ms. FIG. 23 demonstrates the application of the SP model via GOOD descent to an image containing a 2D annotation. In this figure, SP via GOOD descent is applied to a face image with 2D annotation. From left to right FIG. 23A shows the original image with original annotation H, FIG. 23B shows the initial projected 2D annotation H', FIG. 23C shows the position of H' after 1 iteration, FIG. 23D shows the position of H' after 4 iterations and FIG. 23E shows the position of H' at convergence requiring 11 iterations.

3.e 3D Shape, Texture and Environment Projection Model

Referring again to FIG. 14, in step 113, a 3D Shape, Texture and Environment Projection (STEP) model is initialized. The 3D STEP model is similar to the SP model described in Section 3.d. A STEP model differs from a SP model by additionally modelling the global 3D texture (see Section 2.c.ii) and 3D environmental lighting. A 3D SGT model is constructed (see Section 2.d.ii) from the training set of textured 3D meshes. The 3D SGT is constructed from shape S and global texture T observations transformed into parametric shape $P_s$ and parametric texture $P_t$ vectors via factor analysis. The final 3D SGT model is then built from weighted concatenated observations G ($P_s$, $P_t$) and transformed (via factor analysis) to parametric vector $P_c$. Thus, given a parametric vector $P_{ci}$, the modelled shape $S_i$ and texture $T_i$ observations can be extracted from $G_i = f'(P_{ci})$, $S = f_s'(P_s)$ and $T = f_t'(P_t)$.

In addition to the combined parameters $P_c$ the STEP model contains camera parameters C and lighting parameters L. Thus, the projective environment parameters Q(C, L) are obtained. Camera parameters are the same as the 3D SP model described in section 3.d. For the example being described here, the lighting parameters L are limited to the horizontal and vertical rotation of a single light source about the centre of the 3D mesh; it's ambient and diffuse content, and RGB colour. Hence, in this description, the lighting parameters have 7 degrees of freedom. The addition of more lighting parameters is easily facilitated though the calculation of the lighting effects becomes mode computationally expensive with additional light sources. For the continuing example of conversion of 2D heads to 3D textured meshes, modelling the specular reflectance of the 3D object material is omitted since it can be assumed to be constant for human flesh and already present in the 3D texture maps.

The 3D STEP model therefore has a parametric vector P, representing the parametric shape and texture $P_c$, the camera parameters C and the lighting parameters L. The 3D STEP model is iterated as shown in FIG. 14, step 115.

The STEP model is similar to the SP model in that it utilises the projection of the 3D mesh (S, T) via C with lighting parameters L onto the 2D image plane. The SP projection is a simple perspective projection of 3D points. The STEP projection requires the rendering of the textured 3D mesh (S, T). The rendering can be implemented explicitly using a standard rendering technique (such as Phong or Gouraud). However, utilising graphics hardware with the STEP model creates a huge advantage in computational speed without significant loss of rendering quality. Obviously the rendering quality depends on the graphics card used within the computer.

Figure 24:
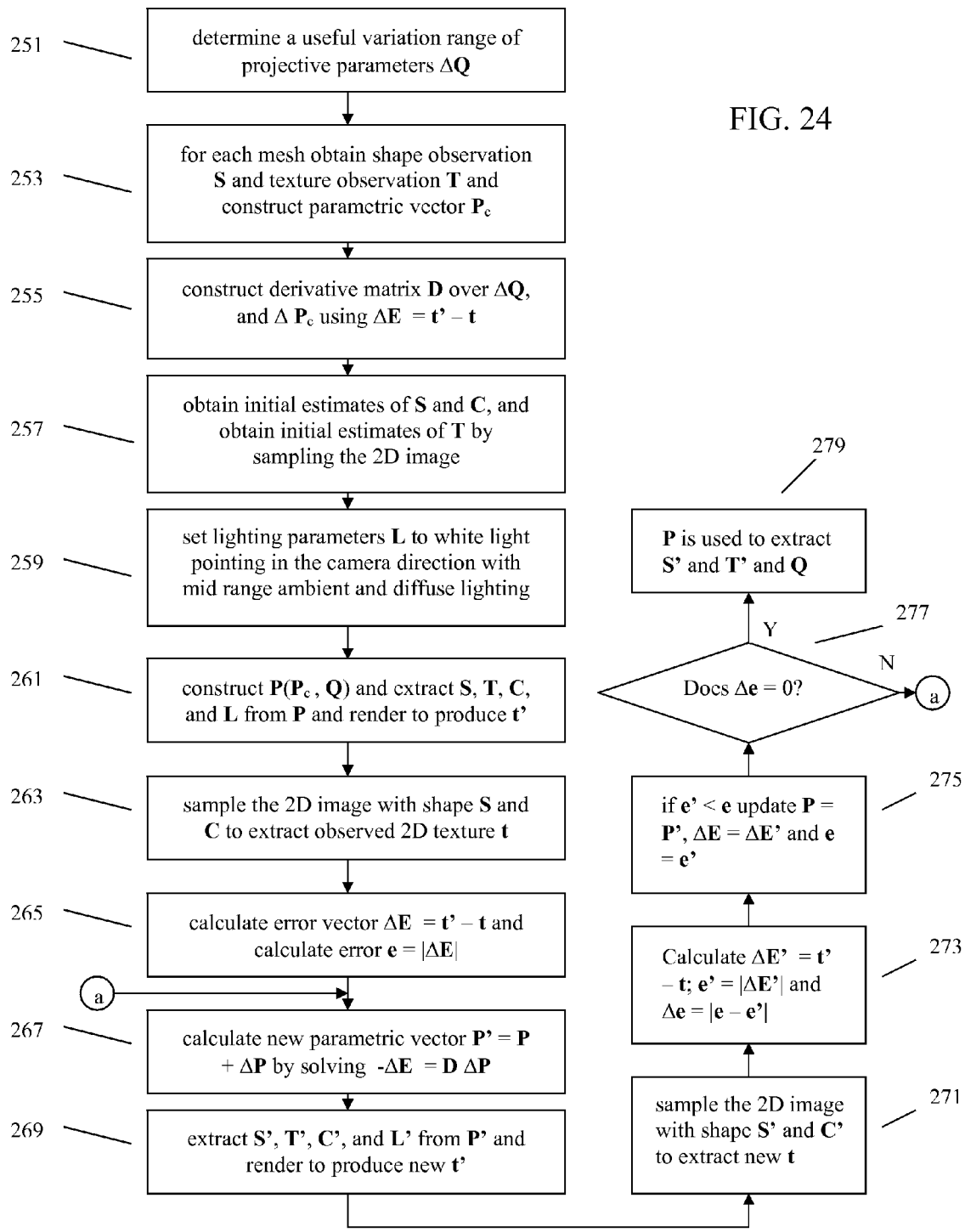
FIG. 24 shows application of the STEP model via the GOOD descent method according to an embodiment of the present invention.

As shown in FIG. 24, the STEP model is applied via the GOOD descent method using the difference between the 2D texture rendered via the model t' and the observed 2D texture t as the error vector ΔE=t'−t Once Only Derivative Matrix Calculation Looking at FIG. 24, in step 251, first determine a useful variation range of projective parameters ΔQ. In step 253, for each mesh in the 3D training set obtain shape observation S and texture observation T and construct parametric vector $P_c$. In step 255, construct derivative matrix D over projective parametric range $\Delta Q$, and SGT range $\Delta P_c$ using the 2D rendered error measure $\Delta E=t'-t$ Iterative Descent In step 257, obtain initial estimates of S and C using the SP model described in Section 3.d, and obtain initial estimates of T by sampling the 2D image (see Sections 1.c and 2.c.ii). In step 259, set lighting parameters L to white light pointing in the camera direction with mid range ambient and diffuse lighting. In step 261, construct parametric vector $P(P_c, Q)$ and extract S, T, C, and L from P and render to produce t'. In step 263, sample the 2D image with shape S and C to extract observed 2D texture t. In step 265, calculate error vector $\Delta E=t'-t$ and calculate error $e=|\Delta E|$. In step 267, calculate new parametric vector $P'=P+\Delta P$ by solving $-\Delta E=D \Delta P$. In step 269, extract S', T', C', and L' from P' and render to produce new 2D texture estimate t'. In step 271, sample the 2D image with shape S' and C' to extract new observed 2D texture t. In step 273, calculate new error vector $\Delta E'=t'-t$, error $e'=|\Delta E'|$ and $\Delta e=|e-e'|$. In step 275, if $e'<e$ update parameters $P=P'$, error vector $\Delta E=\Delta E'$ and error measure $e=e'$. In step 277, determine whether $\Delta e=0$. If no, return to step 267. If yes, in step 279, after convergence ($\Delta e=0$) the parametric vector P is used to extract the modelled 3D mesh (S', T') and camera and lighting parameters Q.

Figure 25:
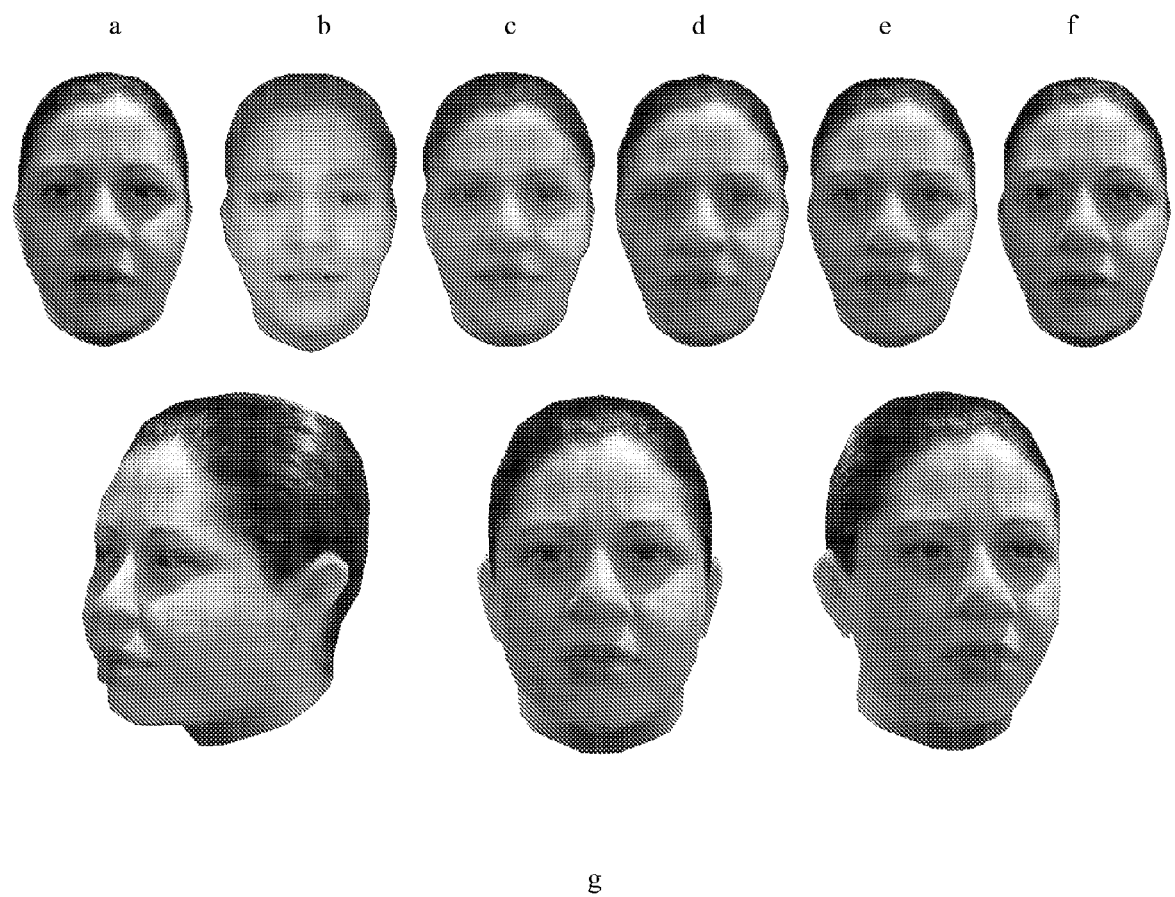
FIG. 25 shows an example of applying the STEP model via GOOD descent to a 2D image containing a face according to an embodiment of the present invention.

FIG. 25 shows an example of applying the STEP model via GOOD descent to a 2D image containing a face. As shown in the top row from left to right, FIG. 25A shows an original image with face segmented via 2D SGT, FIG. 25B shows an initialization from mean 3D head showing model estimates t', FIGS. 25C-25E show snap shots of t' throughout the iterative process and FIG. 25F shows the final t' after convergence in 41 iterations. In the bottom row, FIG. 25G shows resulting modelled 3D textured mesh (S' & T') rendered from different camera viewpoints with model fitted lighting parameters L.

3.f Multi-Resolution Models

The application of all the models (with the exception of the SP model) described in this document can be made faster and more robust by the use of multi-resolution techniques. For 2D models multi-resolution image pyramids significantly increase speed and robustness. Additionally, utilising multi-resolution texture map pyramids, and multi-resolution derivative matrices within the GOOD descent method, significantly improves the speed of applying the 3D STEP model whilst maintaining its robustness. This section describes the use of multi-resolution techniques to improve speed and robustness in both 2D and 3D.

3.f.i Multi-Resolution SLT

Figure 26:
FIG. 26 shows an example of an inverted half resolution step image pyramid according to an embodiment of the present invention.

Recalling the shape and local texture model (Sections 2.b, 2.ci and 2.di) and its application to a 2D image (Section 3.b) the local image patches have a fixed size in pixels. An inverted-image pyramid is constructed such that each sub-image has half the resolution of its immediate parent. Smoothing and sampling are used to achieve the reduction in resolution. FIG. 26 demonstrates an example of an inverted half resolution step image pyramid. There is shown a half resolution step, three level inverted image pyramid, showing rescaled 2D annotations.

Since the size in pixels of an image patch in a local texture model remains constant then the area covered by the patch in the lower resolution image represents a larger proportion of the image at all resolutions. Separate LT models are built at each image resolution. Thus, for a 5 level pyramid one has 5 LT models per 2D annotation point. The 2D shape model is built only once since the 2D shape information remains constant regardless of the image resolution.

The application of the multi-resolution 2D SLT model begins with the lowest resolution image in the pyramid and proceeds as described in Section 3.b. After convergence at this level, the resulting 2D annotation is scaled and transferred to the next level of the pyramid and the SLT model at this resolution is invoked. This process continues until convergence is achieved at the original image resolution at which point the shape is declared found.

Using the multi-resolution approach for 2D SLT models increases the 2D distance from which the model can converge since the lower resolution LT models cover a proportionally larger original image area. Additionally, the multi-resolution approach increases the overall speed of the method since the distance traveled at lower resolutions is greater whilst maintaining the specificity of the highest resolution model.

3.f.ii Multi-Resolution SGT

Recalling the shape and global texture model (Sections 2.b and 2.c.ii) and its application to a 2D image (Section 3.c.ii) the size of the texture observation vector is determined by the number of pixels being sampled within the normalized shape image. Since the SGT is applied via the GOOD descent method using an error vector that is the subtraction of two texture vectors representing sampled positions within the 2D image, it follows that the update to the parametric vector ($\Delta P$) is larger if the samples are obtained at a greater distance from each other. Hence, obtaining texture vectors from lower resolution images creates a larger parameter update vector. This facilitates lower resolution SGT models to travel larger 2D distances without becoming stuck in a local minimum; hence, an increase in robustness is achieved. Utilising a multi-resolution image pyramid facilitates larger distances to be traveled at lower resolutions whilst maintaining specificity at higher resolutions.

Figure 27:
FIG. 27 shows the application of a multi-resolution SGT model via GOOD descent according to an embodiment of the present invention.

The construction of a multi-resolution SGT model begins with the construction of a multi-resolution inverted image pyramid as described in Section 3.f.i. The 2D shape model is built only once since it remains constant to scale for all resolutions. A combined shape and global texture model is constructed as detailed in Section 2.d.ii for each resolution of the pyramid. The multi-resolution SGT model is applied via GOOD descent starting at the lowest resolution using the method described in Section 3.c.i. After convergence, the 2D shape annotation is scaled and transferred to the next level of the pyramid and the corresponding SGT model continues from there. The process is repeated until convergence at the highest resolution of the image pyramid. FIG. 27 demonstrates the application of a multi-resolution SGT model via GOOD descent. As shown from left to right in FIG. 27A is an original image, in FIG. 27B is an initialization with mean at lowest image resolution, in FIG. 27C is a convergence at lowest resolution, in FIG. 27D is a convergence at next resolution and in FIG. 27E is a convergence at highest resolution.

3.f.iii Multi-Resolution STEP

The GOOD descent application of the Shape, Texture and Environment Projection (STEP) model (Section 3.e) uses two 2D images with different meanings at each iteration: a 2D image representing the 3D texture map and a rendered/sampled 2D image used to construct the error vector (t'-t). A multi-resolution STEP model is built by the construction of two inverted image pyramids. The input image (to which the STEP model will be fitted) forms one of the inverted pyramids and the texture map forms the second. Each pyramid level corresponds to the level in the other pyramid in the sense that it is used to build and apply the texture observation T and the sampled 2D texture t. The 3D shape model is built once only since the 3D shape information remains constant regardless of either image resolution.

Figure 28:
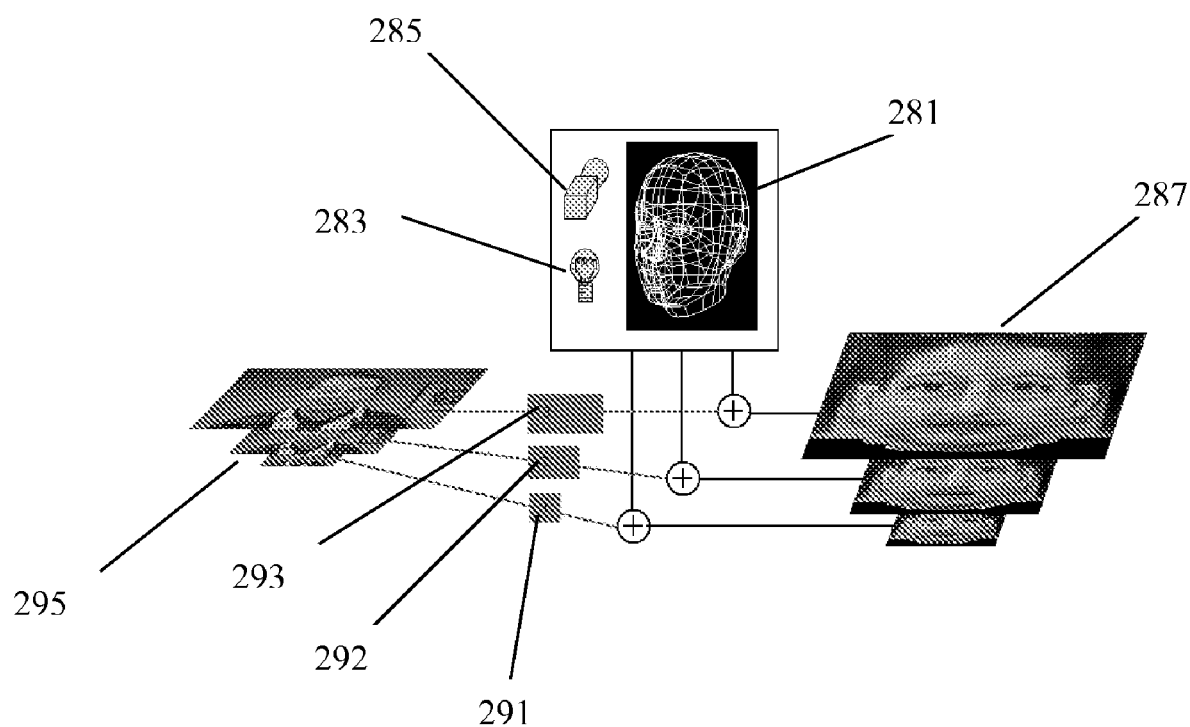
FIG. 28 shows a construction of the multi-resolution STEP model according to an embodiment of the present invention.

A STEP model is constructed for each resolution in the texture map pyramid. During the application stage the model corresponding to the lowest resolution in the texture map pyramid is used and applied (via GOOD descent) to the corresponding level of the input image pyramid. After convergence at this level, the current modelled texture map (T') is rescaled to the next level in the texture map pyramid and the camera image height is set to the height of the image in the next level of the input pyramid and the next resolution STEP model is invoked. The process continues until convergence at the highest pyramid level. FIG. 28 demonstrates the construction of the multi-resolution STEP model. A Multi-resolution STEP model architecture showing the combination of the single shape model 281, camera parameters 283 and lighting parameters 285 with texture parameters built from a multi-resolution texture map pyramid 287. The combination results in three models (boxes labelled 291, 292 and 293) which are trained and applied using GOOD descent to a multi-resolution input pyramid 295.

The multi-resolution STEP model provides the same increase in robustness as the multi-resolution SGT model; it also provides a vast improvement in the speed of the method since the lower resolution stages of the method involve the rendering of small texture maps to small projected images.

An additional benefit in the use of a multi-resolution STEP model is that it can be used to improve the clarity of an input image. Continuing with the example of the conversion of a 2D image containing a human face to a textured 3D mesh: the multi-resolution STEP can be applied to an input image pyramid that has the same underlying resolution at every level. Consider an input image of 64 pixels in height; constructing an inverted pyramid of just 3 levels reduces the image size to 16 pixels at its lowest level. Such an image contains very little information. In this case the input image pyramid is constructed such that the original input image corresponds with the lowest resolution level and the highest resolution level is a scaled-up version (using bilinear interpolated pixel sub-sampling) of that image. Hence, each stage of the pyramid has the same underlying resolution since no smoothing or sharpening is performed.

Figure 29:
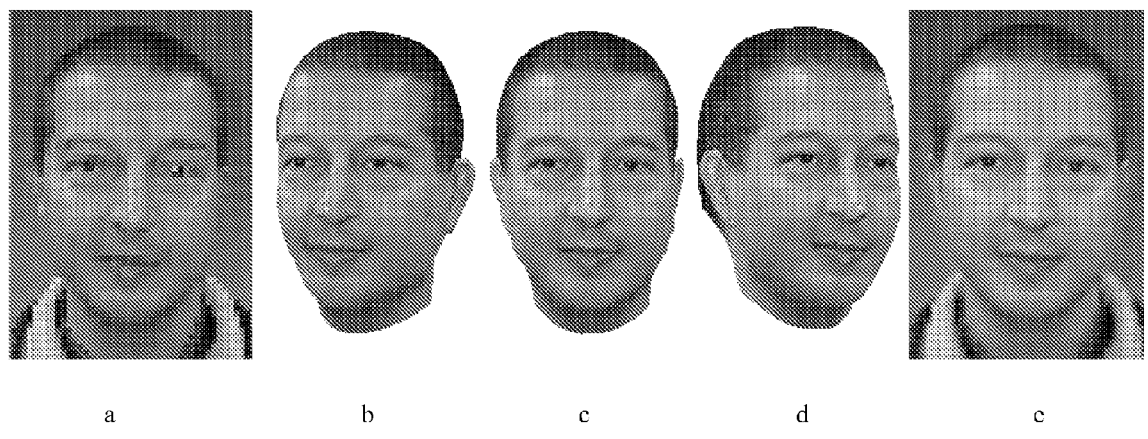
FIG. 29 shows the ability of the multi-resolution STEP model to improve the clarity and resolution of a low-resolution input image according to an embodiment of the present invention.

The application of the resulting multi-resolution resolution STEP model to this type of image pyramid has the benefit of improving the resolution of the input image as well as creating a high-resolution 3D texture mesh. FIG. 29 demonstrates the ability of the multi-resolution STEP model to improve the clarity and resolution of a low-resolution input image. As shown from left to right, FIG. 29A shows an original low-resolution image, FIGS. 29B-29D show an extracted high-resolution textured 3D head and FIG. 29E shows a textured 3D head rendered back onto the original image, after the image has been scaled to high-resolution size.

EXAMPLES

The examples described above considered converting a 2D image of a human head into a 3D mesh. Consequently, this section will provide some examples of the results of applying the described process to various input images.

Example 1

Front Facing 2D Image

Figure 30:
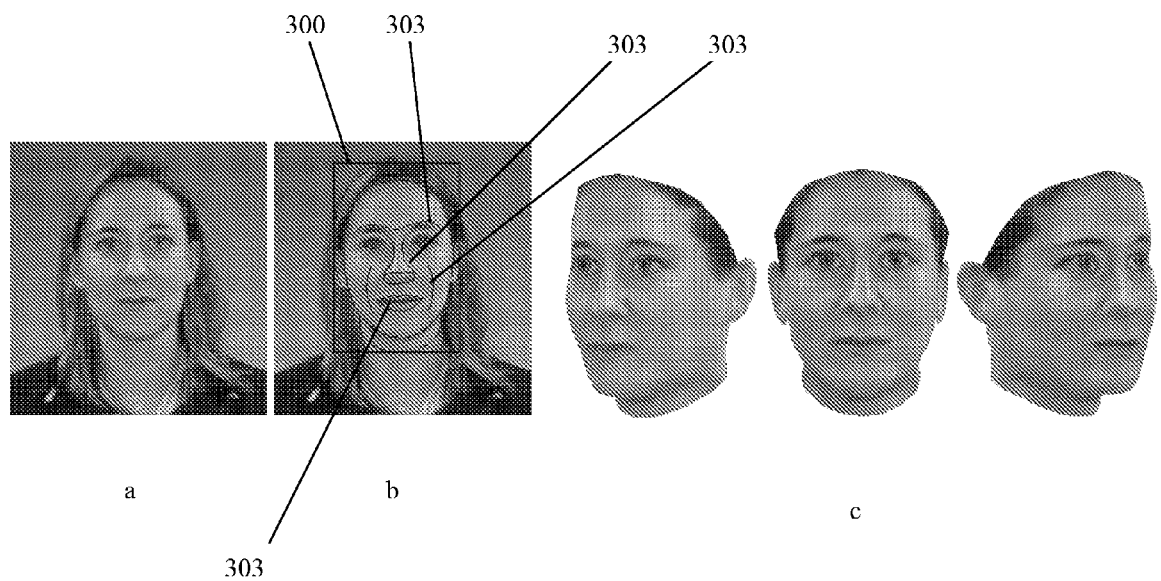
FIG. 30 shows an example of applying a method according to an embodiment of the present invention to an image of a female person that is looking directly into the camera.

FIG. 30 shows an example of applying the above described technique to an image of a female person that is looking directly into the camera. The first image, as shown in FIG. 30A, is the input image. The second image, as shown in FIG. 30B, shows the result of applying the neural network to find the position and extent of the face. The result of the neural network output is shown as the rectangle 301 superimposed on the second image in FIG. 30B. The second image also shows the result of applying the 2D SLT followed by the 2D SGT; this is demonstrated as the automatically found 2D annotations shown as curves 303. The remaining three images shown in FIG. 30C show the 3D head mesh that is obtained as a result of applying the 3D SP and the 3D STEP models to the 2D annotations. Three different views are given to demonstrate the 3D nature of the resulting head. The 3D mesh is displayed without hair since the head is modelled and not the hair in this example.

Example 2

Non-Front Facing Examples

Figure 31:
FIG. 31 shows four examples of applying a method according to an embodiment of the present invention to images of people not looking straight at the camera.

FIG. 31 shows four examples of applying the technique to images of people not looking straight at the camera. For each example the resulting textured 3D head has been rendered looking directly into the camera with the same lighting as the original image.

Example 3

Different Lighting Conditions

Figure 32:
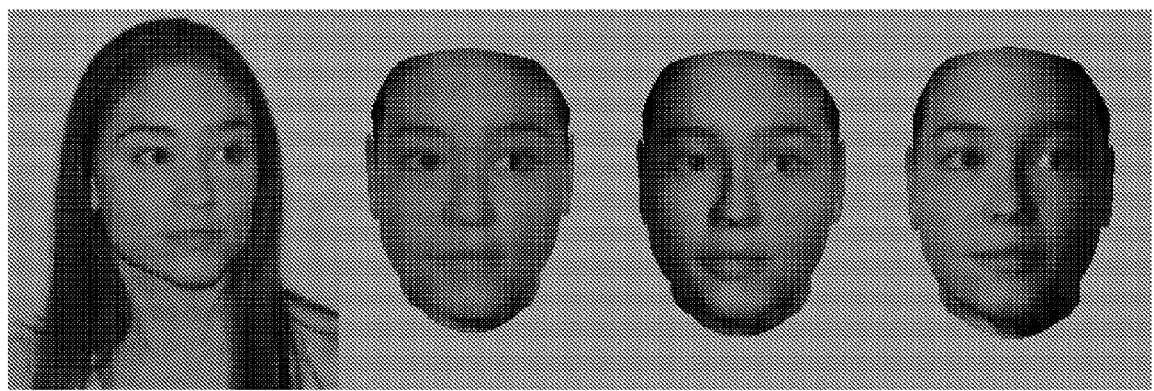
FIG. 32 shows the use of different lighting conditions while rendering the textured 3D head according to an embodiment of the present invention.

FIG. 32 shows the use of different lighting conditions while rendering the textured 3D head. The original image as shown in FIG. 32A is rendered using, for example, red light, as shown in FIG. 32B, white light emanating from the right side of the head, as shown in FIG. 32C and white light emanating from the left side of the head, as shown in FIG. 32D.

Example 4

Fitting to a Profile Image

Figure 33:
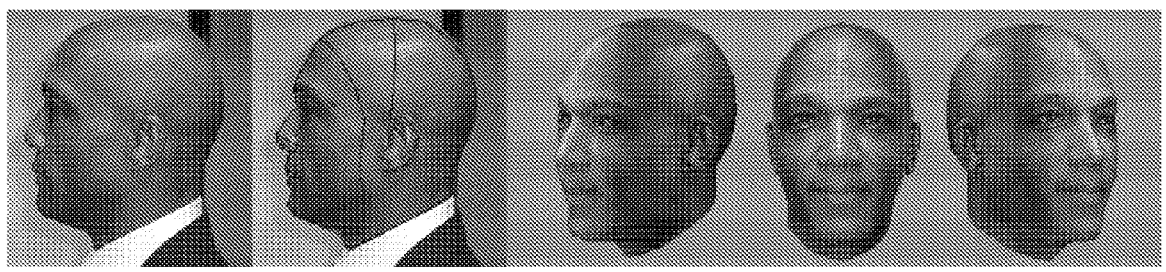
FIG. 33 shows a profile image as an input to a method according to an embodiment of the present invention.

FIG. 33A shows a profile image as an input to the technique. The next image, shown in FIG. 33B, shows the result of fitting the 2D SLT and SGT profile models and the last three images, as shown in FIG. 33C, display different rendered viewpoints of the 3D head obtained by fitting the 3D SP and STEP models to the found 2D annotation. In each case the lighting has been re-positioned such that it shines directly onto the front of the face.

Example 5

Significant Off-Front Fitting

Figure 34:
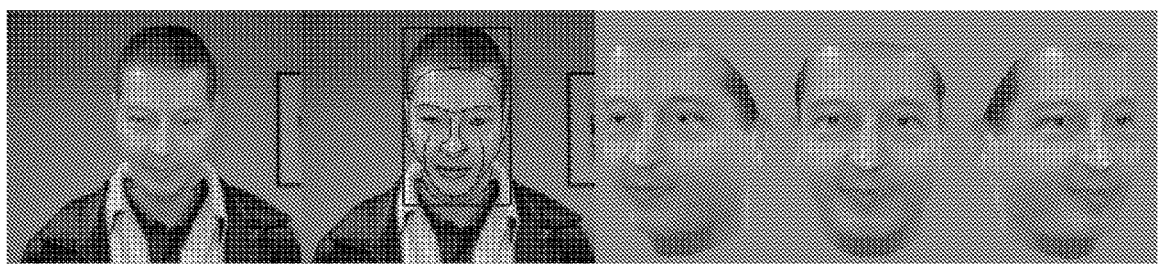
FIG. 34 shows the use of the CyberExtruder technique to an input image with significant rotation of the head according to an embodiment of the present invention.

FIG. 34 demonstrates the use of the CyberExtruder technique to an input image with significant rotation of the head. The first image, FIG. 34A shows the input, the second image, FIG. 34B shows the result of fitting the 2D models and the last three images, FIG. 34C show three different views of the resulting 3D head.

Second Embodiment

According to a second embodiment of the present invention, the face algorithm can be divided into four distinct areas: (A) building a statistical model of 2D face shape from a training set, (B) building a statistical model of 3D face shape from a training set, (C) finding the face in an image by applying the 2D model and (D) converting the found 2D face shape into 3D face shape. The algorithm depends on first building the 2D and 3D models off-line (A and B) and then applying those models (C and D) in the deployment.

A flow chart of each of the areas is outlined below. Definitions and further clarification regarding the terminology used herein is provided in Section E.

Building the 2D Face Model

Figure 35:
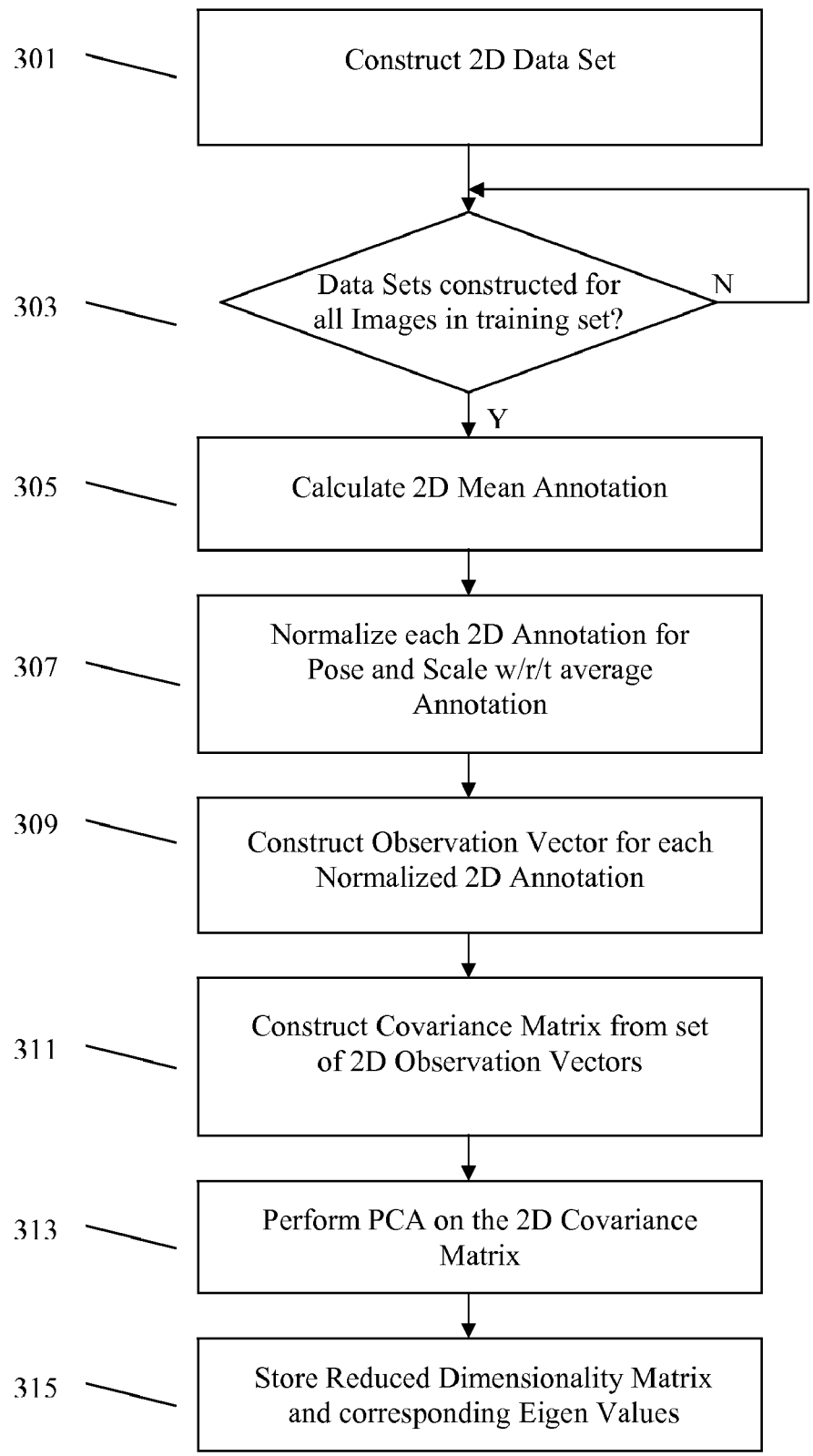
FIG. 35 shows a method for building a 2D face model according to an embodiment of the present invention.

In FIG. 35 there is shown a method for building a 2D face model. In step 301, the 2D data set is constructed by loading the image, manually annotating the image (see Section E.1.), and saving the 2D annotation. In step 303 a query is made whether this has been accomplished for all images in the training set. If no, step 301 is repeated for the next image, and if yes, the method continues with step 305. In step 305, the 2D mean annotation is calculated (this is the average annotation) by summing each corresponding annotation point over all the training set, and dividing each point by the number of annotations in the training set. This creates an average point position for each of the points in the face annotation. In step 307, normalize each 2D annotation for pose and scale with respect to the average annotation (see Section E.7). In step 309, construct an observation vector for each normalized 2D annotation (see Section E.2). In step 311, construct a covariance matrix from the set of 2D observation vectors (see Section E.8). In step 313, perform PCA on the 2D covariance matrix (see Section E.9). In step 315, store the reduced dimensionality matrix P and the corresponding eigen values.

Building the 3D Face Model

Figure 36:
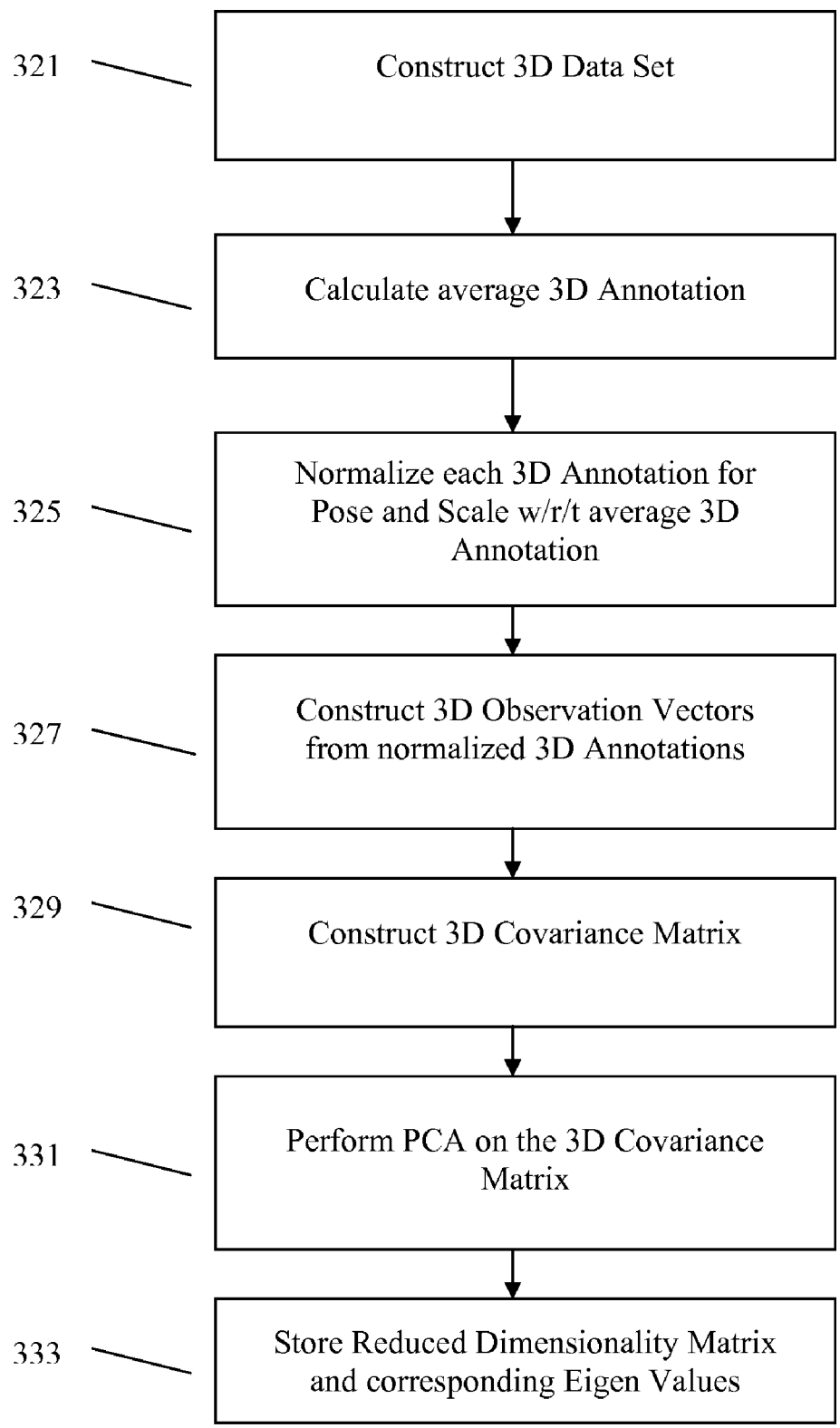
FIG. 36 shows a method for building a 3D face model according to an embodiment of the present invention.

In FIG. 36 there is shown a method for building a 3D face model. In step 321, a 3D data set is constructed by loading 3DRD (see Section E.4), manually annotating the 3DRD with a basic annotation corresponding to those produced in section (B) (see Section E.5), constructing a 3D annotation containing intermediate points as well as basic points (see Section E.5) and saving the 3D annotation. In step 323, the average 3D annotation is calculated. In step 325, each 3D annotation is normalized for pose and scale with respect to the average 3D annotation. In step 327, construct 3D observation vectors from the normalized 3D annotations (see Section E.6). In step 329, construct the 3D covariance matrix (see Section E.8). In step 331, perform PCA on the 3D covariance matrix (see Section E.9). In step 333, store the resulting reduced dimensionality matrix and the corresponding eigen values.

Applying the 2D Face Model

Figure 37:
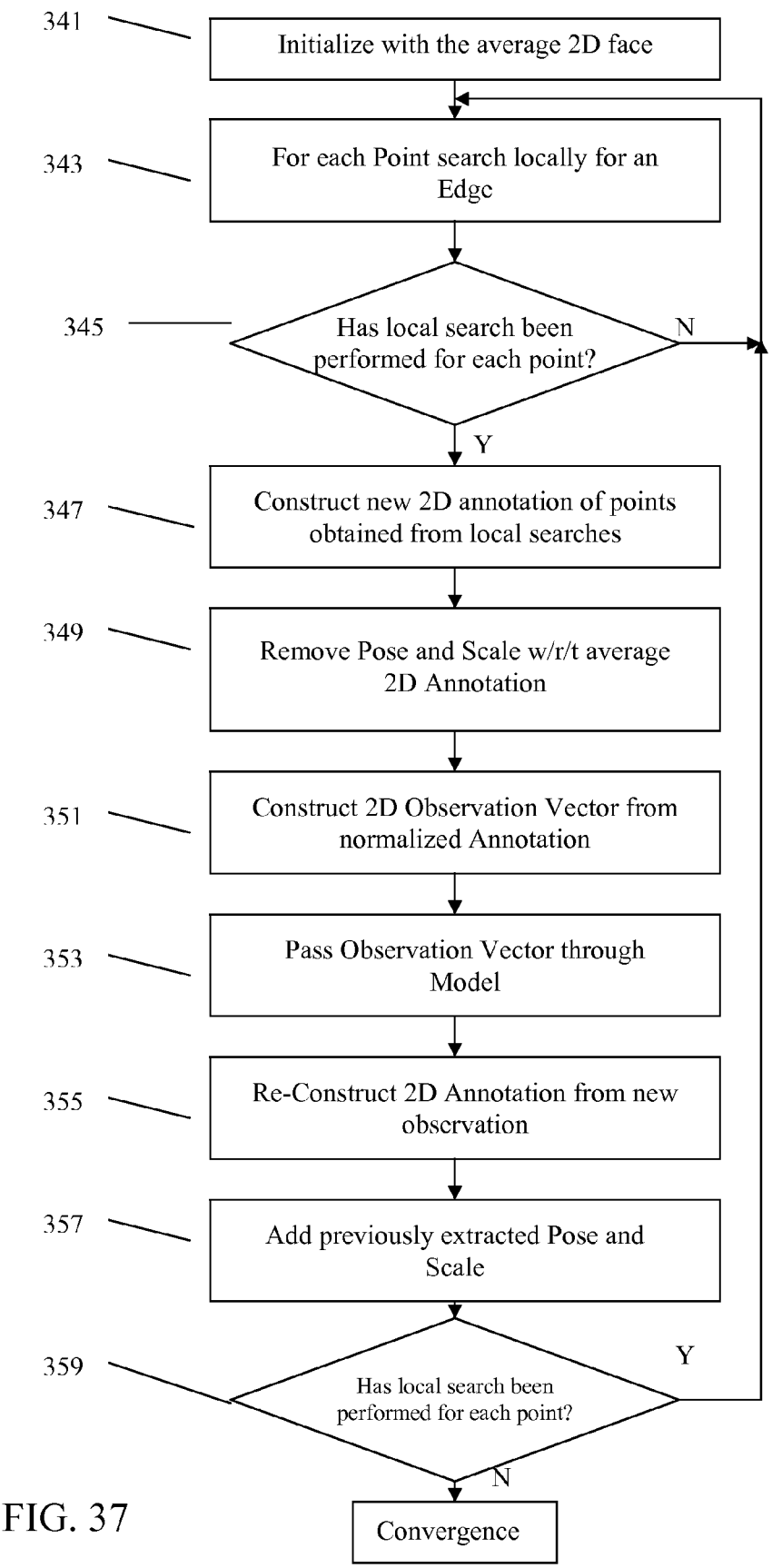
FIG. 37 shows a method for applying a 2D face model and finding the face in a 2D image according to an embodiment of the present invention.

In FIG. 37 there is shown a method for applying the 2D face model and for finding the face in a 2D image. In step 341 initialize with the average 2D face (see E.2). In step 343, for each point search locally for an edge (or feature point, see C.2). In step 345, query whether a local search has been performed for each point. If no, return to step 343. If yes, then in step 347, construct a new 2D annotation of points obtained from the local searches. In step 349, remove pose and scale with respect to the average 2D annotation (see Section E.7). In step 351, construct 2D observation vector from normalized annotation. In step 353, pass observation vector through model (equations 5 and 6) resulting in a new observation constrained by the PCA model. In step 355, re-construct 2D annotation from new observation. In step 357, add previously extracted pose and scale (from step 349). In step 359, query whether the 2D points change. If yes, repeat steps 343 to 357 until the 2D points do not change (with respect to some threshold). If no, at this stage the algorithm has converged.

Local search points may need to be identified. During the search phase each point in the 2D annotation represents a salient feature: e.g. the corner of an eye. Generally the feature can be represented by an edge (a discontinuity in image gradient), but not always.

For some feature points it is better to construct a separate local PCA model. The local model is constructed from a rectangular patch of the image located at the relevant point. Patches are extracted over the whole of the training set and a PCA model is built in the same way as (A), except that an observation for this model is constructed by concatenating the pixel values (grayscale or RGB) into a single vector.

When searching locally (see FIG. 37, step 343) we obtain a measure of how well an image patch fits to the local PCA model; this measure is the mahalanobis distance to the mean. (Mahalanobis distance is a statistically weighted distance). So a search around a point provides the 2D position with the minimum fit error.

A multiple resolution search strategy may need to be exercised. To enable face finding over larger pixel distances a multiple resolution search strategy is used. The input image is smoothed and sub-sampled into a series of progressively smaller images. Thus, an image pyramid is produced with each level of the pyramid containing an image that is half the size of the one immediately above it.

The local 2D models (using local search points) are built for each level of this pyramid, hence for a 4 level pyramid there exists 4 separate local models for each point in the 2D annotation. The numbers of pixels in the image patches are kept constant regardless of image level. Hence, models built from lower pyramid levels represent larger areas of the original image.

The search process follows the one outlined in FIG. 37, starting at the lowest resolution, thus allowing for maximum model movement. When the lower resolution stage has converged the next higher stage is processed. This process continues until the highest (original) resolution stage has converged at which point the face is declared found.

A global search strategy may need to be incorporated into the process. In many cases even the use of a multiple resolution search strategy is inadequate to initialize the algorithm such that the face can be found. In these cases a global search strategy is applied: the 2D Face model search strategy described above is applied at each position on a course 2D grid. Each application of the search initializes the mean 2D annotation at the center of the grid point and proceeds for a limited number of iterations. The grid position resulting in the best fit is then used to continue iterating until the face is found.

Constructing a 3D Face from a 2D Image and a 2D Annotation

Figure 38A:
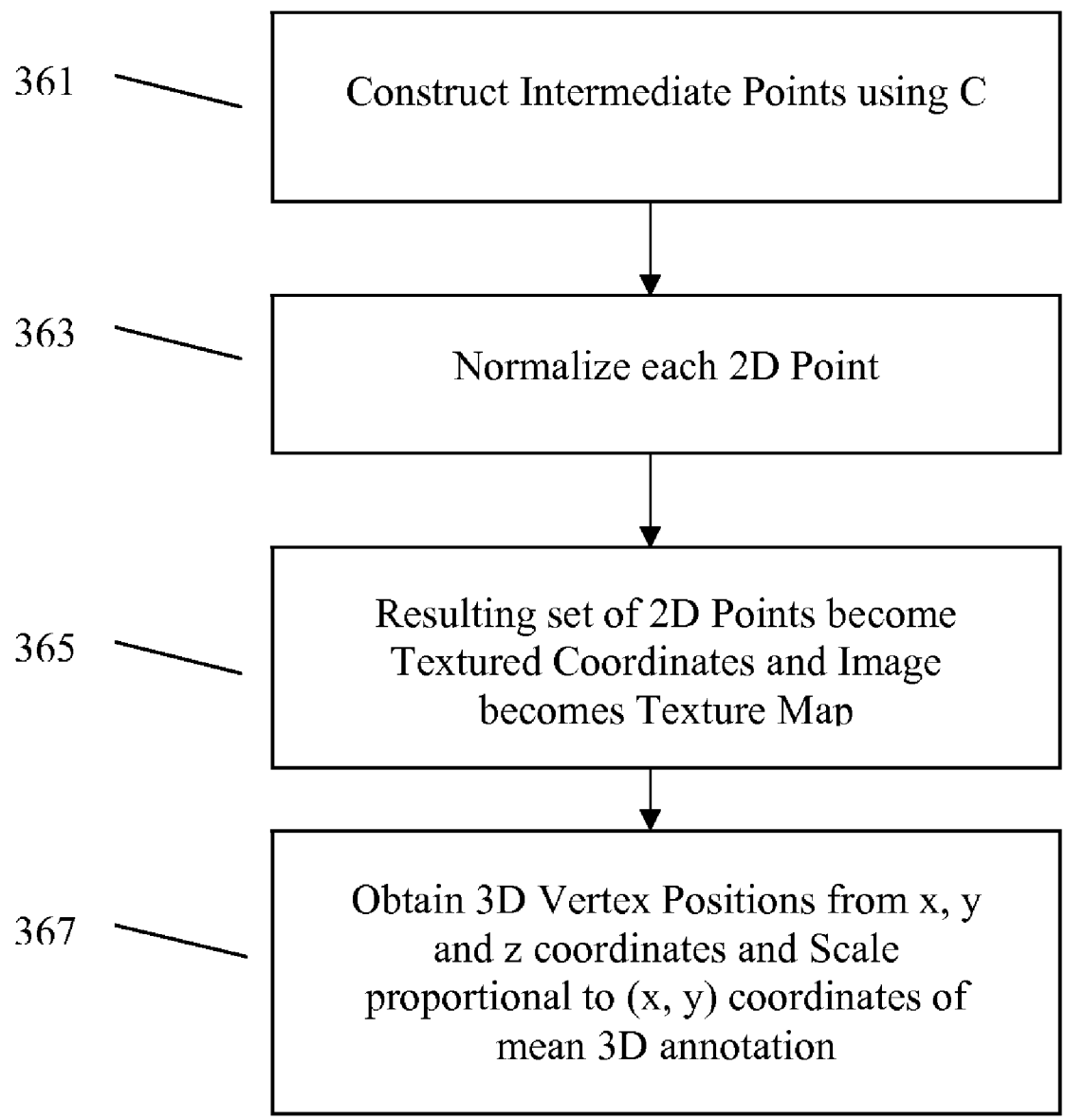
FIGS. 38A and 38B show flow diagrams for the construction of a 3D face from a 2D image and a 2D annotation according to an embodiment of the present invention.
Figure 38B:
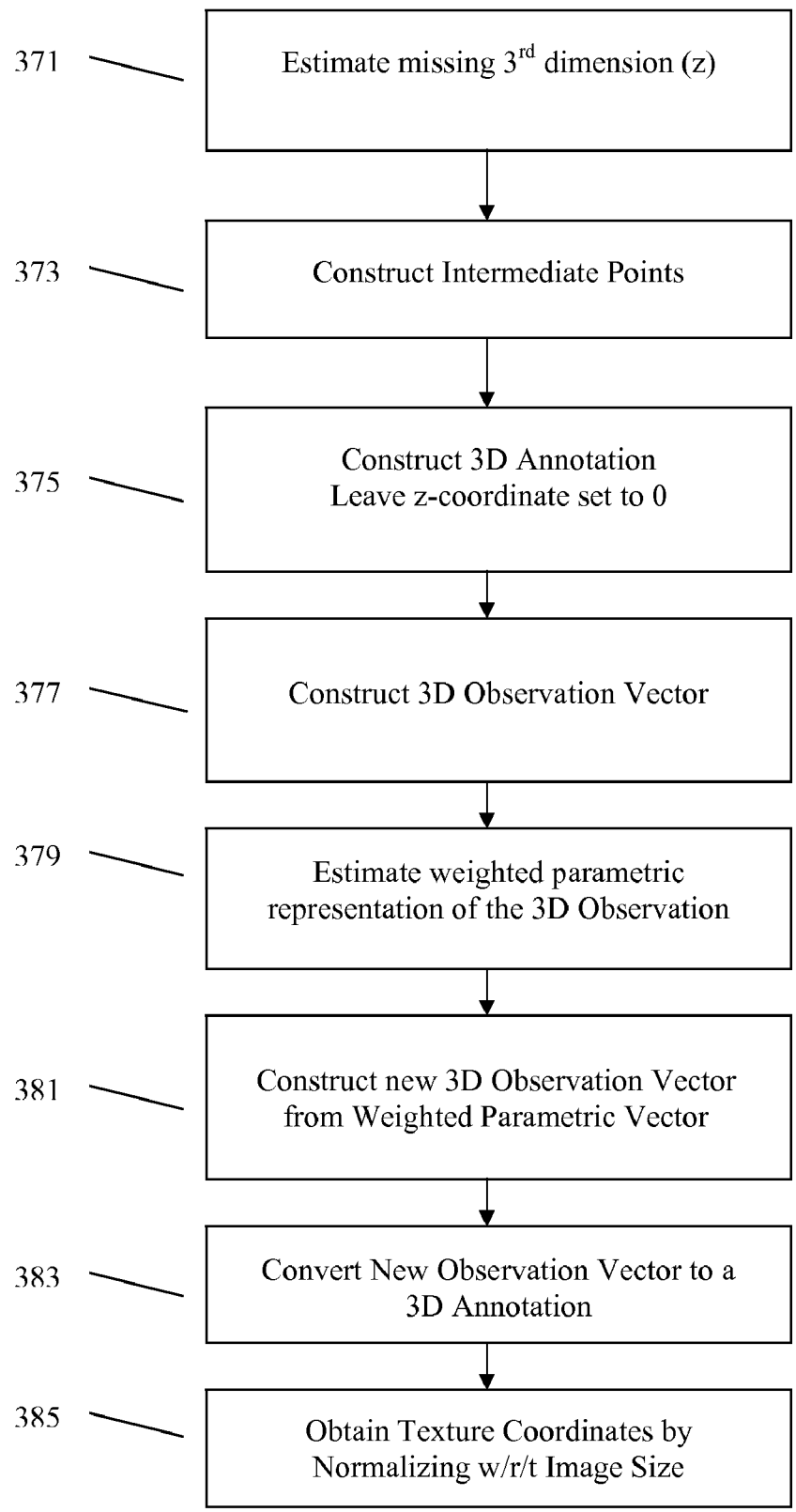

In FIGS. 38A and 38B there are shown flow charts for the construction of a 3D face from a 2D image and a 2D annotation. Looking first at FIG. 38A, there is shown a generic mapping process. In step 361, the intermediate points from the 2D annotation found are constructed using C (see Section E.5). In step 363, each 2D point (including the intermediate points) is normalized as follows: divide the x-coordinate by the width of the image in pixels and the y-coordinate by the height of the image in pixels. In step 365, the resulting set of 2D points become texture coordinates (also known as (u, v) coordinates in computer graphics) and the image becomes the texture map. In step 367, the 3D vertex positions are obtained by obtaining the z-coordinate from the mean 3D annotation (see Section B) and obtaining the (x, y) coordinates directly from the 2D points and scaled to be in proportion to the (x, y) coordinates of the mean 3D annotation. This process results in a 3D face with accurate (x, y) coordinates (to scale) and generic average z-coordinates.

Looking now at FIG. 38B, there is shown a weighted estimation based on the training set. In step 371, the missing $3^{rd}$ dimension (z) can be estimated from the information contained within the two known dimensions (x, y). In step 373, the intermediate points from the 2D annotation found is constructed using C. In step 375, the 3D annotation from these points is constructed leaving the z-coordinate set to zero. In step 377, the 3D observation vector is constructed. In step 379, the weighted parametric representation of the 3D observation is estimated setting the weights such that the $3^{rd}$ dimension is completely estimated (weights=0) and the first two dimensions are simply constrained by the model (weights=1) (see Section E.10). In step 381, a new 3D observation vector is constructed from the weighted parametric vector (Equation 17). In step 383, the new observation vector is converted to a 3D annotation. In step 385, texture coordinates are obtained by normalizing with respect to image size (see FIG. 38A, step 363). This results in a z-coordinate that is statistically estimated from the automatically found (x, y) coordinates. The statistical estimation is based on the 3D training set.

Terminology

Figure 39:
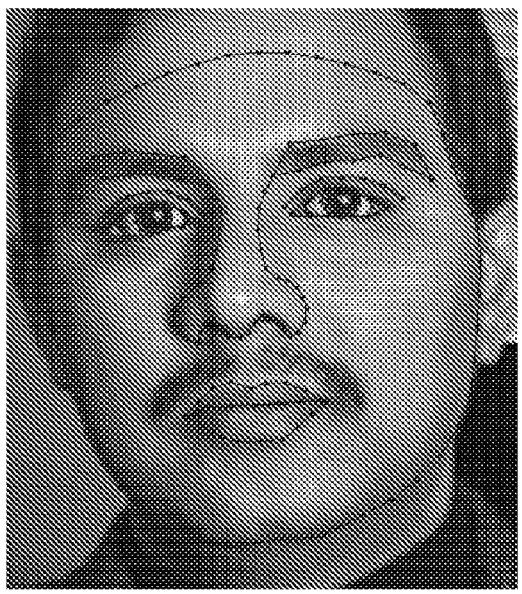
FIG. 39 shows a 2D annotation of a human face showing the positions of each annotation point according to an embodiment of the present invention.

A 2D annotation is a set of 2D points positioned on a 2D image such that they have a perceived meaning. For example a set of points outlining the eyes, eyebrows, nose, mouth, and face in an image of a human face. See example shown in FIG. 39 of a 2D annotation of a human face showing the positions of each annotation point.

A 2D observation is the conversion of the 2D annotation into a single vector by concatenating the x and y values for each 2D point into one larger vector. Thus for n 2D points in an annotation the observation vector will be $(x_1, y_1, x_2, y_2 \ldots x_n, y_n)$. Hence, the vector will have 2n elements.

A 2D image is a digital/digitised photograph. An example of a 2D image is shown in FIG. 38.

A 3D raw data (3DRD) example is the result of obtaining 3D data from a 3D data acquisition system such as a laser scanner, a structured light system or a stereo system (see FIG. 1). FIG. 1 is an example of the data obtained from a flat plane laser scan. The data is rotated to demonstrate its 3D nature. The (blue) dots show the 3D vertices, the middle picture shows the texture mapped 3D surface and the picture on the right shows the wire-frame (polygonal) mesh overlaid on the textured surface.

Figure 40:
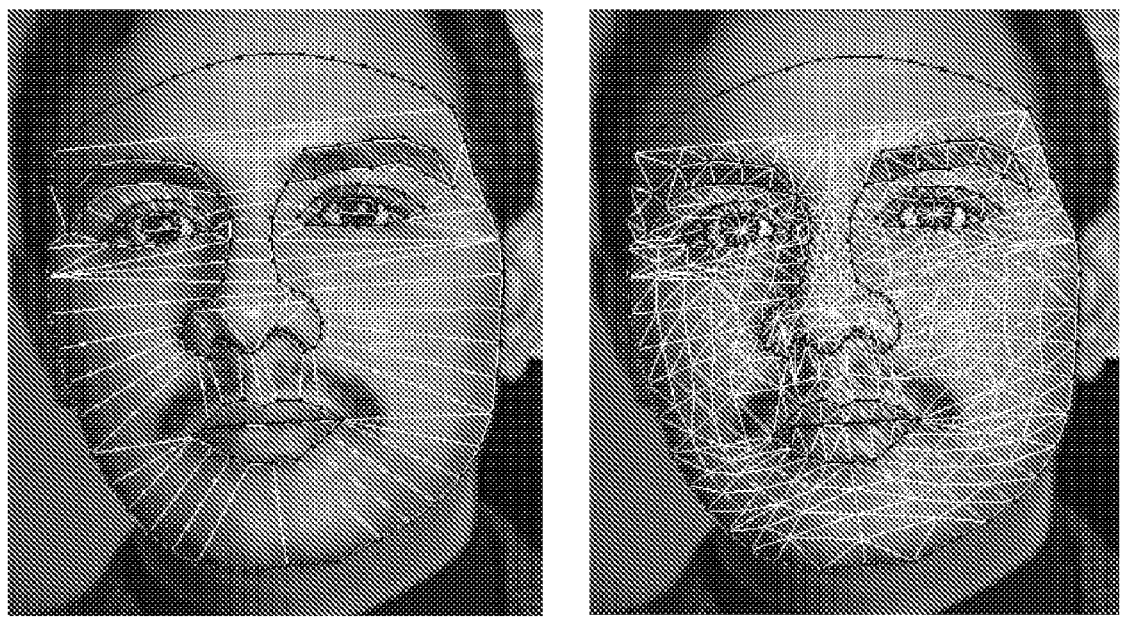
FIG. 40 shows an example of obtaining the intermediate points from the basic 2D annotation shown in FIG. 38 according to an embodiment of the present invention.
Figure 41:
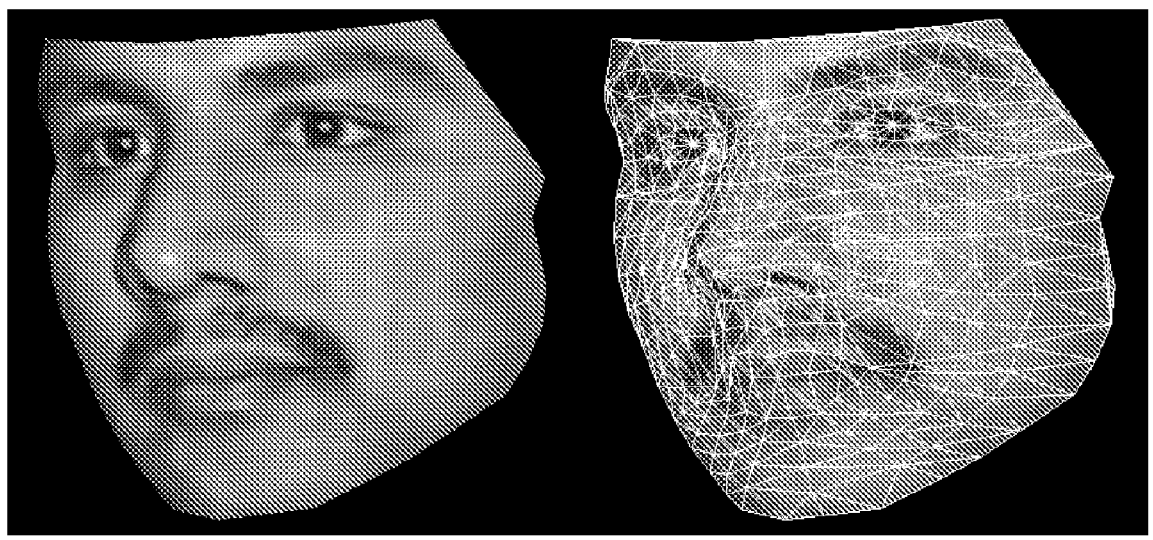
FIG. 41 shows an example of the resulting 3D mesh obtained from a 3D annotation including intermediate points according to an embodiment of the present invention.

A 3D annotation contains the same information as the basic 2D annotation except that a 3D annotation also contains the $3^{rd}$ dimension or z value. Also, the 3D annotation contains intermediate points that lie between the original basic annotation points in such a way that they can be obtained empirically from basic points (see FIG. 40). FIG. 40 shows an example of obtaining the intermediate points from the basic 2D annotation shown in FIG. 39. Lines are connected between basic annotation points (the lines other than the lines shown in FIG. 39, i.e., yellow lines). The lines are sampled to create intermediate points. The resulting point-set is triangulated to form the mesh shown in the picture on the right. As shown in the right hand picture in FIG. 40, the resulting 3D annotation can be triangulated to produce a 3D mesh as shown in FIG. 41. FIG. 41 shows an example of the resulting 3D mesh obtained from the 3D annotation including the intermediate points.

A 3D observation is the same as a 2D observation except that it contains the concatenated (x, y, z) variables instead of just the (x, y) variables.

A rigid transformation from one set of 2D points to another set of 2D points is constructed such that the sum of the distances between each corresponding point after transformation is minimised: call this the error distance. A rigid transformation of a single 2D point (x) to another 2D point (x') is given by:

$$x' = sRx + t \quad \text{Equation 13}$$

where, s is a scale factor, R is a 2×2 rotation matrix and t is a translation vector For a set of 2D points, the error distance is minimised by solving the following set of linear equations:

$$\begin{pmatrix} \Sigma x' & \Sigma y' & n & 0 \\ \Sigma y' & \Sigma x' & 0 & n \\ Q & 0 & \Sigma x' & \Sigma y' \\ 0 & Q & -\Sigma y' & \Sigma x' \end{pmatrix} \begin{pmatrix} s\cos(\theta) \\ s\sin(\theta) \\ tx \\ ty \end{pmatrix} = \begin{pmatrix} \Sigma x \\ \Sigma y \\ A \\ B \end{pmatrix} \quad \text{Equation 14}$$

where, n is the number of points in each set (must correspond)
s is the optimum scale factor
θ is the optimum rotation angle
tx is the optimum translation in the x-dimension
ty is the optimum translation in the y-dimension
Σx' is the sum of the x-coordinates of all target points x'
Σy' is the sum of the y-coordinates of all target points y'
Σx is the sum of the x-coordinates of all source points x
Σy is the sum of the y-coordinates of all source points y
Q is the sum of ((x' x')+(y' y')) over all the n points
A is the sum of ((x x')+(y y')) over all the n points
B is the sum of ((y x')−(x y')) over all the n points Hence, the optimum transformation between two sets of 2D points is obtained by solving Equation 14 for s, t and θ.

Construction of a covariance matrix (C) from a set of observation vectors (Xi, i=1 . . . n) is performed as follows:

$$C = (1/n)\Sigma[Xi-\mu)(Xi-\mu)'] \quad \text{Equation 15}$$

where, n=number of observation vectors
i=1 . . . n
μ=mean observation vector (average over n)
Xi=current (i'th) observation vector
Σ=sum over i=1 . . . n
$(Xi-\mu)(Xi-\mu)'$=the tensor product of $(Xi-\mu)$ and its transpose To perform principal component analysis on a covariance matrix C an assumption is made that the matrix is real and symmetric. Eigen analysis can be performed by first converting the matrix into its tri-diagonal form:

$$B = Q'CQ \quad \text{Equation 16}$$

The eigen values of B are the same as the eigen values of C and the eigen vectors can be obtained from B and Q. Since eigen analysis has many standard numerical software implementations the reader is referred to "Numerical Recipes", $2^{nd}$ Edition, published by Cambridge University Press, incorporated herein by reference. The resulting eigen analysis produces a matrix of eigen vectors which describe the direction of the characteristic variations and a vector of eigen values which describe the variance along each of the characteristic vectors.

Principal component analysis proceeds by sorting the order of the characteristic vectors with respect to the size of their corresponding variances. The vectors corresponding to variances that are deemed negligible (for example, less than 1% of the total variance) are deleted. This results in an orthogonal matrix P of principal characteristic vectors describing the majority of the variance present in the original data set. The dimensionality reduction achieved by this method can be large (for example as much as 90% reduction). Thus, a compact (and often meaningful, since the remaining vectors describe dimensions where the data has orthogonal variance) model is obtained.

$$X = Pb + \mu \quad \text{Equation 17}$$

$$b = P'(X - \mu) \quad \text{Equation 18}$$

An observation vector (X) can be represented by a reduced dimensional set of parametric values (b) by simply multiplying by P and adding the mean observation ($\mu$) (Equation 17). Since matrix P is orthogonal then the conversion from observation space (X) to parameter space (b) uses the transpose of P (Equation 18).

To perform a weighted statistical estimation of missing data within an observation vector using PCA the following linear system of equations is formed and solve for b.

$$(P'WP)b = P'W(X - \mu) \quad \text{Equation 19}$$

where,
X=observation vector
n=size of observation vector
W=n×n diagonal weights matrix
P, b and $\mu$ have the same meaning as Equation 17 and Equation 18

Other Embodiments

FIGS. 42-52 depict some aspects of some embodiments of the present invention.

Figure 42:
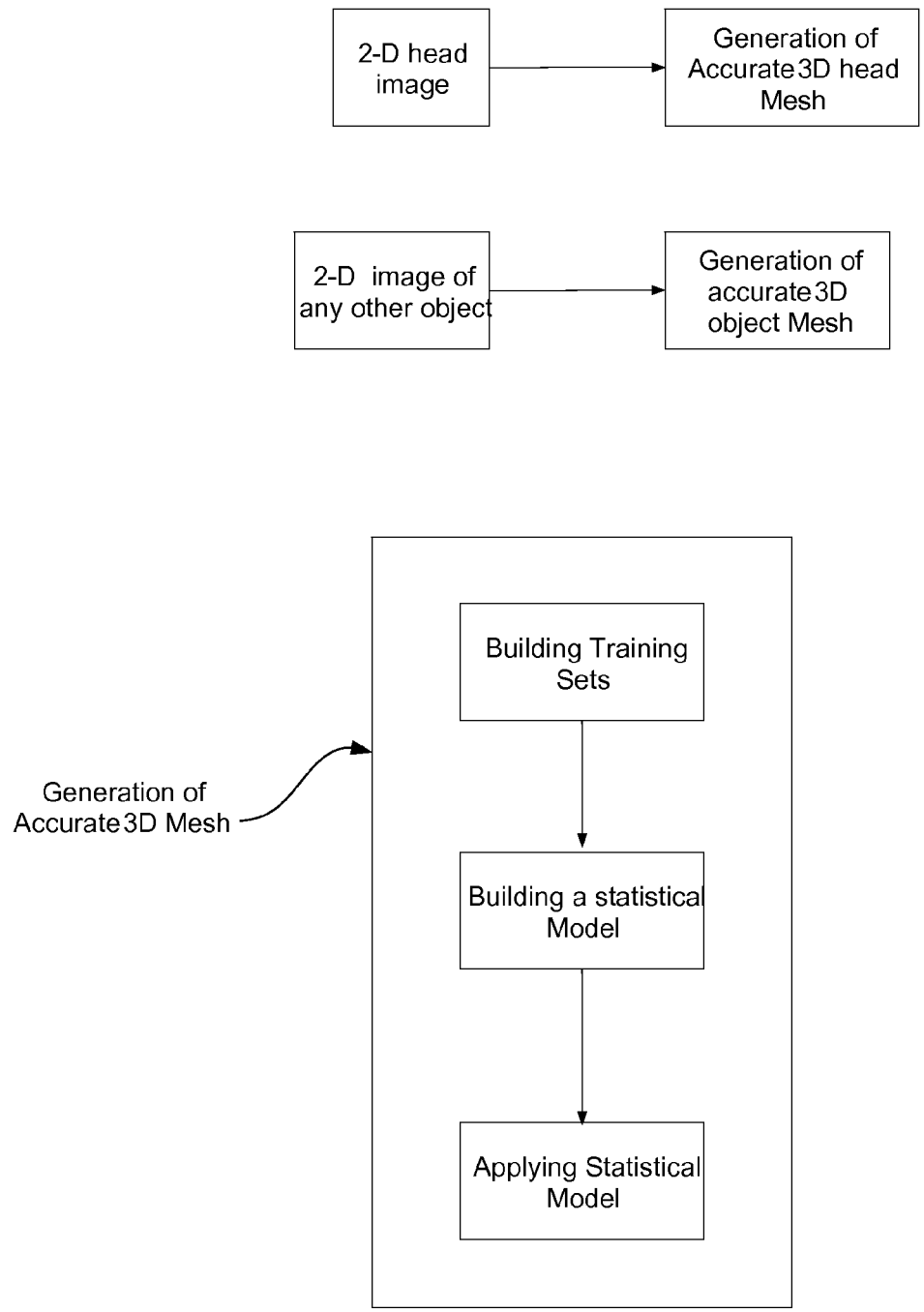
FIG. 42 shows a method for the generation of an accurate 3D mesh according to an embodiment of the present invention.

For example, FIG. 42 shows a method for the generation of an accurate 3D mesh. Using the system and method according to present invention, a 2D head image can be used to generate an accurate 3D head mesh. A 2D image of any other organism based object can be used to generate an accurate 3D object mesh. An accurate 3D mesh is generated by building training sets, using the training sets to build a statistical model and applying the statistical model to generate the 3D mesh.

Figure 43:
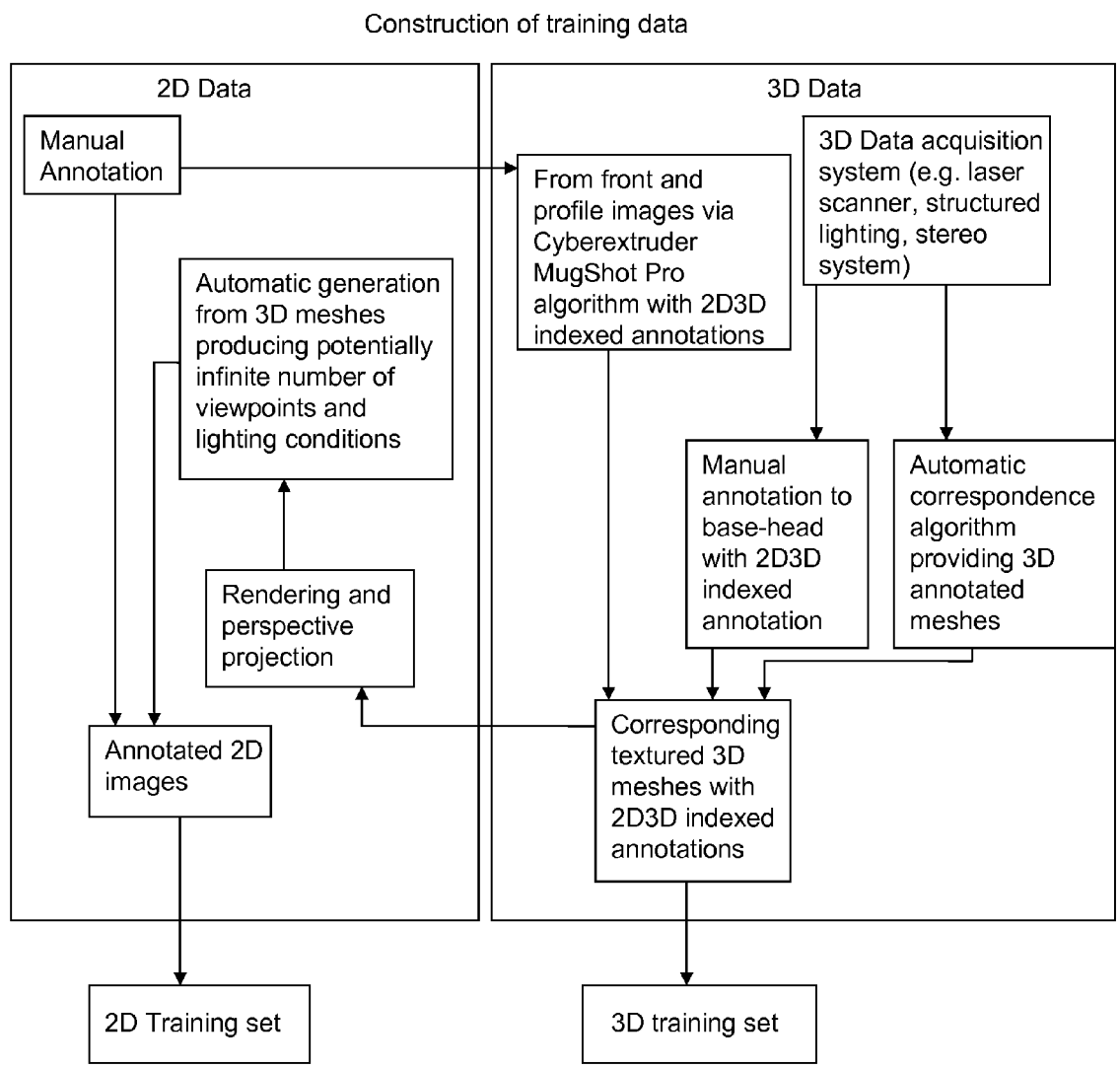
FIG. 43 shows a method for the construction of training data according to an embodiment of the present invention.
Figure 44:
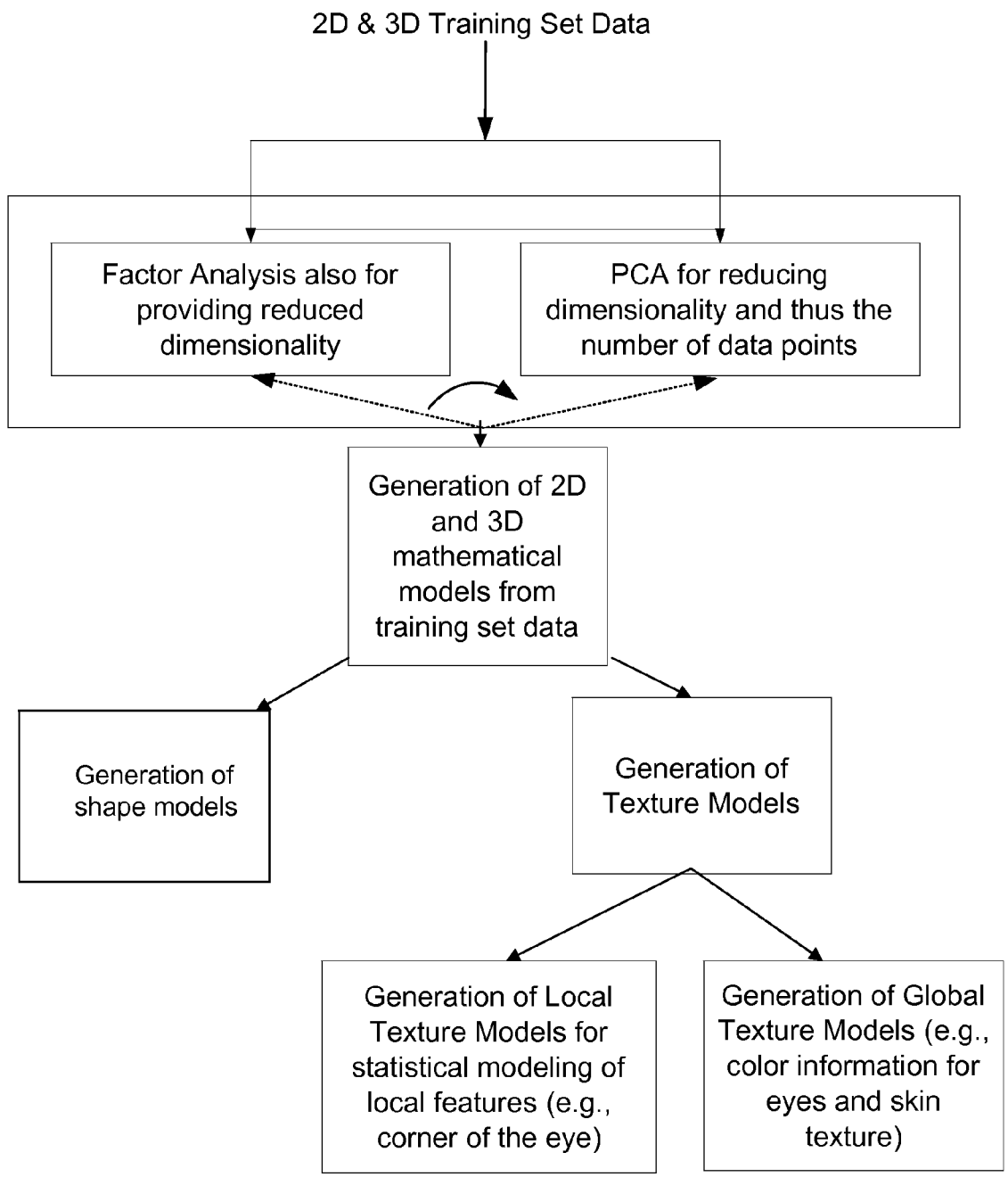
FIG. 44 shows a method for the generation of texture models according to an embodiment of the present invention.

FIG. 43 shows a method for the construction of training data. Training data is constructed by various methods. According to one method, manually annotating images to produce annotated 2D images. According to another method, manually annotating images, generating 3D data from front and profile images via Cyberextruder MugShot Pro algorithm with 2D3D indexed annotations, corresponding textured 3D meshes with 2D3D indexed annotations, performing rendering and perspective projection, automatically generating annotated 2D images from 3D meshes to produce potentially infinite number of viewpoints and lighting conditions, FIG. 44 shows a method for the generation of texture models. PCA is used to reduce dimensionality and thus the number of data points. Factor analysis is also used for providing reduced dimensionality. 2-dimensional and 3-dimensional mathematical models are generated from training set data. Shape models are generated and texture models are generated. Local texture models are generated for statistical modeling of local features, such as, for example, the corner of the eye. Global texture models are generated for statistical modeling, such as, for example, color information for eyes and skin texture.

Figure 45:
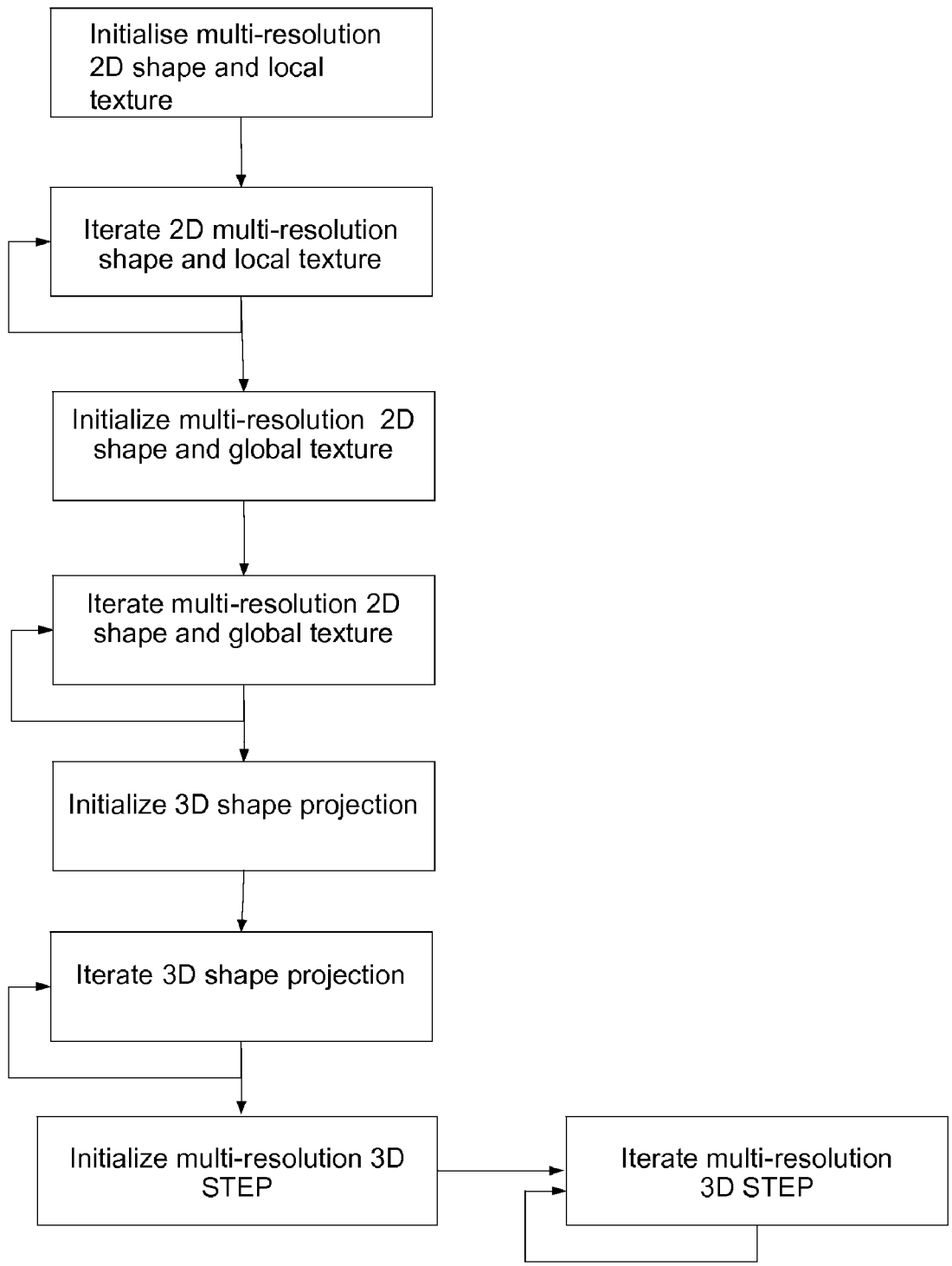
FIG. 45 shows a method for applying statistical models for 2D to 3D conversion according to an embodiment of the present invention.

FIG. 45 shows a method for applying statistical models for 2D to 3D conversion.

Figure 46:
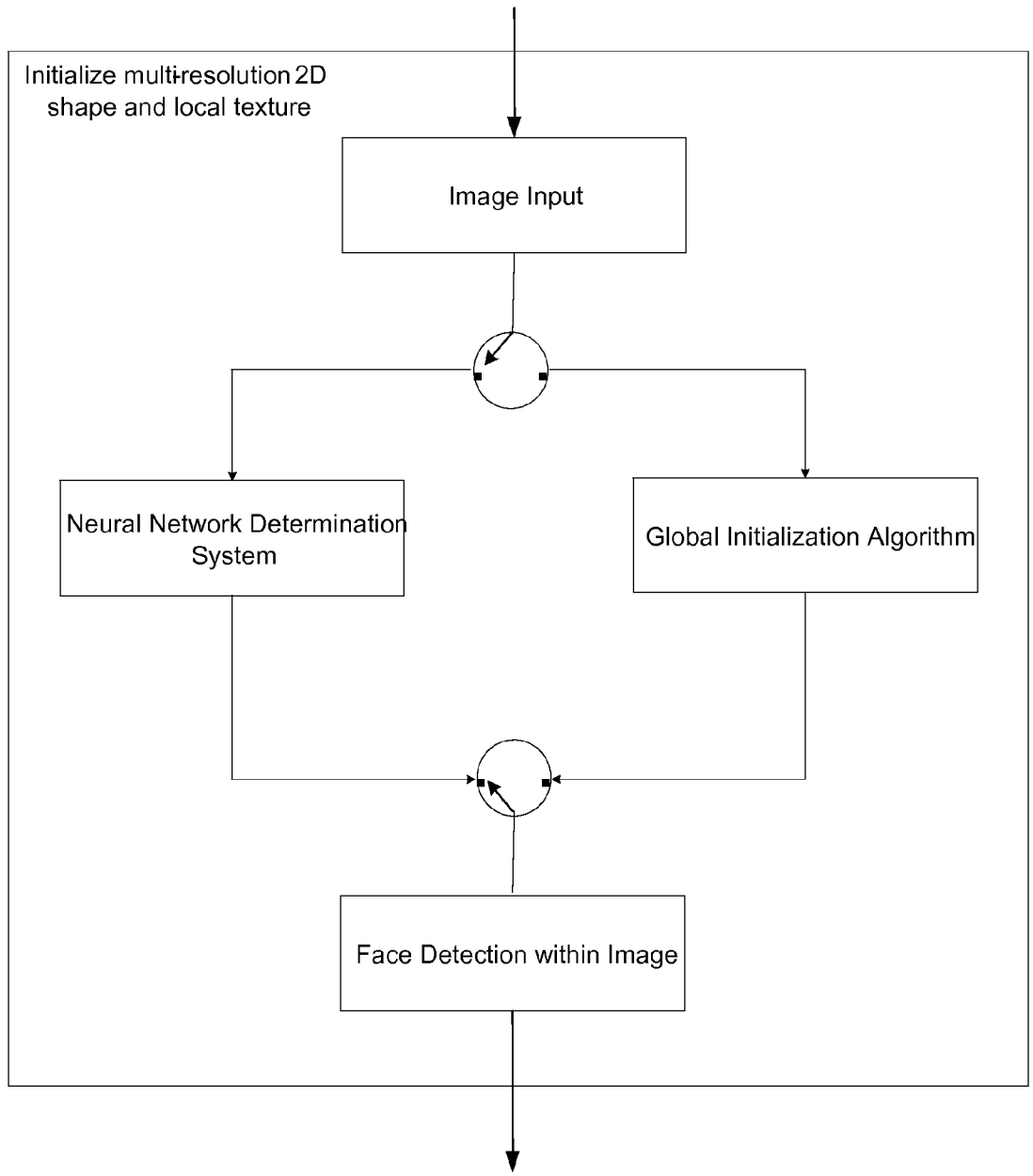
FIG. 46 shows a method for face detection within an image according to an embodiment of the present invention.

FIG. 46 shows a method for face detection within an image.

Figure 47:
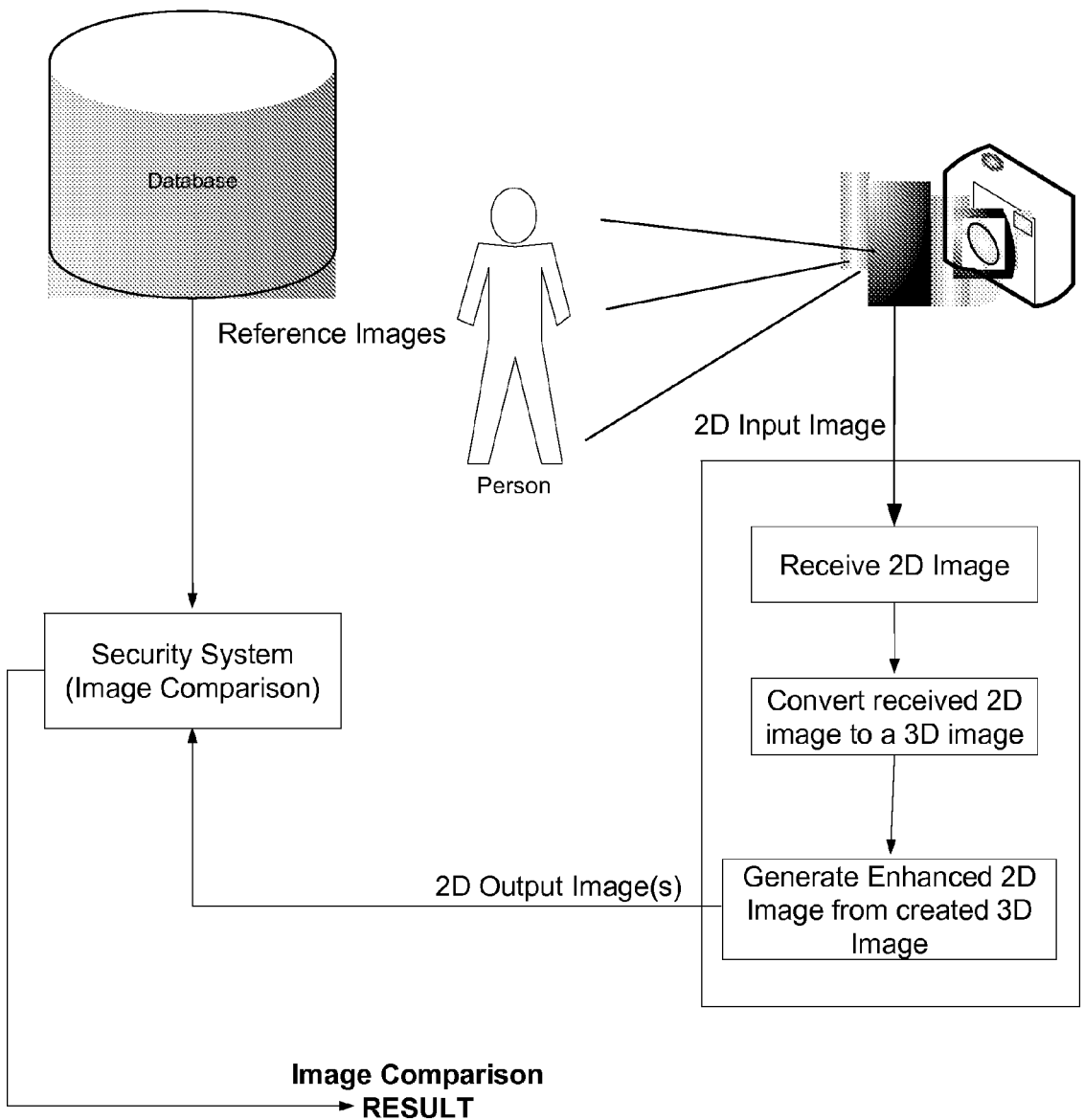
FIG. 47 shows a first example of system application according to an embodiment of the present invention.

FIG. 47 shows a first example of system application according to an embodiment of the present invention.

Figure 48:
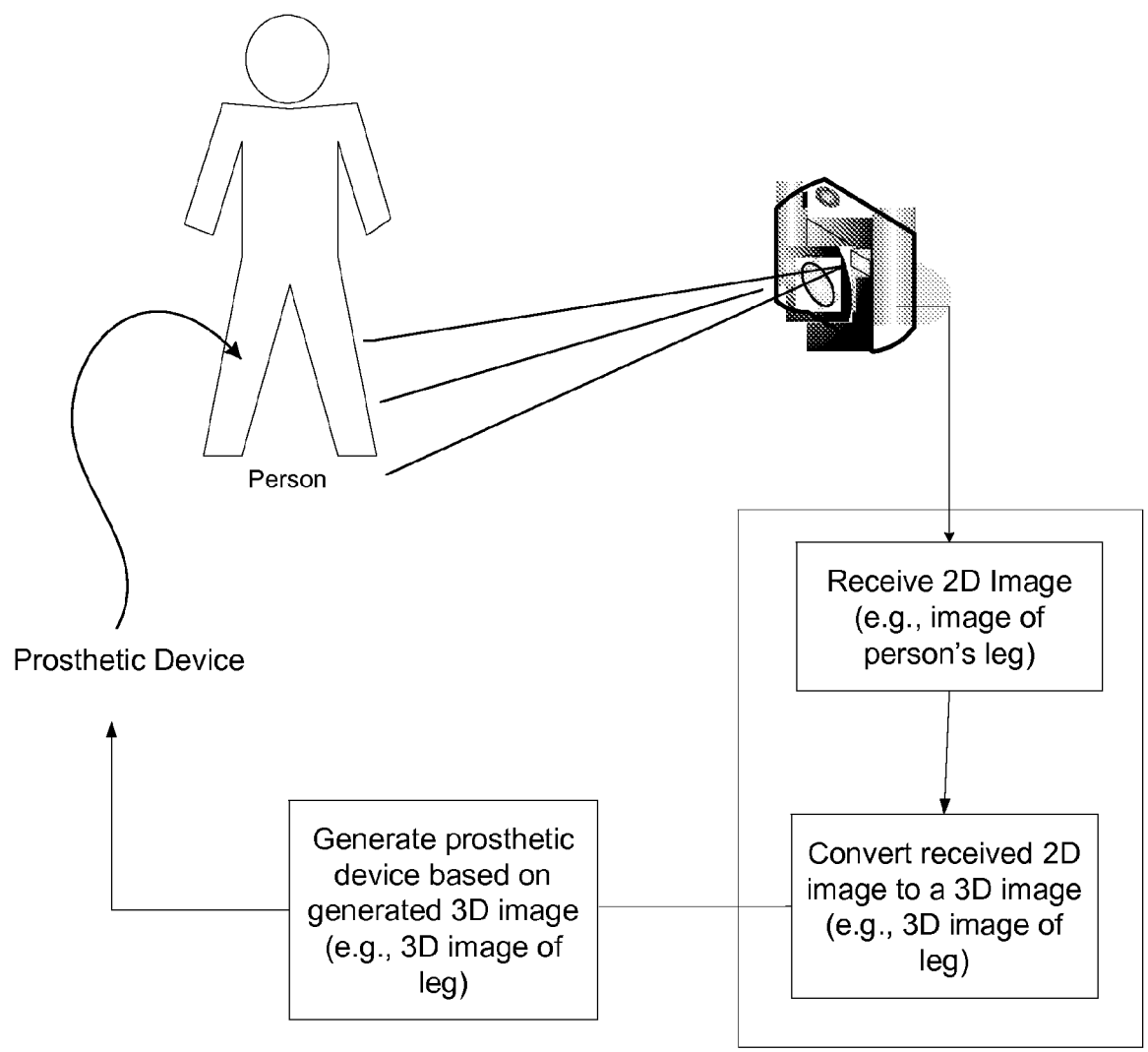
FIG. 48 shows a second example of system application according to an embodiment of the present invention.

FIG. 48 shows a second example of system application according to an embodiment of the present invention.

Figure 49:
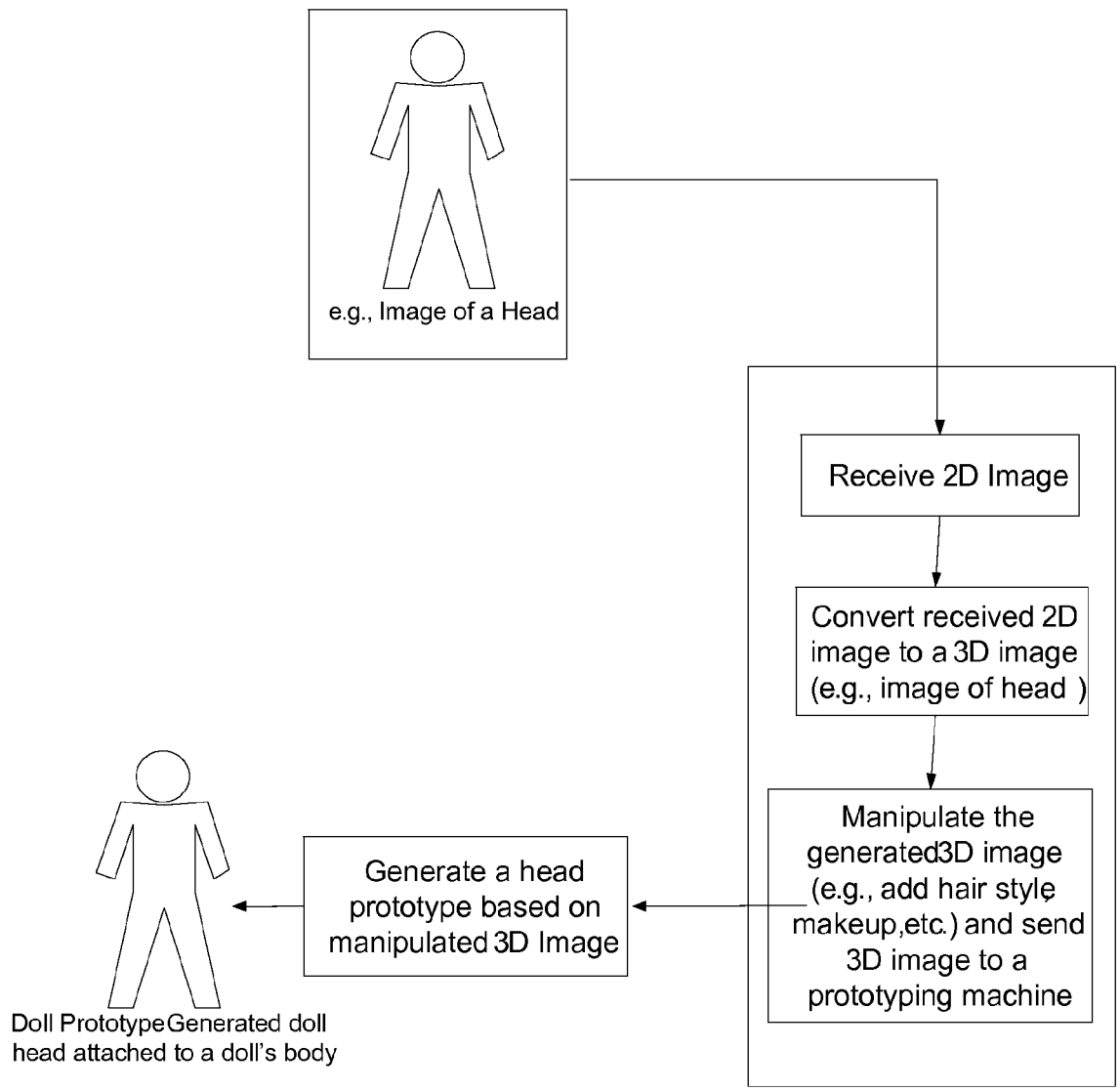
FIG. 49 shows a third example of system application according to an embodiment of the present invention.

FIG. 49 shows a third example of system application according to an embodiment of the present invention.

Figure 50:
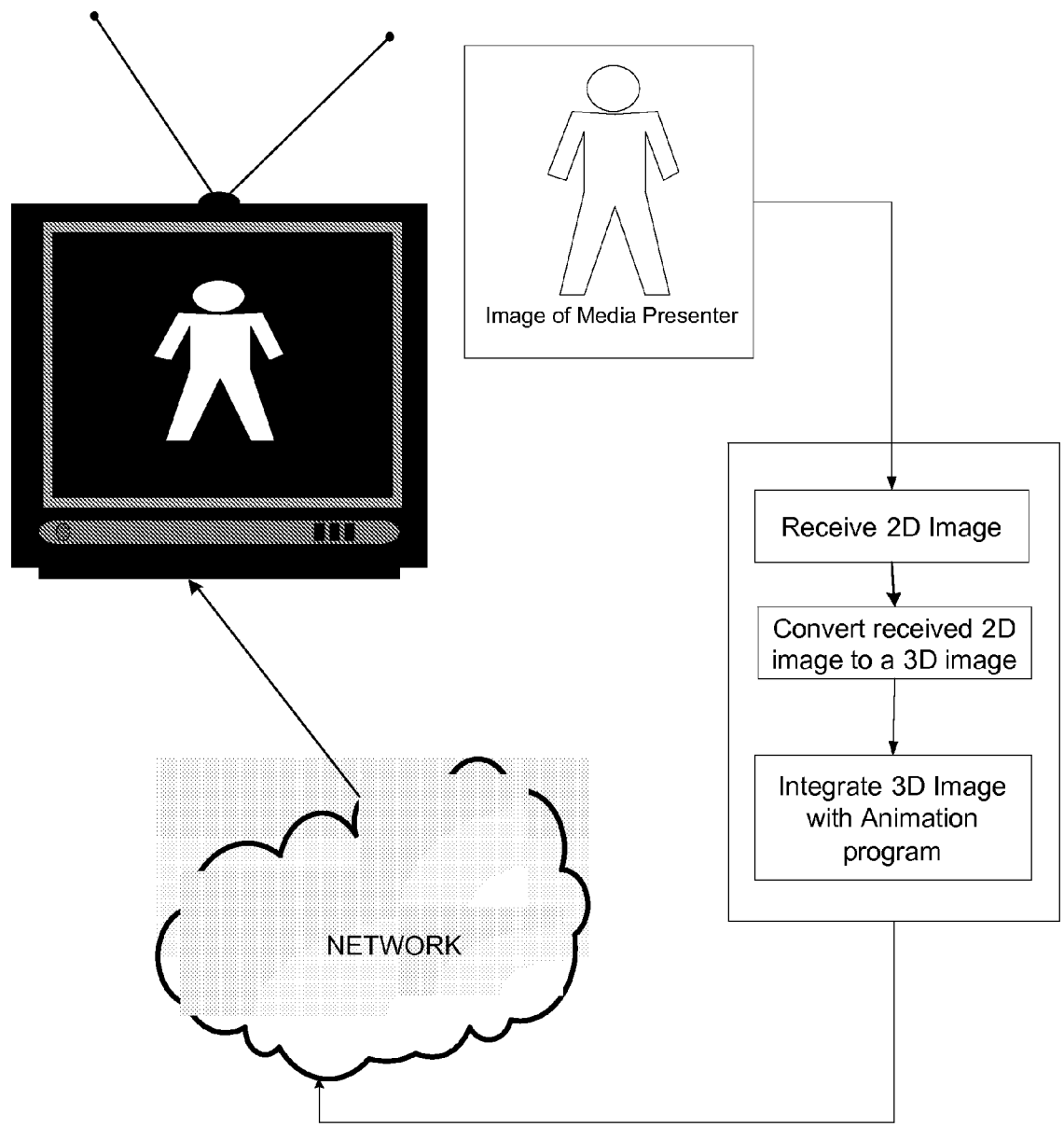
FIG. 50 shows a fourth example of system application according to an embodiment of the present invention.

FIG. 50 shows a fourth example of system application according to an embodiment of the present invention.

Figure 51:
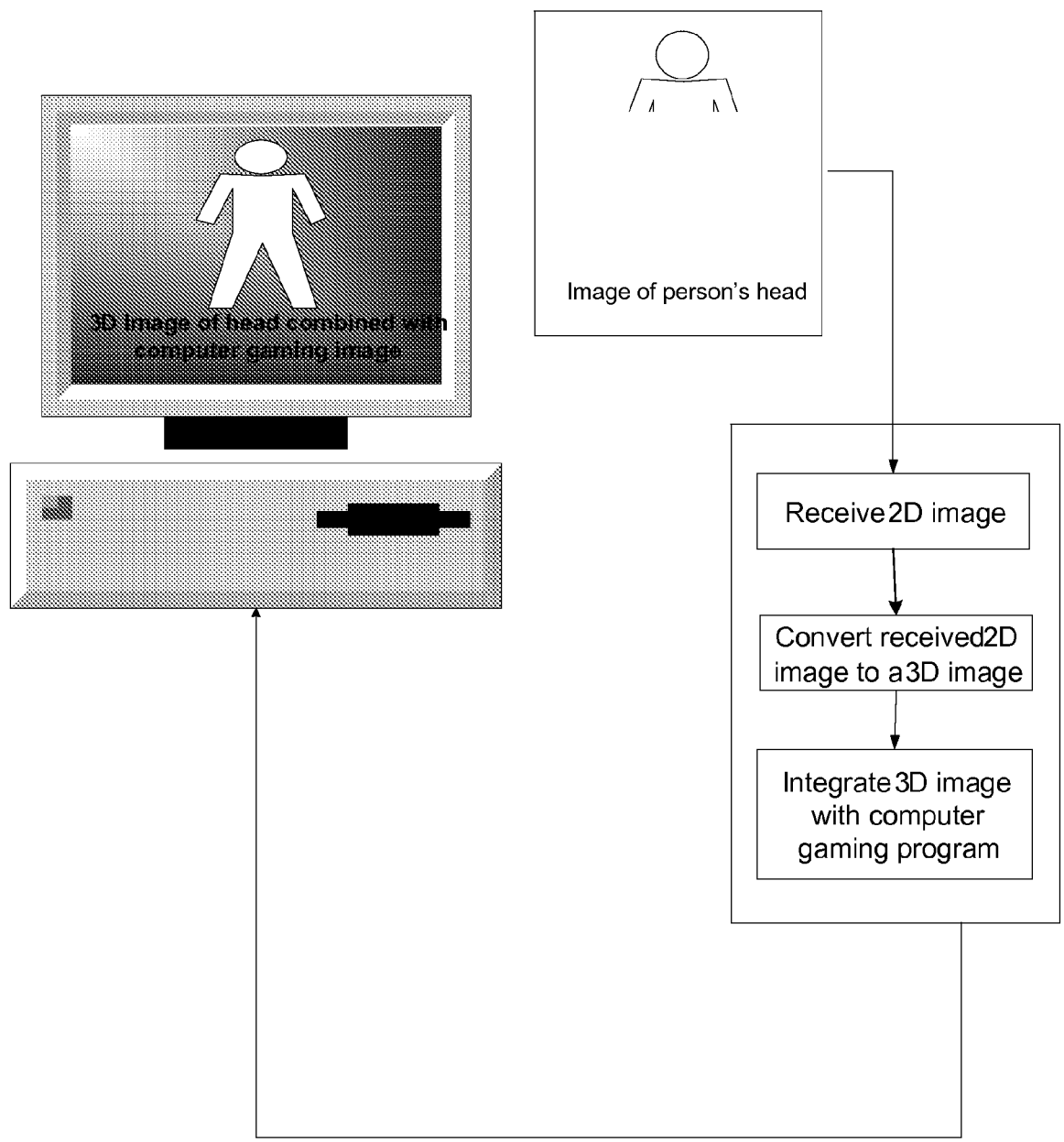
FIG. 51 shows a fifth example of system application according to an embodiment of the present invention.

FIG. 51 shows a fifth example of system application according to an embodiment of the present invention.

Figure 52:
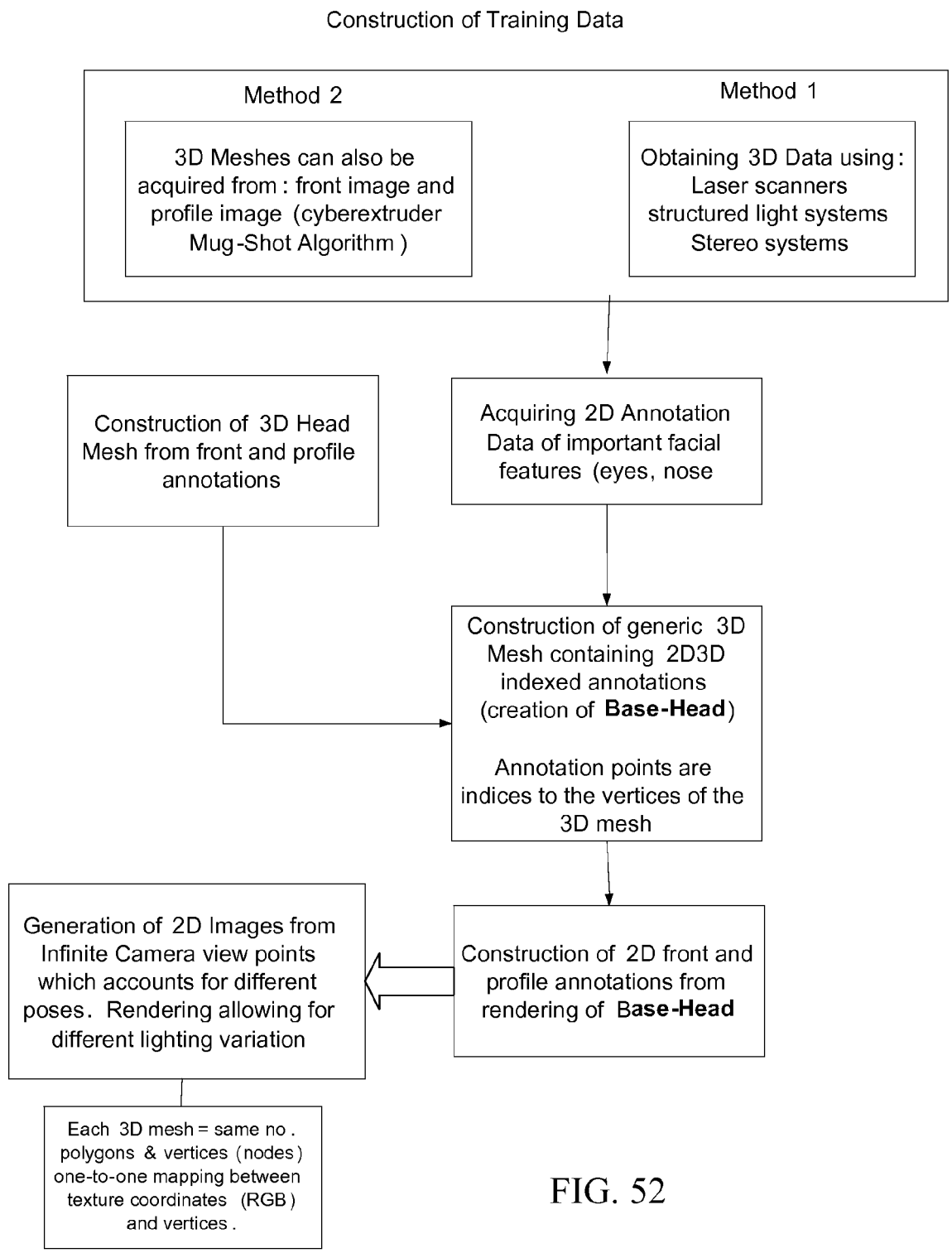
FIG. 52 shows a method for construction of training data according to an embodiment of the present invention.

FIG. 52 shows a method for construction of training data.

Data Collection

Contents
1. Introduction
2. Data Modalities
   a. Laser Scanner
   b. Video Data
      i. Visemes
      ii. Expressions
      iii. Stereo
   c. Still Camera Data
      i. Visemes and Expressions
      ii. Lighting
   d. Scanned Images
3. Classifications
4. Normalization
   a. Expression & Visemes
   b. Ornamentation
   c. Age
5. Quality and Practical Information
   a. 2D image resolution
   b. Storage
      i. File Sizes
      ii. Compression
      iii. Total database sizes
      iv. Storage summary
   c. Process Control 1. Introduction The following sections describe the different data modalities and expressions that may be captured from the set of subjects that enter the data collection area. The resulting set of data could grow enormously, even to the point of being impractical for a single subject session, which may require multiple scans of the same subject. It would simplify the process for data acquisition to be accomplished during a single scan, which would necessitate a parsed down scope of information to be collected during the data collection process. For example, it might not make sense to capture all the expressions with all the lighting variation on both the still and video modalities. One might simply have to capture lighting and expression variation over a reduced set of expressions via the still cameras. The full range of expressions, however, will be collected with the 3D laser scanner with constant lighting.

When collecting the 2D and video data the background should be an even light color. The subject should be placed a reasonable distance from the background, such as, for example, at a fixed distance from wall, to prevent any significant head outlines being generated due to shadows.

The question of how many subjects to acquire is complex. Reasonable coverage of gender, ethnicity, age and facial hair should be obtained. The system may include a program or module that reports the numbers of each classification to provide constant feedback that can be used to bias the selection of individuals should a particular classification set start to become sparse.

2. Data Modalities

There are 3 data modalities of importance: 2D still camera high-resolution images, 2D video camera medium resolution and 3D laser scanner.

a. 3D Laser Scanner

Data should be obtained at the highest resolution possible with the laser scanner; this means the highest geometric resolution (which will probably be fixed) and the highest texture resolution. The quality of the data should be maximized, to the extent possible, such that there are no geometry spikes and no texture environment variances. The equipment that has been used to perform laser scans are believed to have reduced performance in the area of hair resolution. This isn't a problem since the modeling is performed of the head and not the hair. An option to reduce variances due to hair is to require each subject to wear a skull cap so that the head can be scanned correctly or alternatively the subject might be asked to ensure that their hair is tied back from their face. If the scanner is extremely susceptible to spikes when scanning hair, then some problems may be encountered when it comes to subjects with significant facial hair. In this case, the result may require adjustment with data that comes from one of the other modalities. The examples provided on the Cyberware web-site seem to demonstrate adequate capability regarding facial and head hair, however, one would not expect bad examples to be posted on their commercial web-site.

The target for each 3D scan is to obtain full high resolution coverage of the head with a texture map that is totally devoid of environmental conditions. In reality, the complete removal of the environmental effects on the texture map may not be possible. However, the system may be able to make the texture maps consistent, without shadows. This therefore leads to the requirement of controlling the ambient lighting so that it is even and of the correct spectrum to provide accurate 3D points.

Each subject should be scanned multiple times starting from a neutral expression and followed by the list of expressions, phonemes and visemes deemed necessary. Obviously, some of these expressions might be hard to maintain throughout the duration of the scan. The result of such facial movement (and maybe even pose change whilst performing the neutral scan) may turn out to be negligible for the majority of scans/people and it may not. If this movement is significant it can cause a drift/dither in the vertical axis of the scanned data. If the movement has a severe impact on the fidelity of the data then the system can attempt to correct for this via the video data. The video data should provide a measurement that can be used to compensate for this drift in each vertical scan line. The time required to scan the head depends on the rotation speed of the Cyberware motion platform. For example, the sample data posted on the Cyberware web-site required 17 seconds to scan 360 degrees. The Cyberware head scanner specification says that the data can be sampled 30 times per second. Thus, it can be expected that a complete 360 degree scan at 1 mm samples (assuming an average head diameter of approx 20 cm) requires approximately 650 samples. This equates to a scan time of 20 seconds and a lateral resolution of approximately 2 points per degree. Some initial experiments should be performed with any scanner to determine whether there is over-sampling or not. The system may be able to process data at a sample frequency of one degree, in which case the scan time would be approximately 10 seconds, thus reducing the effect of pose/expression alteration during the scan. The effect of subject movement will depend in part on the controllability of the motion platform.

The quality of this 3D data is the single most important aspect of the project closely followed by the coverage of human variance (the different classifications). Achieving high quality data in this stage facilitates the automatic annotation of all the other modalities. Hence, this stage will provide a significant saving of manpower and will reduce the potential for manual error.

The following scans are required for each subject: (1) neutral; (2) open mouth smile; (3) closed mouth smile; (4) frown; (5) surprise; (6) angry; (7) sad; (8) eyes shut; (9) pout; and (10) wide eyed.

This therefore results in 10 scans per person. Assuming a rate of 20 seconds per scan, it would take approximately 3 minutes 20 seconds per person. To ensure accuracy, non anatomical accessories should be removed before the scan (i.e., removal of earrings, glasses, etc.).

b. Video Data (e.g., 2D Video Camera)

The 2D video data falls into two definable groups: (1) data captured before/after the scan and (2) data captured during the laser scan.

When capturing facial expression dynamically as opposed to static 3D expression, this data should be acquired separately from the laser data. This is the basic video data that is required. A stream of video should be collected while the subject very carefully enunciates a predefined sentence containing all the phonemes and visemes. The subject should then slowly and carefully produce each of the listed expressions starting from neutral and returning to neutral in between each expression. This data can be used to produce animation targets ranging from the very simple to the extremely complicated: consider simply modeling phonemes for animation or modeling the variation between people with respect to correctly identifying expression/speech. The potential uses of this data are enormous, especially when combined with 3D laser data.

Capturing the above data can be accomplished using synchronized front, profile and semi-profile cameras to produce dynamic 3D via the MugShotPro type reconstruction. This data will facilitate the construction of 2D to 3D front, profile and semi-profile models that fully correspond with the laser data and can be used to significantly speed up the resulting fitting process.

One other point here to consider is the possible variation in lighting. It is recommended to capture the data with three or more different lighting conditions. This will facilitate model building incorporating expression variation with various controlled lighting conditions and hence provide various methods of lighting estimation. It will also provide test data to ensure that the 3D light estimation algorithms perform correctly.

Each data item will comprise 3 video sequences with each frame in each sequence taken at the same time. Terminology: this data item will be called a video triplet.

i. Visemes

According to the International Phonetic Association (http://www2.arts.gla.ac.uk/IPA/fullchart.html) there are a large number of phonemes and their sounds differ across the globe. For this reason concentration should be focused on the mouth and face shapes associated with the phonemes since many of them have very similar mouth shapes (the tongue is used differently). We will call these target shapes visemes, that is, visualizations of a consolidated set of phonemes. A single video triplet should be captured containing each of the visemes described below. The table gives each viseme a name and displays the representative letter(s) and some example words. The parts of the example words corresponding to the viseme are highlighted in bold capital letters.

| 1. Viseme name | 2. Viseme text sound | 3. Viseme example words |
|---|---|---|
| 4. Neutral | 5. | 6. |
| 7. Bump | 8. B/M/P | 9. BuMP, Mom, bottoM, Bee, Pea |
| 10. Cage | 11. K/G | 12. Cage, Get, Key |
| 13. Church | 14. Ch/J | 15. CHurch, SHe, Joke, CHoke |
| 16. Earth | 17. Er | 18. EARth, bIRd, |
| 19. Eat | 20. EE | 21. Eat |
| 22. Fave | 23. F/V | 24. FacVorite, Fin, Van |
| 25. If | 26. Ih | 27. If, bIt, bEt, bAIt, bOUt, |
| 28. New | 29. N/NG | 30. NooN, siNG, buttonN |
| 31. Oat | 32. Oh | 33. OAt, bOY |
| 34. Ox | 35. Oh | 36. Ox, bOAt |
| 37. Roar | 38. R | 39. Roar, Ray |
| 40. Size | 41. S/Z | 42. SiZe, Sea, Zone |
| 43. Though | 44. Th | 45. THough, THin, Then |
| 46. Told | 47. T/L/D | 48. ToLD, Lay, boTTLe, Day |
| 49. Wet | 50. W/OO | 51. Wet, Way, bOOk, bOOt | ii. Expressions

The following video triplets are required for each subject: open mouth smile; closed mouth smile; frown; surprise; angry; sad; eyes shut; pout; and wide eyed. Notice that neutral is not required as it is part of the viseme data iii. Stereo This section discusses data acquisition for providing multiple synchronized views of the subject to facilitate passive stereo reconstruction. This provides an additional 3D modality in itself while providing a means of motion compensation for the laser data. This modality is actually 4D. The difference between this data and the data described above is that the cameras used to collect this data will be pointing in approximately the same direction and have a much smaller distance between them. The cameras should also be calibrated, thus providing a method of correspondence matching and triangulation. The reconstruction of 3D from this data will require some resources. However, using this data to perform motion compensation for the laser data will require much less resources as significantly fewer points need to be matched. This data should be captured, as it provides some quantitative data on the ground, truth/gold standard debate, as well as being useful. However, this data capture is very difficult. Ideally, the two cameras should view the area that is currently being scanned by the laser. This would mean being able to mount the cameras on the scanning motion platform. This may or may not be a problem in terms of physically attaching them. However it may affect the robustness of the motion platform, such as, for example, how much weight could be added to it before the laser data results and/or the motors are affected. Alternatively, the cameras could be placed in a fixed position looking directly at the subject's face. In this scenario, the video data would be occluded at the most important time of the scan.

Each item of data in this group contains two synchronized video streams, hence it shall be termed a video tuplet. Since this data is intended to provide a different modality that mirrors the laser data capture set, the video tuplets shall mirror the ten different expressions captured during the laser scanning c. Still Camera Data (e.g., 2D Still Cameras)

Capturing 2D digital still images makes sense since their resolution and image quality can be assured. Front, profile and semi-profile should be captured as per the video data mentioned above. This data should also be taken before/after the scan and should also contain the expressions collected by laser and video. In this case of visemes the subject should be asked to say the corresponding word that the phoneme/viseme describes and attempt to freeze at the appropriate point.

The different expressions should also be captured under the different lighting conditions.

i. Visemes and Expressions:

Each data item in this group consists of 3 still images, hence it shall be termed an image triplet. Image triplets shall be captured for the 14 visemes, 9 expressions and neutral. This results in a total of 24 image triplets.

ii. Lighting:

The neutral pose should be captured with the following lighting conditions: Evenly spread ambient lighting; Strong light from the left; Strong light from the right; and Strong light from the top.

The above set of lighting variations should be captured with white lighting and with red, green and blue lighting: thus resulting in 16 image triplets.

d. Scanned Images

For each subject it would be extremely advantageous if an identity document containing a photograph were to be scanned on a flat bed scanner. Obviously care should be taken not to capture any personal information, such as, for example, the subject's name. However, the date at which the identity photograph was taken may be very useful. Examples of useful documents are: drivers license, academic ID card, passport.

3. Classification

The following is a list of classification data that will prove useful when building and applying models.

i. Capture date: 24 hour time, day, month and year.
ii. Gender: male or female
iii. Age: in years
iv. Ethnicity:
   a. Black: North African, South African, West African, West Indian+Other
   b. White: European (Northern, Western, Eastern)+Other
   c. Asian: Chinese, Japanese, Korean, Malay, Philippine+Other
   d. Latino: Mexican, Puerto Rican, Spanish, Brazilian+Other
   e. Indian: Northern, Eastern, Western, Southern
   f. Arabian: Iraqi, Iranian, Saudi Arabian, Moroccan, Egyptian, Syrian, Lebanese, Jordanian+Other
   g. Other: What has been missed?
v. Heritage: Mother/Father and (if possible) Grand Mother and Grand Father
vi. Height: in meters
vii. Weight: in pounds
viii. Facial Hair:
   a. Mustache: size (small, medium, large), intensity (dark, light), color (brown, gray, red)
   b. Beard: size, intensity, color, type (goatee, unshaven, full)
ix. Head Hair
   a. Style: parting (left, center, middle), curly (straight, wavy, curly, frizzy), drawn
   b. Length: short, medium, long
   c. Color: blond, light brown, medium brown, dark brown, black.
x. Glasses: present/not present, metal/plastic, dark/light, large/small
xi. Ear rings: (left, right, both, none), (small, medium, large), (gold, silver, other)
xii. Nose rings: (left, right, none), (small, medium, large) (gold, silver, other)
xiii. Marks: (e.g. birth marks) present/not present (then filter and identify later)

xiv. Other: a catch all text field that ensures we do not miss anything.

The above classifications describe many of the obvious traits that should be identified. There are others that should be included, if identified. After the data collection starts then any additional classes that surface should be added to the Other classification with supporting text information. If the above classification is used as-is then each subject will have 14 variables associated with their data.

4. Normalization a. Expression and Visemes:

The reasons for acquiring expression and viseme data fall mainly into two groups: (1) anatomically correct animation and (2) normalization via detection and removal. Anatomically correct animation obviously has benefit in the entertainment markets, however, it also has a huge benefit in the area of dynamic facial biometrics (re: Face2Face). For static facial biometrics (2D, 3D and 3D from 2D) the ability to detect the amount and type of facial change due to expression and/or talking facilitates a further two approaches in facial recognition: (a) additional variables that can be used within the FR algorithm and (b) removal of that facial movement to produce a completely neutral 2D/3D head/face.

b. Ornamentation:

Obtaining the classification of glasses, earrings, and nose rings has a similar benefit: it facilitates the building of a set of classifiers that can be used to determine whether this type of ornamentation exists in a 2D photograph. This is also a measurement albeit a binary one. The 3D models will be built without any such ornamentation: combining this with the output of the ornamentation classifier(s) facilitates the use of a weighted fitting algorithm. The weighted fitting algorithm will be used to ignore the areas that contain the ornamentation, thus, avoiding a bias error due to the presence of the ornamentation while providing a best fit estimate of the underlying texture and structure obscured by the ornamentation. The resulting 3D head can be rendered back onto the original image to produce a direct measurement (and outline) of the ornamentation in question. For example, glasses can then be measured and reconstructed in 3D (and changed, if required) and placed back onto the 3D head: the glasses will also have the correct texture map as this can be taken directly from the image and light corrected.

c. Age:

Obtaining classification of age can facilitate the automatic global measurement and normalization of age. This is important since one of the obvious and major differences between passport images and live images is age (ignoring expression, pose, etc. for the moment). It must be noted here that this data collection project will obtain age classification of each person. Hence, models and classifiers can be built to normalize for age in a global sense. Ideally, each subject data set should be acquired more than once with a time separation in years to ensure the correct treatment of age. This provides data describing the process of aging for each individual rather than globally. The difference between this inter and intra age variance may turn out to be negligible, depending on the subject and age range being considered.

5. Quality and Practical Information a. 2D Resolution:

Still Cameras.

The resolution of digital still images should be set at the maximum the cameras can acquire as they can always be reduced in size, but as raw training data, they cannot be increased.

Video Cameras:

The resolution of the video images depends on availability and cost of the cameras. Since only the images (i.e., not audio) is required then utilizing a high-resolution progressive scan camera that connects directly to the PC is the best solution. These cameras can be purchased for under $1500 and provide control via computer program. They can also be synchronized and can have programmable exposure and shutter controls. However, should it also be important to collect synchronized audio (re: Face2Face) then a data input card or frame grabber that can provide the synchronization should be utilized. The alternative is to buy high quality camcorders. However, the price may be impractical (renting high quality digital camcorder can run at $1000 per day!).

b. Storage

Assuming that the data described above will be captured then a single subject's data set will cover the following:

| | |
|---|---|
| 10 3D expressions: | each containing 3D geometry points (x, y, z) and RGB values |
| 10 Stereo expressions: | each one is a video tuplet |
| 17 Video visemes: | each one is a video triplet |
| 9 Video expressions: | each one is a video triplet |
| 17 Still visemes: | each one is an image triplet |
| 9 Still expressions: | each one is an image triplet |
| 16 Still lighting variation: | each one is an image triplet |
| 1 Classification file: | this is a small text file (or xml) | i. File Sizes (Estimates):

Basic Image Sizes:

900 kB per medium-resolution color (24 bit) image (640×480 pixels)

3.75 MB per high-resolution color image (1280×1024 pixels)

Video Sequence Sizes at 30 Frames Per Second:

352 MB for a 20 second medium-resolution video clip

2250 MB for a 20 second high-resolution video clip (approx 2.2 GB)

Stereo Expression Video Sequence Sizes (10 Expressions at 20 Seconds Each):

7040 MB medium resolution, 2 cameras, 10 expressions at 20 seconds each (approx 7 GB)

45000 MB high resolution, 2 cameras, 10 expressions at 20 seconds each (approx 45 GB)

Video Triplet Sizes at 2 Seconds, 60 Frames Per Camera, 3 Cameras=180 Frames Per Triplet Sequence:

158 MB medium resolution

675 MB high resolution

Total Video Triplet Sizes for 26 Triplets (17 Visemes and 9 Expressions):

4108 MB medium resolution

17550 MB high resolution

Image Triplet Sizes:

2.64 MB medium resolution 11.25 MB high resolution

Total Image Triplet Sizes for 42 Triplets (17 Visemes, 9 Expressions and 16 Lighting):

111 MB medium resolution 472.5 MB high resolution

One Classification Text File:

10 kB very approximate guess

Single laser head scan (x,y,z,r,g,b) per point

13 MB laser scan; using the uncompressed Cyberware head scan examples.

Ten Expression Laser Scans:

130 MB ii. Compression:

Assuming that any algorithms used can tolerate image compression then close to 90% reduction in image size for an RGB image saved to a JPEG can be obtained without any significant quality reduction. Additionally, at least the same compression ratio for video sequences can be expected when saved to MPEG. In most cases 96% reduction can be expected. Finally, if storage space is (or becomes) an issue the laser scans can be represented as (x,y,z) points and the RGB colors as a texture image which can then be compressed to JPEG: this translates as a saving of 45%.

Data Sizes Under Compression:

| Stereo data: | 352 MB | (med res) | 2250 MB | (high res) |
|---|---|---|---|---|
| Video data: | 205 MB | (med res) | 877.5 MB | (high res) |
| Still Data: | 11 MB | (med res) | 47 MB | (high res) |
| Laser data: | 71 MB | | | | iii. Total Database Sizes:
Total Compressed Data Sizes Per Person:
639 MB medium resolution
3245.5 MB high resolution (3.17 GB)
Total Data Collection Size:
Assuming data for approximately 600 people is collected:
374 GB (med res) and 1902 GB (high res)
iv. Storage Summary The quality and classification of the 3D laser scans is the main priority for this data acquisition project; the whole project benefits greatly by additionally acquiring the video and still image data. However, attention must be paid to some of the practicalities of the sheer size of the resulting data. Data may be stored in any conventional or future developed data storage system, and may be accessed and distributed by any known or future developed means. Since the stereo data comprises 55% of the total data, this data may be limited or not gathered.

For the purpose of building models that draw upon the fusion of the different modalities on a person-by-person basis it makes sense to store each subjects data in a single folder. The folder should be labeled with the person's ID number that is generated.

Seagate produce a 1620 GB hard drive (approx $2400). It is conceivable that the whole data set could be stored on one of these drives if medium resolution images are acquired, or 2 drives if high resolution images are obtained.

Backing up such a large database could be done to magnetic tape or to double layer 8.5 GB DVD disks. Obviously the distribution of the data depends on the type and amount of data required. Using DVD disks to distribute the data is robust but could require an impractical number of disks. Alternatively distribution could be done via 300 GB USB2 external drives (such as http://www.amacom-tech.com/google_ez2disk.html).

For example, a suitable storage solution could be maintaining the data locally on very large hard drives (like the Seagate ones) and backing the data up to double layered DVDs. The DVDs could then be accessed either individually or via a juke-box stack storage system (can access up to 4 TeraBytes). This also facilitates the distribution of the data.

c. Process Control:

The whole data acquisition process could be controlled via a semi-automated GUI program following a flow process control. The first stage of the program collects the classification data. At each of the next stages of the process the operator determines that the subject is ready then clicks the GO button that the program presents. The program then acquires the relevant data and stores the data correctly labeled under the appropriately named folder.

This process is more robust to the correct naming and storing of the data. Additionally, each data modality will always be obtained, as it will be the result of the well-defined process.

Should something go wrong, the program must be written with enough sophistication to be able to insert any or all of the data modalities. This could be achieved via an insistence that the operator views each piece of data before moving on to the next piece and if the data has errors the data is re-acquired.

6. Additional Applications

The system may be used for the scanning of dummy/manikin heads, dolls, figurines or other toy items.

The quality of the process will be increased if 3D data is cleaned up in advance. Additionally, 3D data correspondence and feature-saliency poligonalisation should be the focus (reduction to a useful mesh without losing quality).

The system can also be used to scan id cards.

With regards the use of a 3d scanner to provide a large reliable dataset of 3D heads: Such a dataset will provide many useful results. Just some are listed below:

a. Other data sets can be constructed from front and side photographs and the 3D is produced through a set of algorithms. This provides an extremely cheap method of reliably producing a 3D head from a 2D photograph with a pose variation of (approx)+/−10 degrees rotation. The accuracy will be limited by the fact that all photographs are taken with unknown camera focal lengths. The resulting 3D head accuracy will be the optimum that can be achieved without such data, and for some cases, such as, for example, entertainment or a willing subject, this is obtainable easily enough. However, for significant off-pose 3D generation more accurate base data will be needed. This should be obtained by a 3D scanner (such as a laser scanner). The main benefit of this data is the fact that the vast majority of FR algorithms are highly susceptible to large off-pose head photographs and hence improvement of the FR can be achieved.

b. The normalized structure of such 3D data ensures that the model building is precise: all the 3D heads now used (constructed from 2 photo's) have some form of un-equalized environmental light, often completely different in each photograph. This provides the ability to precisely determine the lighting that was present in an original image and control it in MVS output images. Again, this is significant for most FR algorithms, since lighting does matter in FR, and even front end ridge detectors (such as Cognitec) are effected by lighting, although the effect has not been quantified.

c. The resulting models built using the scanned 3D data will be able to provide a highly accurate facial signature. This allows the provisioning of a normalized FR identity signature that is independent of light, scale, pose, focal length, expression and other factors. Even 3D data FR companies don't do this: take A4 for example, they simply produce a 3D facial measurements template that they then use to check against a live scan. This is very, very susceptible to expression, it's also susceptible to light changes and potentially to pose variation depending on how robust their structured light system is with respect to large surface dynamics (quickly changing depths, e.g., cliff between the slope on the cheeks compared to the slope on the nose changes rapidly as the head rotates with respect to the A4 camera). One major benefit is the ability to produce a facial signature (or template) and combine this with a simple non-linear optimized classification algorithm (e.g., neural net) to produce a 3D FR system. The resulting system will be able to cope with light, pose, age, expression, facial hair. The system will also be able to provide accurate and clear 3D heads from even low quality CCTV images.

Features of Some Embodiments

The system according to the present invention can handle any 2d view within a broad range, such as handling any rotation, such as any X, Y, and/or Z axis rotation, e.g., +/−90° Y rotation. It can work from a 90° image (something more sophisticated than just mirroring the same image side to side). It also provides automated expression removal/neutralization, automated effect of aging removal/neutralization, and automated facial decoration addition/removal.

The system according to the present invention provides an MVS system and a system for using a photo→3D→electron beam themography. It can be used in creating or enhancing 3D printed materials or displays, including kinegrams (www.kinegram.com), stereo images, holograms, holographs, etc. (http://www.dupontauthentication.com/?cmd=portrait), or using or including any rapid prototyping or CNC milling machine, etc. It can also be used for creating a 3D model from a 2D image taken from a camera cell phone that in turn creates content displayed back to the cell phone. The system also allows the creation, including automatic creation, of prosthetic devices (Orthotics, burn masks, etc., from one or more images, such as one or more 2d images.

Description of Features of Some Embodiments

The present invention provides for application of algorithms that statistically model the structural and textural variation of the human head while separating training error (specific OR measurement error). These algorithms use statistical techniques (maximum likelihood estimated factor analysis OR principal factor analysis) to separate and isolate the fundamental variables that describe the variation between all human head shapes (and textures) and the specific variation.

These variables are virtual, they do not actually exist in a form that is directly measurable via some data acquisition technique/equipment: examples of variables are expression, phoneme and identity.

The application of these techniques to annotated 2D, 3D and 4D data allows the construction of models that can remove (i.e., not be biased by) training error. An example of such training error can be the inconsistency in manually annotating a set of 2D images of human faces. Another example could be the removal of the effect of quantization error in 3D laser scans. Yet another example is the image-enhancement of poor quality low resolution images containing faces (they can be enhanced to make high quality images).

These techniques can be used to clean up anything that can be statistically modeled via a training set that contains noise. It can also be used to explain variation in a human readable way (e.g., rather than this point moves here, that point moves there, the techniques can be applied to create variables that say more smile, more anger, more beard, etc.).

Additionally, the present invention provides for the use of support vector machines (SVM) to maximize the separation of the statistical distance between these meaningful fundamental variables. A more simple description would be to provide a more stringent isolation of these meaningful variables so that they can not effect each other.

The present invention also provides for the use of non-linear factor analysis (or PCA) to provide a more specific description of the population data.

The present invention provides for an algorithm for fitting a statistical model (e.g., 3D head shape) to a similar or lower dimensional example observation (e.g., a 2D image) such that the algorithm constructs a matrix describing the multivariate fit-error manifold via training. The matrix can then be used to update the model parameters iteratively until the current state of the model correctly describes the observation.

The following is a simple example: in the CyberExtruder code it's called an Shape Projection Model:

a. From a set of n corresponding 3D head meshes construct a covariance matrix which describes the variation in that training set. Each 3D mesh has a corresponding 2D annotation (indexed from a suitable selection of the 3D points).

b. Perform either PCA (principal component analysis) or factor analysis (see above) to obtain either reduced dimensionality (PCA) or fundamental variable extraction (see above). This results in a set of parameters far fewer than the original number of 3D points in a single mesh head. Call these parameters f.

c. i. For each original head mesh, step through the relevant 3D environment variables AND f Relevant 3D environment variables are 3D pose and camera focal length. At each step introduce a deviation (delta) from the ideal parameter.

ii. For each step project the points of the 3D mesh corresponding to a 2D annotation onto the 2D image.

iii. Calculate the difference between the 2D position of the projected points from the original mesh (with 3D pose and camera focal length) and the delta projected mesh.

iv. This resulting difference vector divided by delta provides a measure of the gradient in error-space for that particular parametric deviation.

d. Sum all the deviations across all the training examples and normalize with respect to n.

e. The process described in (c) and (d) creates an error derivative matrix (D) which can be used to fit the 3D mesh model to a set of 2D annotations in the following way:

i. Initialize the 3D mean approximately by a rigid transformation providing scale, rotation and translation, assuming a typical focal length.

ii. Calculate the error between the current 3D mesh projected to the 2D image.

iii. Calculate the updated parameters f using D.

iv. Iterate until the error vector magnitude is below an acceptable threshold.

f. The resulting fit will provide a 3D estimate of shape including 3D pose and camera focal length all obtained from 2D annotations.

The example given above is a simple yet powerful example of the fitting algorithm. The algorithm can be used to fit any model to any observation. In this case it was used to fit 3D shape to 2D projected shape. Among others, it can be used to fit 3D shape and texture to 2D shape and texture, to 3D shape, texture and environmental lighting to 2D texture only. The list of useful applications of such an algorithm is rather large.

The present invention provides for automatic extraction of dynamic 3D heads+texture+phonemes+expression from each frame of a video sequence to enable faithful personalized 3D head animation. For example, from a video sequence the 3D head is extracted and tracked while obtaining the expression and phoneme. The information can be used to reconstruct the person's head anywhere there is a computing and display device, such as, for example, a PC, cell phone, video game, etc. The reconstruction creates the animated 3D head with the person's voice overlaid, thus producing faithful dynamic 3D reproduction+audio.

Some uses for the present invention include animation on cell phones, animation in video games, animation for CRM, CRM for ATM machines and airport help desks, to name a few.

The present invention can be used for the auto-creation of faithful 3D+texture heads for solid rapid-prototyping (e.g. for creation of personalized dolls heads & bobble head dolls).

The present invention can be used for auto creation of new viewpoints, facilitating traditional 2D FR from different viewpoints, or removal of non-frontal facial images.

The present invention provides for the extraction of any 3D or 2D object using the method(s) outlined above from a 2D image or a sequence of 2D images. For example, the present invention provides for extracting the 3D human body for use in gate analysis biometrics or low cost human motion capture, extracting bodies for even more faithful animation reproduction, extraction of 3D human hand to provide 3D hand scan biometrics, or hand gesture recognition for VR control or sign language interpretation, or measuring the size and shape of human finger nails, and auto extraction of 3D objects (e.g. heads) to provide the data used for lenticular or holographic security tags (or just for fun).

Another Embodiment

An embodiment of the present invention referred to as MugShot Pro 3.4 provides breakthrough biometric technology for security and surveillance. It provides for turning mug shots, passport photos, and photo IDs into 3D images. Whether identifying a suspect on a video or otherwise struggling with a photo, MugShot Pro 3.4 software can be a critical tool in the investigative process. The present invention provides the capability of restricting access by identifying individuals, to create "watch-list" images, or to facilitate database searches in government agencies or large corporations is required.

MugShot Pro can automatically process a photo in less than one second, and can also morph images form different angles and with different expressions, thus improving facial recognition matching scores.

The present invention provides an image processing software suite that enhances facial recognition. It delivers an enormous advantage to facial recognition vendors and end-users who want to improve their facial recognition results by automatically converting 2D images into lifelike, 3D models of subjects. Corrections can be made for images taken with harsh light or deep shadows, photos with stern expressions or smiles, even images with older/younger features.

From a single photograph, group of photos, or a network of surveillance cameras, the present invention can automatically produces high-quality 3D models which are then used to produce photos that are more recognizable by existing facial recognition systems. Additionally, no user input is required to produce the final product images, as the system can be automated.

The present invention provides capabilities for automation of the three-dimensional morphable-model process for creating quality 3D images. The present invention can automatically construct a full 3D model from a 2D photo, a non-front-facing image, or even a poor-quality image. The present invention provides the capability of batch processing legacy databases (mug shots, passport photos, military and corporate photo galleries) and converting to 3D morphable models in less than one second per photo. It can automatically measures over 1,400 parameters present in the original photograph and can then determine why a set of photos failed to be recognized by the facial recognition system. It provides a powerful rendering engine that allows specification of positioning, rotation, and lighting parameters to create a more meaningful likeness of a target subject. Once the 3D model has been created, it can be viewed from any angle or position. It is capable of producing multiple poses that are highly accurate. A unique geometry is generated for every person. Three-dimensional, computer-generated, morphable models are designed to be used in conjunction with existing facial recognition applications to improve database search results.

The present invention provides for capabilities including face finding, global face finding, eye finding, expression optimization, pose optimization, multi-view rendering, automated, off-axis image processing, automated, off-axis image batch processing, vector summary and parametric detail outputs, morphing palette, manual annotation palettes.

All publications, patents, patent applications and other references cited in this application are incorporated herein by reference in their entireties for all purposes. Citation of a reference herein shall not be construed as an admission that such is prior art to the present invention.

What is claimed is:

1. A method for generating a 3-dimensional representation of a portion of an organism using a processor, comprising:
    collecting training data and storing the training data in a database, wherein the training data includes a first set of training data and a second set of training data;
    building at least one statistical model having a set of parameters using the training data;
    comparing the at least one statistical model to a 2-dimensional image of the portion of the organism using the processor;
    modifying at least one parameter of the set of parameters of the statistical model based on the comparison of the at least one statistical model to the 2-dimensional image of the portion of the organism; and
    passing the modified set of parameters representing the portion of the organism through the statistical model.

2. The method according to claim 1, wherein the training data includes data relating to portions of organisms of the same type as the portion of the organism.

3. The method according to claim 1, wherein the first set of training data comprises a plurality of points representing the organism.

4. The method according to claim 1, wherein the statistical model is based on at least one of 2-dimensional shape, 2-dimensional texture, 3-dimensional shape and 3-dimensional texture.

5. The method according to claim 4, wherein the 2-dimensional shape is based on a first plurality of points representing the first set of training data and a second plurality of points representing the second set of training data.

6. The method according to claim 4, wherein the 2-dimensional texture is based on pixel values inside the 2-dimensional shape.

7. The method according to claim 6, wherein the pixel values represent the colors red, green and blue.

8. The method according to claim 4, wherein the 3-dimensional shape is based on a first plurality of points, a second plurality of points, a third plurality of points and a fourth plurality of points obtained from at least one of a 3-dimensional acquisition system and 2-dimensional images.

9. The method according to claim 4, wherein the 3-dimensional texture is based on pixel values located between 3-dimensional points.

10. The method according to claim 1, wherein the second set of training data comprises a plurality of textured meshes representing the organism.

11. A method for generating a 3-dimensional representation of a portion of an object that is capable of being represented by a statistical model using a processor, comprising:

collecting training data and storing the training data in a database, wherein the training data includes a first set of training data and a second set of training data;

building at least one statistical model having a set of parameters using the training data;

comparing the at least one statistical model to a 2-dimensional image of the portion of the object using the processor;

modifying at least one parameter of the set of parameters of the statistical model based on the comparison of the at least one statistical model to the 2-dimensional image of the portion of the object; and passing the modified set of parameters representing the portion of the object through the statistical model.

12. The method according to claim 11, wherein the training data includes data relating to portions of objects of the same type as the portion of the object that is capable of being represented by a statistical model.

13. The method according to claim 11, wherein the first set of training data comprises a plurality of points representing the organism.

14. The method according to claim 11, wherein the statistical model is based on at least one of 2-dimensional shape, 2-dimensional texture, 3-dimensional shape and 3-dimensional texture.

15. The method according to claim 14, wherein the 2-dimensional shape is based on a first plurality of points representing the first set of training data and a second plurality of points representing the second set of training data.

16. The method according to claim 14, wherein the 2-dimensional texture is based on pixel values inside the 2-dimensional shape.

17. The method according to claim 16, wherein the pixel values represent the colors red, green and blue.

18. The method according to claim 14, wherein the 3-dimensional shape is based on a first plurality of points, a second plurality of points, a third plurality of points and a fourth plurality of points obtained from at least one of a 3-dimensional acquisition system and 2-dimensional images.

19. The method according to claim 14, wherein the 3-dimensional texture is based on pixel values located between 3-dimensional points.

20. The method according to claim 11, wherein the second set of training data comprises a plurality of textured meshes representing the organism.

* * * * *